(12) United States Patent
Finster, Jr. et al.

(10) Patent No.: US 12,505,726 B2
(45) Date of Patent: Dec. 23, 2025

(54) DYNAMIC COMMUNICATION METHODS FOR TAG SYSTEMS

(71) Applicant: INDUSTRIAL NETWORKS LLC, Spring, TX (US)

(72) Inventors: Jimmy Bill Finster, Jr., Spring, TX (US); Stephen Gardiner Bourque, Spring, TX (US)

(73) Assignee: Industrial Networks LLC, Spring, TX (US)

( * ) Notice: Subject to any disclaimer, the term of this patent is extended or adjusted under 35 U.S.C. 154(b) by 0 days.

(21) Appl. No.: 19/018,890

(22) Filed: Jan. 13, 2025

(65) Prior Publication Data

US 2025/0252834 A1  Aug. 7, 2025

Related U.S. Application Data

(63) Continuation-in-part of application No. 18/615,742, filed on Mar. 25, 2024, now Pat. No. 12,197,990, (Continued)

(51) Int. Cl.
*G06K 19/077* (2006.01)
*G01S 19/14* (2010.01)
(Continued)

(52) U.S. Cl.
CPC .......... *G08B 13/2462* (2013.01); *G01S 19/14* (2013.01); *G06Q 10/087* (2013.01); *G08B 13/2485* (2013.01)

(58) Field of Classification Search
CPC . G08B 13/2462; G08B 13/2485; G01S 19/14; G06Q 10/087
See application file for complete search history.

(56) References Cited

U.S. PATENT DOCUMENTS 7,852,218 B2 * 12/2010 Breslau .................. G06Q 10/08
                                                             705/29
7,936,271 B2 *  5/2011 Karr .................... G08B 13/2491
                                                            340/539.16
(Continued)

FOREIGN PATENT DOCUMENTS

CA        3076746 A1 *  4/2019  ......... G06Q 10/0833
CN    110751242 A  *  2/2020  ............... H04N 7/18
(Continued)

*Primary Examiner* — Chico A Foxx
(74) *Attorney, Agent, or Firm* — Baker & McKenzie LLP

(57) ABSTRACT

The disclosed methods include: detecting data associated with a first tag comprised in the tag network; resolving the data to generate resolved data associated with a plurality of tags in the tag network including the first tag and a second tag; determining the second tag based on the resolved data; and extracting or determining, using the resolved data: first telemetric data associated with the first tag, first location data associated with the first tag, second telemetric data associated with the second tag, and second location data associated with the second tag. The methods also include formatting the first telemetric data, the first location data, the second telemetric data, and the second location data to generate an inventory map associated with the first mobile or stationary cargo and the second mobile or stationary cargo; and transmitting the inventory map to a display device configured to visualize the inventory map.

20 Claims, 31 Drawing Sheets

Related U.S. Application Data which is a continuation-in-part of application No. 18/373,506, filed on Sep. 27, 2023, now Pat. No. 11,960,954, application No. 19/018,890 is a continuation-in-part of application No. PCT/US2024/048717, filed on Sep. 26, 2024.

(51) Int. Cl.
  *G06K 7/10* (2006.01)
  *G06Q 10/087* (2023.01)
  *G08B 13/24* (2006.01)

(56) References Cited

U.S. PATENT DOCUMENTS

| | | | |
|---|---|---|---|
| 2001/0000958 A1* | 5/2001 | Ulrich | G06K 17/0022 340/572.1 |
| 2004/0069850 A1* | 4/2004 | De Wilde | G06K 19/07758 235/385 |
| 2004/0139101 A1 | 7/2004 | Watanabe et al. | |
| 2006/0033616 A1* | 2/2006 | Silva | G07C 9/38 340/539.22 |
| 2007/0000989 A1* | 1/2007 | Kadaba | B07C 3/008 235/375 |
| 2007/0290852 A1* | 12/2007 | Trosper | G08B 21/0222 340/572.1 |
| 2008/0048031 A1* | 2/2008 | Milliner | G06Q 40/08 235/385 |
| 2008/0297352 A1* | 12/2008 | Charlot, Jr. | G06K 17/0029 340/572.1 |
| 2009/0040048 A1* | 2/2009 | Locker | G08B 21/24 340/572.1 |
| 2010/0013637 A1* | 1/2010 | Trosper | G08B 21/02 340/8.1 |
| 2010/0045436 A1 | 2/2010 | Rinkes | |
| 2010/0076902 A1* | 3/2010 | Kraft | G06Q 10/0833 340/572.1 |
| 2010/0079259 A1 | 4/2010 | Inagaki | |
| 2010/0097218 A1 | 4/2010 | Weng et al. | |
| 2010/0117832 A1 | 5/2010 | Koo et al. | |
| 2010/0148937 A1* | 6/2010 | Howard | G06F 16/29 707/E17.014 |
| 2013/0300560 A1* | 11/2013 | Hadsall, Sr. | G08B 21/0275 340/539.13 |
| 2014/0028447 A1* | 1/2014 | Howard | G06F 16/00 340/10.6 |
| 2014/0062700 A1* | 3/2014 | Heine | G06Q 10/087 340/572.1 |
| 2015/0027808 A1 | 1/2015 | Baillargeon et al. | |
| 2016/0148440 A1* | 5/2016 | Kwak | G07C 5/085 701/31.5 |
| 2016/0232483 A1* | 8/2016 | London | G06Q 10/0833 |
| 2016/0311509 A1 | 10/2016 | Buffa | |
| 2017/0344937 A1 | 11/2017 | Atchley et al. | |
| 2019/0066042 A1 | 2/2019 | Conlon | |
| 2019/0073735 A1 | 3/2019 | Conlon | |
| 2019/0156277 A1 | 5/2019 | Fisher | |
| 2019/0354827 A1* | 11/2019 | Prabhakar | G06K 19/07758 |
| 2020/0201317 A1 | 6/2020 | Bell | |
| 2020/0334631 A1 | 10/2020 | Conlon | |
| 2020/0372449 A1* | 11/2020 | Tarrant | G06Q 20/203 |
| 2021/0019483 A1 | 1/2021 | Shakedd | |
| 2021/0020012 A1* | 1/2021 | Shakedd | H04B 1/40 |
| 2021/0027608 A1* | 1/2021 | Shakedd | G08B 21/24 |
| 2021/0132582 A1 | 5/2021 | Biernat et al. | |
| 2021/0133670 A1 | 5/2021 | Cella et al. | |
| 2021/0350555 A1 | 11/2021 | Fischetti | |
| 2022/0101269 A1 | 3/2022 | Mehrotra et al. | |
| 2022/0187847 A1 | 6/2022 | Cella et al. | |
| 2022/0269920 A1* | 8/2022 | Valencia | H04W 4/029 |
| 2022/0292543 A1 | 9/2022 | Henderson | |
| 2022/0318529 A1* | 10/2022 | Vaught | G06K 7/10297 |
| 2023/0046794 A1* | 2/2023 | Stevens | B65G 1/1376 |
| 2024/0135133 A1* | 4/2024 | Imai | G06K 17/0022 |
| 2024/0357014 A1* | 10/2024 | Kolberg | H04L 67/34 |

FOREIGN PATENT DOCUMENTS

| | | | | |
|---|---|---|---|---|
| KR | 100723042 B1 | * | 5/2007 | G01S 5/0027 |
| WO | WO-02061657 A1 | * | 8/2002 | G08B 13/2417 |

* cited by examiner

Inventory List

The selected plant has the following cars in inventory. Use the Filter box below to filter the list of cars based on any of the columns.

Show | 25 ∨ | entries                Search [        ]    ⊕ ▽ ⊕ 🗎 ⬇ 🗎 🔒    ⟲

| Car | DIS | Arrival | Yard | Track | Spot | Status | Quality Status | Customer | Project | Actions |
|---|---|---|---|---|---|---|---|---|---|---|
| ⊕ Car 1 | 78 | Date 1, 5:27:57 PM | RUNAROUND | NT2 | 28 | ○ Car Arrived | ○○○○○ | | 🗎 | ↑ ✕ |
| ⊕ Car 2 | 100 | Date 2, 4:10:58 PM | CLEANING | CB2S | 6 | ○ Car Arrived | ○○○○○ | | 🗎 | ↑ ✕ |
| ⊕ Car 3 | 125 | Date 3, 1:18:33 PM | NORTH YARD | NY2 | 4 | ○ Car Arrived | ○○○○○ | | 🗎 | ↑ ✕ |
| ⊕ Car 4 | 20 | Date 4, 3:15:39 PM | BLDG11 CLN | B11T1S | 1 | ○ Car Arrived | ○○○○○ | | 🗎 | ↑ ✕ |
| ⊕ Car 5 | 6 | Date 5, 10:58:59 PM | BLDG11 CLN | B11T2 | 4 | ○ Car Arrived | ○○○○○ | | 🗎 | ↑ ✕ |
| ⊕ Car 6 | 6 | Date 6, 10:58:57 PM | BLDG6 MECH | B6ET | 4 | ○ Car Arrived | ○○○○○ | | 🗎 | ↑ ✕ |
| ⊕ Car 7 | 6 | Date 7, 10:58:57 PM | BLDG6 MECH | B6ET | 5 | ○ Car Arrived | ○○○○○ | | 🗎 | ↑ ✕ |
| ⊕ Car 8 | 13 | Date 8, 7:48:05 PM | LINING | 7 | 1 | ○ Car Arrived | ○○○○○ | | 🗎 | ↑ ✕ |

FIG. 9

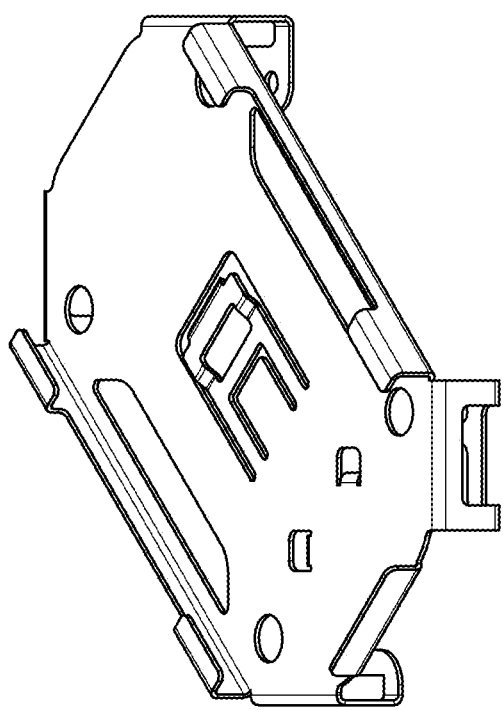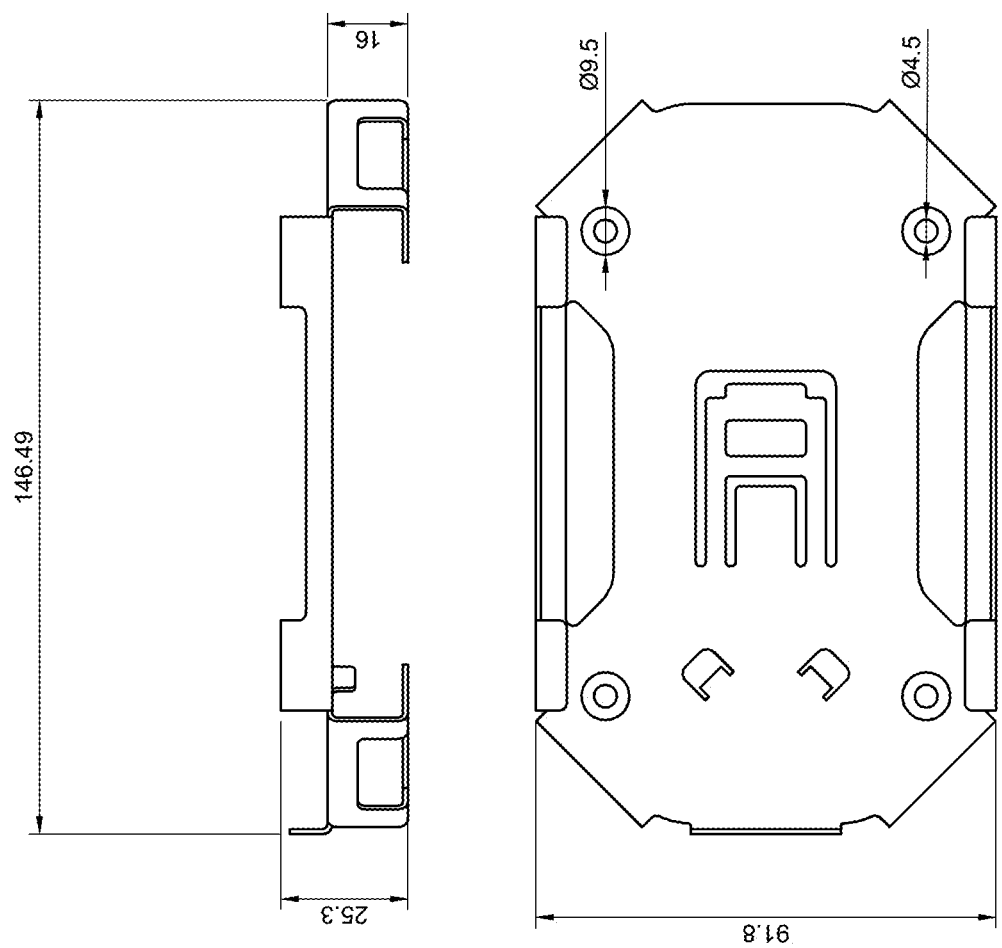
FIG. 20A

 Identify the minimum number of car movements required to achieve the sequence B5, A7, B8, A2 on a third track (Track 3).

Starting Layout
• Track 1: A1, A2, A3, A4, A5, A6, A7
• Track 2: B1, B2, B3, B4, B5, B6, B7, B8, B9
• Track 3 (empty): Destination for B5, A7, B8, A2

Constraints and Rules
1. Train cars can only move in order (e.g., moving A7 requires A1 through A6 to be moved out of the way first).
2. Cars moved temporarily to other tracks must be restored to their original track after completing the sequence.
3. Cars cannot jump over each other.
4. Goal is to minimize:
   • The number of cars moved (total).
   • The number of moves (single or grouped cars).

Plan and Sequence of Moves
The sequence B5, A7, B8, A2 determines:
• B5 is the first car to be placed on Track 3.
• A7 is the second car.
• B8 is the third car.
• A2 is the fourth car.

FIG. 26A

Step-by-Step Procedure

Step 1: Move B5 to Track 3.
• B1, B2, B3, B4 must be temporarily moved to clear the path for B5.
• Action: Move B1, B2, B3, B4 to a temporary track (Track 4).
• Move Count: 4 cars moved (1 group).

Step 2: Move B5 to Track 3.
• Action: Transfer B5 to Track 3.
• Move Count: 1 car moved.

Step 3: Move A7 to Track 3.
• A1 through A6 must be temporarily moved to clear the path for A7.
• Action: Move A1, A2, A3, A4, A5, A6 to a temporary track (Track 5).
• Move Count: 6 cars moved (1 group).

Step 4: Move A7 to Track 3.
• Action: Transfer A7 to Track 3.
• Move Count: 1 car moved.

Step 5: Move B8 to Track 3.
• B6, B7 must be temporarily moved to clear the path for B8.
• Action: Move B6, B7 to Track 4 (same temporary track as B1, B2, B3, B4).
• Move Count: 2 cars moved.

Step 6: Move B8 to Track 3.
• Action: Transfer B8 to Track 3.
• Move Count: 1 car moved.

Step 7: Move A2 to Track 3.
• A1 must be temporarily moved to clear the path for A2.
• Action: Move A1 to Track 5 (same temporary track as A3, A4, A5, A6).
• Move Count: 1 car moved.

Step 8: Move A2 to Track 3.
• Action: Transfer A2 to Track 3.
• Move Count: 1 car moved.

Step 9: Restore remaining cars.
• A1, A3, A4, A5, A6 back to Track 1.
• B1, B2, B3, B4, B6, B7 back to Track 2.
• Move Count: 10 cars moved (6 for A1... A6, 4 for B1... B4, B6, B7).

FIG. 26B

DYNAMIC COMMUNICATION METHODS FOR TAG SYSTEMS

CROSS-REFERENCE TO RELATED APPLICATIONS

This application is a continuation-in-part of, and claims priority to U.S. application Ser. No. 18/615,742, filed Mar. 25, 2024, and titled "Dynamic Communication Methods For Smart Tag Systems," which is a continuation-in-part of, and claims priority to U.S. application Ser. No. 18/373,506, filed Sep. 27, 2023, and titled "Dynamic Communication Methods For Smart Tag Systems," which issued as U.S. patent Ser. No. 11/960,954, all of which are incorporated herein by reference in their entirety for all purposes.

This application is a continuation-in-part of Patent Cooperation Treaty (PCT) Application No. PCT/US24/48717, filed Sep. 26, 2024, and titled "Dynamic Communication Methods For Tag Systems," which is a continuation-in-part of, and claims priority to U.S. application Ser. No. 18/615,742, filed Mar. 25, 2024, and titled "Dynamic Communication Methods For Smart Tag Systems." PCT Application No. PCT/US24/48717 is also a continuation-in-part of, and claims priority to U.S. application Ser. No. 18/373,506, filed Sep. 27, 2023, and titled "Dynamic Communication Methods For Smart Tag Systems," all of which are incorporated herein by reference in their entirety for all purposes.

TECHNICAL FIELD

The present disclosure relates to techniques associated with detecting, transmitting, and managing smart data associated with logistical operations.

BACKGROUND

The tracking and logistics space requires accurately communicating and/or tracking cargo data associated with stationary and/or mobile cargo. The processes involved in simultaneously tracking, analyzing, and/or monitoring a plurality of stationary or mobile cargo are not only inefficient but are also costly, slow, and lack intelligent holistic data communication and data management mechanisms. For example, existing techniques for railcar cargo management rely on railyard workers walking down railcar lines to scan Radio Frequency Identification (RFID) tags attached to a plurality of railcars. Not only is this process time consuming but is also highly unsafe since it exposes the railyard workers to unsafe conditions around mobile railcars. In addition, it is difficult for railyard workers, for example, to perform individual scans and so aggregating inventory data associated with a plurality of cargo at the railyard not only becomes an inaccurate process but is also prone to untimeliness which leads to errors in railcar switching operations. This inefficiency in turn leads to a lower turnaround of railyard operations.

Moreover, the aforementioned RFID tags, for example, rely on a standard transmission frequency adopted by the American Association of Railroads in 1989 with certain distance and bandwidth limitations. The distance limitations, for example, constrain arranging railcars to be at most 10 feet away from each other and requires the use of a scanner (e.g., an RFID scanner) or some other near field communication (NFC) device on individual railcars. The frequency limitations, for example, do not support the transmission of real-time or near real-time cargo data nor do such limitations enable modulating or encoding the RFID signal with sensor data associated with the cargo in real-time or near real-time. There is therefore a need to address these issues.

SUMMARY

This disclosure is directed to methods, systems, and computer program products for analyzing data (e.g., smart data) within a tag network. According to an embodiment, a method for analyzing data within a tag network comprises initiating activation of a first tag network on a vehicle comprising a first cargo housing unit and a second cargo housing unit, the first tag network comprising: a plurality of tags including: a first tag attached to the first cargo housing unit of the vehicle; and a second tag attached to the second cargo housing unit of the vehicle; and a gateway system configured to transmit aggregate tag data based on detecting a tag in the first tag network, the aggregate tag data comprising or being based on first tag data associated with the first tag and second tag data associated with the second tag.

The method further comprises communicatively coupling, based on the first tag network, the first tag and the second tag, thereby enabling communication between the first tag and the second tag.

According to one embodiment, the method comprises detecting, based on the gateway system, the first tag.

In addition, the method comprises receiving, based on detecting the first tag, the aggregate tag data, the aggregate tag data comprising or being based on at least a combination or aggregation of: the first tag data associated with the first tag; and the second tag data associated with the second tag.

Furthermore, the method comprises resolving or analyzing the aggregate tag data, thereby generating resolved or analyzed data associated with the first tag network.

Moreover, the method comprises generating, based on the resolved or analyzed data, at least one of: first map data based on at least first geolocation data associated with the first cargo housing unit of the vehicle, and second geolocation data associated with the second cargo housing unit of the vehicle; first metric data based on at least a first sensor measurement associated with the first cargo housing unit of the vehicle, and a second sensor measurement associated with the second cargo housing unit of the vehicle; first logistical data based on at least first inventory information associated with the first cargo housing unit of the vehicle, and second inventory information associated with the second cargo housing unit of the vehicle; and first training data for or based on one or more machine learning models associated with the first tag network or a second tag network.

According to one embodiment, the method comprises transmitting a first data alert to a first display device that is different from the data server, the first data alert being based on at least one of the first map data, the first metric data, the first logistical data, or the first training data.

In another embodiment, a system and a computer program can include or execute the method described above. These and other implementations may each optionally include one or more of the following features.

The first tag network comprises a plurality of tags associated with the vehicle including the first tag and the second tag, such that: the plurality of tags are communicatively coupled to each other in a mesh network; the plurality of tags are configured to be in data communication with each other based on the mesh network; the aggregate tag data comprises tag data from each of the plurality of tags based on the data communication; and detection of the first tag by the gateway system enables detection or reception of the aggregate tag data.

According to one embodiment, each tag of the plurality of tags is attached to a cargo housing unit comprised in at least a selection of cargo housing units of the vehicle. The selection of cargo housing units can include the first cargo housing unit and the second cargo housing unit. In addition, the first map data comprises a multidimensional visualization indicating one or more of: location data for each cargo housing unit comprised in at least the selection of cargo housing units of the vehicle such that the location data comprises the first geolocation data and the second geolocation data; and logistics data for each cargo housing unit comprised in at least the selection of cargo housing units of the vehicle such that the logistics data comprises at least the first logistical data.

In some instances, the logistics data indicates one or more of: inventory data associated with each cargo housing unit comprised in at least the selection of cargo housing units of the vehicle; shipment or tracking data associated with each cargo housing unit comprised in at least the selection of cargo housing units of the vehicle; delivery time data associated with each cargo housing unit comprised in at least the selection of cargo housing units of the vehicle; and sequence data associated with an arrangement or organization or structuring or sequencing of each cargo housing unit comprised in the selection of cargo housing units of the vehicle.

In addition, the first metric data comprises telemetric data with the first sensor measurement or the second sensor measurement, such that: the first sensor measurement comprises data measurements associated with monitoring cargo comprised in the first cargo housing unit; and the second sensor measurement comprises data measurements associated with monitoring cargo comprised in the second cargo housing unit.

Furthermore, the telemetric data comprises motive data associated with the vehicle. In one embodiment, the motive data indicates kinematic information associated with at least a selection of cargo housing units of the vehicle including the first cargo housing unit and the second cargo housing unit.

It is appreciated that the kinematic information includes: start motion data associated with the vehicle or the selection of cargo housing units of the vehicle such that the start motion data indicating a movement of the vehicle or the selection of cargo housing units of the vehicle; stop motion data associated with the vehicle or the selection of cargo housing units of the vehicle such that the stop motion data indicating stasis of the vehicle or the selection of cargo housing units; vibration data associated with the vehicle or the selection of cargo housing units or a conveyor means on which the vehicle moves; and collision data associated with the vehicle hitting an object when the vehicle is in motion or in stasis; or a cargo housing unit coupled to the vehicle hitting an object when the vehicle is in motion or in stasis.

It is further appreciated that the first tag or the second tag is comprised in a smart tag or tracking system configured for inter-tag communication within the first tag network or the second tag network. It is worth noting that the first tag network or the second tag network is a mesh network.

In some embodiments, the smart tag or tracking system is powered by a longevity energy source.

In addition, the vehicle referenced above comprises one of a locomotive, a truck, or a drone.

Furthermore, generating the first map data comprises: determining a satellite map for an area, in which the vehicle or a selection of cargo housing units including the first cargo housing unit and the second cargo housing unit is located, using global positioning system (GPS) data associated with at least the first geolocation data or the second geolocation data; overlaying the satellite map with a structural component of the vehicle thereby generating a digital canvas, the structural component comprising the selection of cargo housing units of the vehicle including the first cargo housing unit and the second cargo housing unit; and labeling the digital canvas with a plurality of display elements data identifiers associated with the vehicle or the selection of cargo housing units of the vehicle thereby generating the first map data.

According to one embodiment, the above method comprises providing a live feed to the first display device of at least the first cargo housing unit of the vehicle or the second cargo housing unit of the vehicle, the live feed including real-time or near real-time video data or image data associated with: the first cargo housing unit of the vehicle; or the second cargo housing unit of the vehicle.

In response to the vehicle entering the second tag network, the method further comprises: detecting, based on an anchor system associated with the second tag network, the first tag; receiving, based on the detecting of the first tag by the anchor system, the aggregate tag data or an updated aggregate tag data; generating, based on the aggregate tag data or the updated aggregate tag data, second map data, second metric data, second logistical data, and second training data; and transmitting a second data alert to the first display device or a second display device that is different from the data server or the first display device, the second data alert being based on at least one of the second map data, the second metric data, the second logistical data, or the second training data.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

Illustrated in FIGS. 1A-1B is a high level diagram of an exemplary system 100 for executing the principles disclosed.

FIG. 9 provides an exemplary tabular representation of various elements of the visualization of FIG. 8, according to some implementations.

FIGS. 20A-20B provide exemplary weatherproof casings that can be used to house one or more components of a tag system, an anchor system, and/or a sensor system.

FIGS. 26A and 26B show exemplary switch list implementations associated with a locomotive vehicle where the AI engine is used to optimize or identify a minimum number of car movements (e.g., railcar movements) required to achieve a specific optimal sequence on a specific track.

DETAILED DESCRIPTION

Figure 1A:
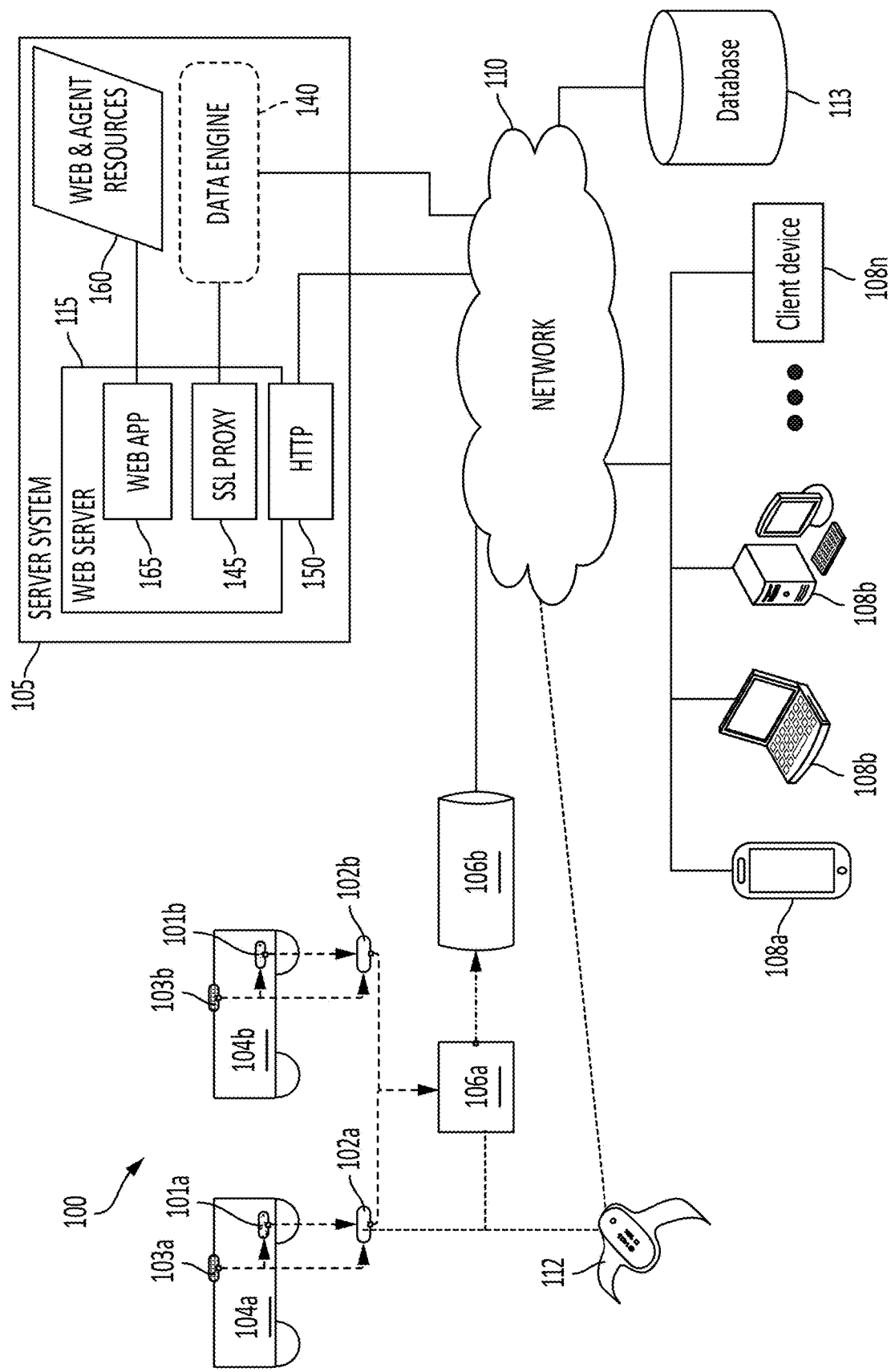

Existing solutions for tracking, analyzing, and monitoring smart data for mobile (e.g., cargo in transit) or stationary cargo (e.g., cargo in a warehouse or a railyard) are plagued with time and safety concerns related to acquiring and transmitting said smart data. To address these among other issues, the disclosed technology significantly reduces the effort needed to acquire smart data associated with a plurality of cargo thereby eliminating the dangerous manual effort expended in moving around and scanning individual cargo in, for example, railcars that may be mobile or stationary.

While the disclosed embodiments indicate an implementation for vehicles such as railcars, it is appreciated that the disclosed techniques are applicable to other cargo carrying vehicles such as trucks, sedans, taxis, buses, ambulances, aircrafts (e.g., drones, cargo planes, etc.), motorcycles, etc.; and/or other cargo containers including cargo carrying receptacles.

According to one embodiment, the reception of smart data from a single tag comprised in a tag network ensures that smart data from the plurality of smart tags within the tag network is also received. The smart data, according to one embodiment, includes location data associated with the vehicle (e.g., vehicle with cargo or load housing unit(s)) to which the smart tag is coupled to. The smart data may also include cargo data (e.g., identifier data of cargo) associated with the cargo on the vehicle. In some implementations, the smart data includes climate data (e.g., temperature data, pressure data, humidity data, etc.) associated with the cargo on the vehicle. The smart data may further include weight data associated with the cargo on the vehicle as well as preservation data (e.g., shelf-life or expiration data) associated with the cargo on the vehicle, according to some embodiments. The smart data may also include hazard data associated with the cargo on the vehicle. According to one embodiment, the smart data also includes: kinematic data (e.g., velocity data, acceleration data, distance data, etc.) of the vehicle; physical data (e.g., shape, size, visual properties of cargo, etc.) associated with the cargo on the vehicle; and geographic data associated with a location through which the vehicle is traversing.

Furthermore, the disclosed are methods, systems/apparatuses, and computer program products facilitate the implementation of dynamic communication methods for smart tag systems. According to one embodiment, a smart tag and/or anchor system and/or associated sensor system can comprise a miniaturized electronic device that can communicate smart data associated with a stationary or mobile cargo. The miniaturized electronic device for a smart tag, for example may have: dimensions in inches of 2"×2.75"×0.7"; or dimensions in inches of 1" ⅜×9" ⅜×0.7"; or dimensions in inches of 1.5"×2.75"×0.7". The miniaturized electronic device for an anchor system, for example, may have: dimensions in inches of 3.3"×5.6"×2.2"; or dimensions in inches of 3.2"×5.6"×2.2"; or dimensions in inches of 3.1"×5.6"×2.2"; or dimensions in inches of dimensions in inches of 3"×5.6"×2.2". Furthermore, the miniaturized electronic device for a sensor system may comprise: a sensor system with area dimensions of 57 mm×20 mm; or a sensor system with area dimensions of 58 mm×22 mm; or a sensor system with area dimensions of 56 mm×22 mm; or a sensor system with area dimensions of 30.66 mm×2.48 mm; or a sensor system with area dimensions of between (45 mm-65 mm)×(15 mm-35 mm).

Furthermore, the miniaturized electronic device may, for example, include a communication system with memory and which requires very low power requirements to enable operation of the smart tag for: over 6 months of operation before repowering the smart tag; or over 1 year of operation before repowering the smart tag; or over 2 years of operation before repowering the smart tag; or over 4 years of operation before repowering the smart tag; or over 5 years of operations before repowering the smart tag; or over 8 years of operation before repowering the smart tag; or over 10 years of operation before repowering the smart tag; or over 12 years of operations before repowering the smart tag. In such cases, the smart tag may be powered by a battery (e.g., coin cell battery) or some other miniaturized longevity energy source that gets depleted over a long period of time (e.g., over 5 years, over 8 years, over 10 years, over 12 years). In other embodiments, the smart tags may include a rechargeable energy source that may be periodically charged by a secondary energy system such as: a solar energy system coupled to the vehicle associated with the cargo and to which the smart tag is coupled; or a secondary energy system such as the energy system of the vehicle (e.g., vehicle battery, alternator, etc.) to which the smart tag is coupled.

Moreover, the smart tag may be part of a network of smart tags (simply called a tag network; or tag or tracker network) that is optimized for inter-tag communication. In particular, each smart tag comprised in the tag network may have a miniaturized communication system that enables inter-tag communication between the smart tags comprised in the tag network. In addition to communicating with each other, the smart tags may also communicate with one or more sensors that, for example, capture a plurality of data associated with the plurality of cargo comprised in the vehicles to which the smart tags are coupled. According to one embodiment, the one or more sensors may comprise at least one of: accelerometers for capturing motion data including velocity or acceleration data of the vehicle associated with the cargo; vehicle health sensor that monitors vehicle health data of the components (e.g., bearing, axles, or other vehicular systems) comprised in the vehicle associated with the cargo; load sensors that determine the presence or absence data of a load/cargo on the vehicle; barrier position sensors that detect an open or closed status data of one or more doors, barriers, hatches, or valves around the load housing unit on the vehicle; security seal sensors for determining breach data associated with access to the load on the vehicle; an impact sensor configured to detect impact or shock data associated with one or more of the vehicle or the load on the vehicle; air quality sensors for monitoring gaseous data such as ozone data, and particulate matter data around the vehicle associated with the cargo; biomedical sensors that can detect specific biological data, chemical data or physical process data in a space around the cargo on the vehicle; camera systems for capturing image data associated with the cargo on the vehicle; chemical sensors that can detect and transmit chemical information including chemical concentration data, chemical pressure data, and particle activity data of the cargo on the vehicle; flow sensors that can measure the flow rate data of fluidic cargo on the vehicle; gyroscopic sensors configured to measure stability data associated with the vehicle and/or cargo; humidity sensors that can measure moisture data and/or air temperature data of a surrounding environment of the cargo on the vehicle; level sensors that can determine a level data of fluidic cargo on the vehicle; motion sensors that can detect motion data within the load housing unit on vehicle; pressure sensors configured to measure pressure data associated with the cargo (e.g., fluidic cargo) or pressure data around the cargo on the vehicle; proximity sensors that detect approach data of objects relative to the vehicle associated with the cargo; or temperature sensors configured to measure temperature data of or around the vehicle associated with the cargo. It is appreciated that the data from the one or more sensors may be aggregated or otherwise received by one or more smart tags to generate the smart data for a plurality of cargo or loads and is transmitted by one tag comprised in the one or more smart tags for cargo tracking, cargo analysis, and cargo monitoring purposes.

In an exemplary embodiment, the disclosed techniques facilitate automating the acquisition and analysis of smart data for a plurality of railcars or a plurality of stationary or moving cargo assets without the need to individually scan each railcar comprised in the plurality of railcars or each cargo asset comprised in the plurality of stationary or moving cargo assets. In particular, the disclosed system enables the implementation of a tag network that enables communication between: a plurality of independent smart tags that are coupled to a plurality of load housing units associated with one vehicle within a tag network; or a plurality of independent smart tags that are coupled to load housing units associated with a plurality of vehicles within a tag network. Once a single smart tag within the tag network is detected, smart data associated with the plurality of smart tags within a localized section of the tag network or within the entirety of the tag network can be determined and analyzed. This beneficially: optimizes logistical operations including speeding up the collection of smart data associated with stationary or moving cargo; minimizes errors in aggregating the smart data due to human errors; enhances remote analysis of the smart data; facilitates real-time or near real-time generation and reporting of inventory data to stakeholders based on the smart data; maintains data durability backed by a redundant cloud data processing and storage platform; provides visual and textual insights based on the generation of real-time or near real-time visualizations of one or more vehicles (e.g., railcars or cargo housing units) based on the smart data for compliance and verification purposes.

According to some embodiments, the disclosed technology enables tracking, analysis, and monitoring of a plurality of cargo assets (e.g., stationary or otherwise) that are separated from each other by a separation distance of at least 15 feet, or at least 20 feet, or at least 25 feet, or at least 30 feet, or at least 35 feet, or at least 40 feet, or at least 45 feet, or at least 50 feet, or at least 55 feet, or at least 60 feet. Moreover, the disclosed smart tags can communicate with one or more sensors coupled to vehicles (e.g., cargo or load housing units on the vehicles) to which the smart tags are also coupled such that the one or more sensors provide physical reads of smart data including impact data, pressure data, load status data, and temperature data, or other climatic conditions associated with a given cargo. Thus, both storage and in-transit operators can be notified of potential mechanical problems and/or cargo issues associated with individual railcars in real time or near real-time.

According to one embodiment, the disclosed technology facilitates inter-tag communication to automatically locate a plurality of smart tags within a tag network with each tag being coupled to a vehicle (e.g., a railcar) such that the detection of one smart tag in the tag network enables the triangulation or colocation or detection of the remaining smart tags in the tag network. It is appreciated that the detection of a specific smart tag in the tag network indicates the detection of the vehicle (e.g., load housing unit of the vehicle) to which the tag is coupled which in turn indicates the detection or reception of smart data associated with the cargo on said vehicle. In some implementations, the smart data may indicate, among other information, real-time or near real-time location data indicating a mobile or stationary status associated with the vehicle.

According to one embodiment, the tag network comprises a plurality of components including: smart tags that are attached or coupled to load housing units of vehicles; anchor systems (e.g., miniaturized anchor systems) optimally positioned about an area of interest (e.g., a pathway of the vehicles) through which the vehicles travel and which receive the smart data from the smart tags; gateway systems that electronically communicate with the anchor systems and which serve as relay or smart data transmission points in the tag network; and server systems that receive (e.g., from the gateway systems) and/or analyze smart data and/or facilitate monitoring of the vehicle or cargo thereon and/or facilitate transmission of commands (e.g., update, monitoring, or configuration commands) to the gateway systems, and/or anchor systems, and/or smart tags, and/or sensors in communication with the smart tags. It is appreciated that the server systems, for example, may in turn communicate with client devices including transmitting smart data associated with a one or more cargo to a client device and/or receive commands from the client devices which are then relayed to one or more devices (e.g., smart tags and/or sensors) within the tag network via the gateway systems.

Furthermore, the disclosed technology is configured to enable the usage of tag systems that conform to form factors associated with Associated Electrical Industries (AEI) requirements with AEI circuitry systems. The disclosed technology further enables the capture, control, and monitoring of telemetric data via the one or more sensors within the tag network. According to one embodiment, the disclosed technology enables the use of a global positioning system including a high intra railyard positioning system associated with the tag network. According to some implementations, the disclosed techniques involve the automatic transmission of smart data from at least one tag comprised in the network of tag when said smart tag is proximal to a given anchor system. For example, when said smart tag is within a distance of at least 5 feet, or at least 10 feet, or at least 20 feet, or at least 30 feet, or at least 40 feet, or at least 50 feet, or at least 60 feet away from the given anchor system, smart data may be transmitted from said smart sensor which may then be forwarded to the gateway system which then relays said smart data to the server system as the case may be. According to some embodiments, the tag network enables the use of a scanning device that can either transmit smart data to an anchor system or directly to the gateway device.

From a hardware/firmware perspective, one or more of the smart tags, the anchor systems, the sensors, or the gateway systems may comprise electronic circuits with communication capabilities as well as memory systems, processing chips, and energy systems (e.g., battery). According to one embodiment, a firmware or other software installed on one or more of the smart tags, and/or anchor systems, and/or sensors may define how devices within the tag network communicate with each other and/or transmit smart data to the server systems comprised in the tag network and/or receive one or more commands from the server systems comprised in the tag network. As previously noted, one or more of the smart tags, anchor systems, and sensor systems may be miniaturized in order not to have bulky electronic systems within the tag network that can obstruct cargo and/or vehicle mobility. Such miniaturization also facilitates the installation or coupling of a plurality of smart tags and/or sensors and/or anchor systems within the tag network to enhance the resolution of the smart data. Furthermore, the miniaturization of the smart tags and/or anchor systems, and/or sensors may also enhance the aesthetic appeal for users to implement the disclosed technology. It is appreciated that the disclosed smart tags, and/or anchor systems, and/or sensors may be fabricated to include or combine one or more of: a Radio Frequency Identification (RFID) circuit; Bluetooth mesh technology and/or 5G mesh chip technology and/or Wi-Fi mesh chip technology and/or ultra-wideband (UWB) mesh chip technology, and/or Thread mesh chip technology, and/or ZigBee mesh chip technology, and/or Low Energy mesh chip technology; and/or magnetic or screw mounting options; and/or a high rating (e.g., IP67 rating) weatherproof (e.g., waterproof, temperature proof, windproof, etc.) casing.

In some implementations, the disclosed technology is directed to a smart tracking process involving the use of one or more trackers in a tracker network. According to one embodiment, tracker data associated with a tracker within the tracker network may be detected. The tracker data, for example, may comprise location data associated with a plurality of trackers within the tracker network. Furthermore, the tracker network may be comprised in a tag or tracker network such as those described above. In other embodiments, the tracker network is separate from and/or directly coupled to a cloud network or a network that facilitates global positioning system (GPS) communications. Moreover, a tracker comprised in the tracker network may be used to track (e.g., based on the tracker data) and/or alert a user (e.g., autonomous user) of the tracker as well as facilitate proximity notifications to the user of the tracker as the case may require. These aspects are further discussed below.

System Environment

Figure 1B:
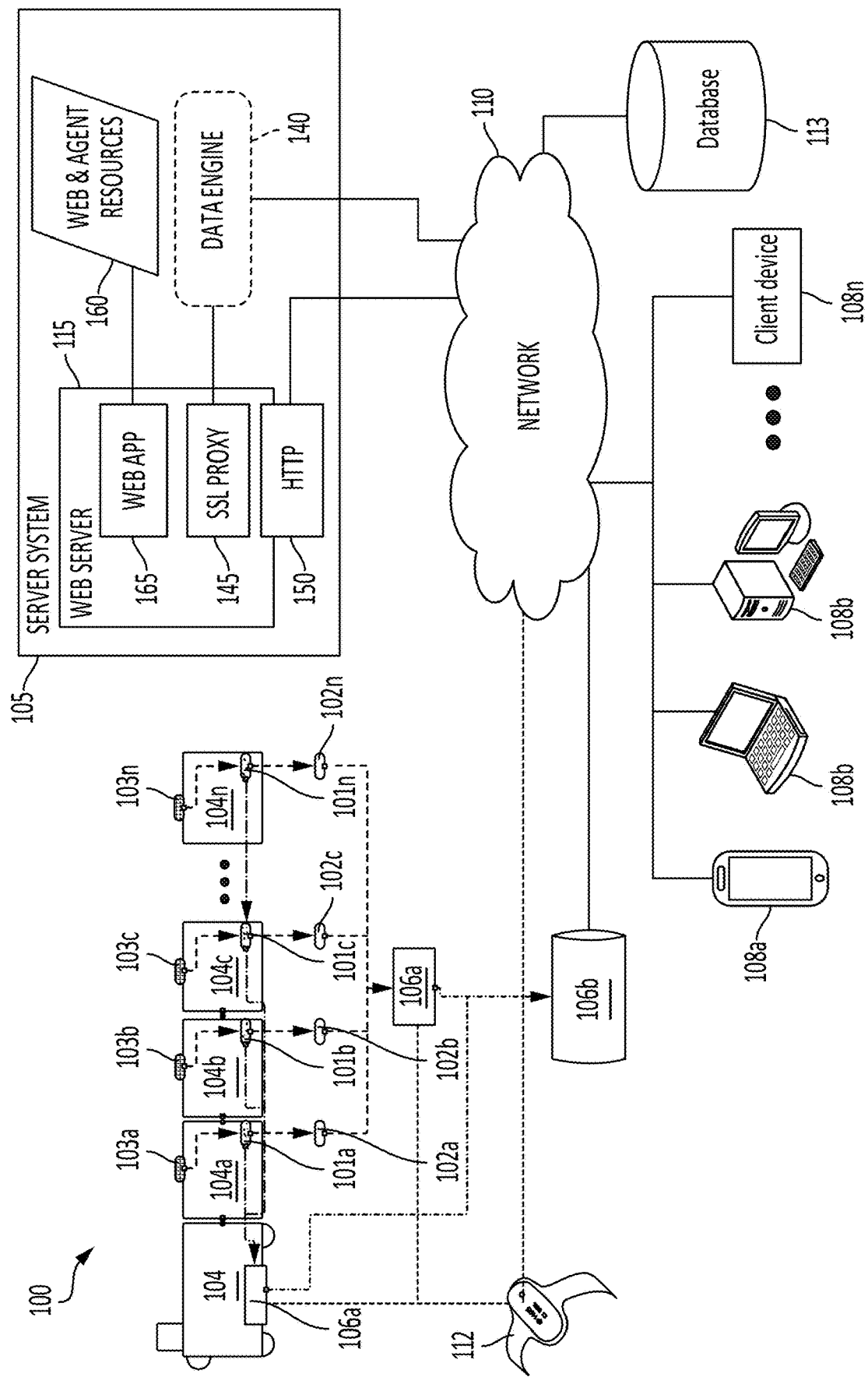

Illustrated in FIGS. 1A-1B is a high level diagram of an exemplary system 100 for executing the principles disclosed. In particular, FIG. 1A depicts an implementation for managing and/or communicating smart data associated with stationary cargo while FIG. 1B depicts an implementation for managing and/or communicating smart data for both mobile and stationary cargo.

In the illustrated implementations, the system 100 may include a server system 105 coupled to a network 110. The system 100 may also include endpoint devices 108a . . . 108n and a database 113 communicatively coupled via the network 110. Moreover, the system 100 can also include one or more vehicles 104a . . . 104n which can have one or more smart tags 101a . . . 101n communicatively coupled to each other via one or more anchor systems 102a . . . 102n. In addition, the one or more smart tags 101a . . . 101n may also be communicatively coupled to sensors 103a . . . 103n and to a gateway systems 106a and 106b which in turn are connected to the network 110. Also coupled to the network 110 is a smart tracker 112 which may also be coupled to the gateway systems 106a and 106b. While a single server system 105, a single database 113, and a single smart tracker 112 are illustrated, the disclosed principles and techniques can be expanded to include multiple server systems, multiple databases, and multiple trackers.

In some embodiments, the server system 105 may include a computing device such as a mainframe server, a content server, a communication server, a laptop computer, a desktop computer, a handheld computing device, a smart phone, a wearable computing device, a tablet computing device, a virtual machine, a cloud-based computing solution and/or a cloud-based service, and/or the like. The server system 105 may include a plurality of computing devices configured to communicate with one another and/or implement the techniques described herein.

Figure 2:
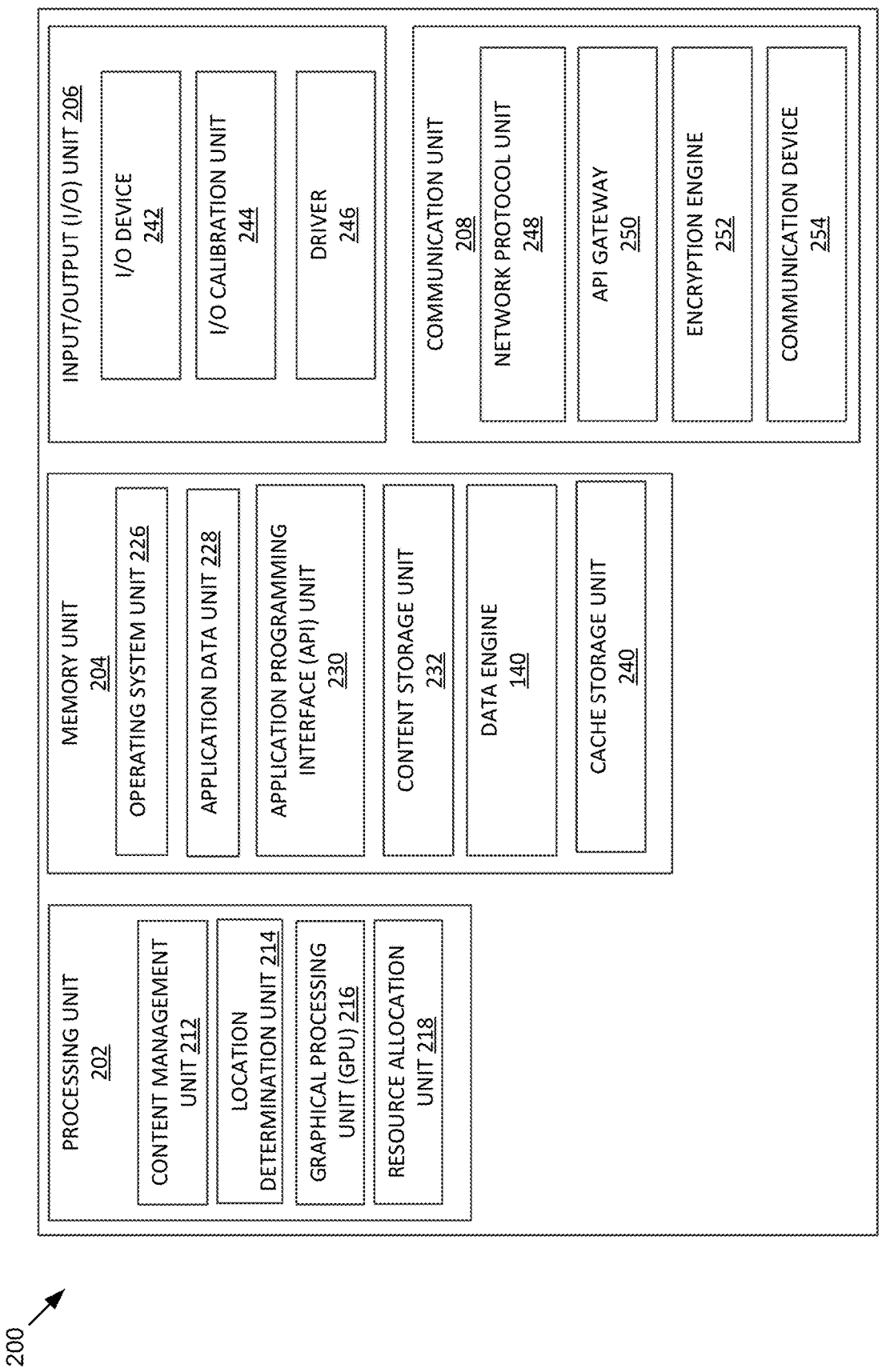
FIG. 2 is a functional block diagram of a computing environment associated with the disclosed techniques.
Figure 3:
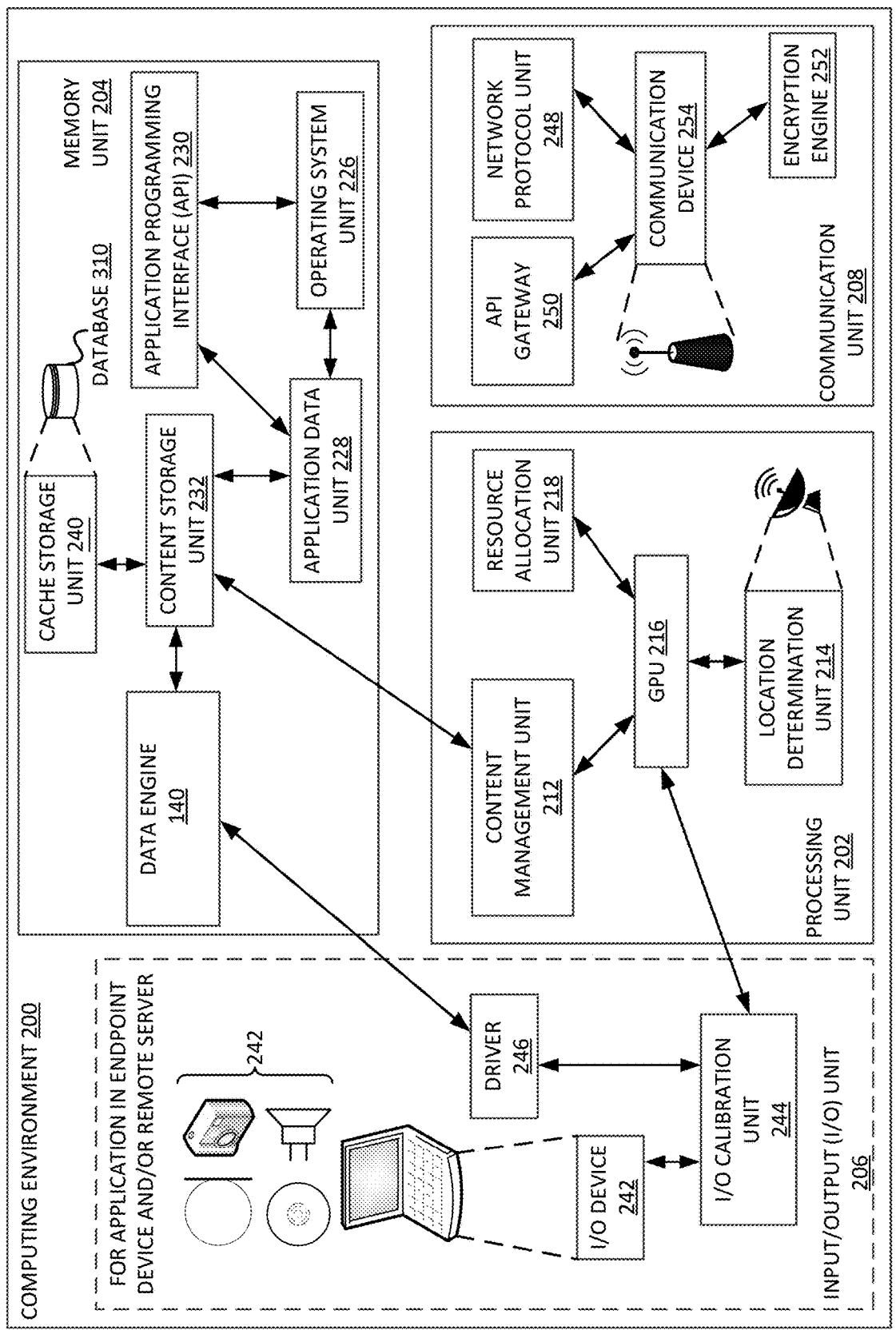
FIG. 3 is a detailed system diagram of the computing environment of FIG. 2.

The server system 105 may include various elements of a computing environment as described in association with the computing environment 200 of FIG. 2 and/or FIG. 3. For example, the server system 105 may include processing unit 202, a memory unit 204, an input/output (I/O) unit 206, and/or a communication unit 208. The server system 105 may further include subunits and/or other modules for performing the various operations disclosed.

Further, the server system 105 may include a web server 115, data engine 140, and a web and agent resources 160. The web server 115, the data engine 140 and the web and agent resources 160 are coupled to each other and to the network 110 via one or more wired or wireless signal connections.

The web server 115 may include a secure socket layer (SSL) proxy 145 for establishing HTTP-based connectivity 150 between the server system 105 and other devices or systems coupled to the network 110. Other forms of secure connection techniques, such as encryption, may be employed on the web server 115 and across other systems coupled to the network 110. Additionally, the web server 115 may deliver artifacts (e.g., binary code, instructions, data, etc.) to the data engine 140 either directly via the SSL proxy 145 and/or via the network 110. Additionally, the web and agent resources 160 of the server system 105 may be provided to the endpoint devices 108a . . . 108n via the web app 165 on the web server 115. The web and agent resources 160 may be used to render a web-based graphical interface (GUI) via, for example, a browser running on the endpoint devices 108a . . . 108n.

The data engine 140 may either be on the server system 105 and/or have components on the endpoint devices 108a . . . 108n. Data engine 140 may include one or more data modules configured to execute and/or initiate execution of the techniques disclosed. For example, the data engine may facilitate executing: computing processes associated with dynamically communicating smart data in a tag network; computing processes associated with analyzing smart data within a tag network; and tracking computing processes.

In some embodiments, the data engine 140 may access an operating system of the endpoint devices 108a . . . 108n in order to execute the disclosed operations. For instance, the data engine 140 may gain access into the operating system 180 in order to operate on smart data and/or initiate tracking operations and/or display visualizations associated with processing smart data or tracking operations.

The network 110 may include a plurality of networks. For instance, the network 110 may include any wired and/or wireless communication network that facilitates communication between the server system 105, the database 113, and the endpoint devices 108a . . . 108n. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, a 5G network, and/or the like. It is appreciated that the coupling of the network 110 to the various elements of FIGS. 1A-1B represents one or more of a tag or tracker network, according to some embodiments.

Returning to FIGS. 1A-1B, the database 113 may comprise one or more storage devices that can store data, information, and instructions used by the server system 105 and/or by the endpoint devices 108a . . . 108n. The stored information may include information about users, information about tags (e.g., smart tags 101a . . . 101n), information associated anchor systems 102a . . . 102n, information associated with the sensor systems 103a . . . 103n, information associated with mobile or stationary cargo on the vehicles 104a . . . 104n, information associated with the server system 105, information associated with gateway systems 106a and 106b, and information associated with endpoint devices 108a . . . 108n.

The one or more storage devices mentioned above in association with the database 113 can be non-volatile memory or similar permanent storage device and media. For example, the one or more storage devices may include a hard disk drive, a CD-ROM device, a DVD-ROM device, a DVD-RAM device, a DVD-RW device, a flash memory device, solid state media, or some other mass storage device known in the art for storing information on a more permanent basis.

While the database 113 is shown as coupled to the server system 105 and to the endpoint devices 108a . . . 108n via the network 110, the data in the database 113 may be replicated, in some embodiments, on the server system 105 and/or the endpoint devices 108a . . . 108n. That is to say that a local copy of the data in the database 113 may be stored on the server system 105 and/or on the endpoint devices 108a . . . 108n. This local copy may be synched with the database 113 so that when there are any changes to the information in the database 113, the local copy is also accordingly updated in real-time or in near-real-time to be consistent with the information in the database 113.

Turning back to FIGS. 1A-1B, the endpoint devices 108a . . . 108n may be a handheld computing device, a smart phone, a tablet, a laptop computer, a desktop computer, a personal digital assistant (PDA), a smart device, a wearable device, a biometric device, a computer server, a virtual server, a virtual machine, and/or a communication server. In some embodiments, the endpoint devices 108a . . . 108n may include a plurality of computing devices configured to communicate with one another and/or implement the techniques described in this disclosure. It is appreciated that smart data may be generated using the data engine 140 within the server system 105 or modules associated with the data engine 140 on endpoint devices 108a . . . 108n.

Turning back to FIGS. 1A-1B, the system 100 may include a plurality of smart tags 101a . . . 101n communicatively coupled to one or more anchor systems 102a . . . 102n. It is appreciated that the number or quantity of the smart tags 101a . . . 101n is substantially greater than the number of the one or more anchor systems 102a . . . 102n. Moreover, each smart tag comprised in the smart tags 101a . . . 101n may have one or more sensors 103 communicatively coupled to it to provide a plurality of monitoring data for cargos comprised in the plurality of vehicles 104a . . . 104n. For example, each smart tag may be directly coupled to one of a plurality of load or cargo housing units of the vehicles 104a . . . 104n.

In addition, the system 100 may also include a smart tracker 112 which can be in direct communication with the network 110 and/or communicate with the network 110 via gateway systems 106a and 106b. These aspects are further discussed below in association with the exemplary flowcharts. It is appreciated that at least one or more of the smart tags 101a . . . 101n and anchor systems 102a . . . 102n may comprise miniaturized computing systems that can be powered by a longevity energy such as those discussed above. It is also appreciated that the gateway system 106b may comprise one or more databases similar to the database 113.

The various elements of the smart tags 101a . . . 101n, the anchor systems 102a . . . 102n, the sensor systems 103a . . . 103n, the server system 105, the gateway systems 106a and 106b, and the endpoint devices 108a . . . 108n shown in FIGS. 1A-1B are discussed in association with the computing environment 200 of FIGS. 2-3. For example, elements of the aforementioned systems may include or have one or more of: a processing unit 202, memory unit 204, input/output (I/O) unit 206, and/or a communication unit 208. The endpoint devices 108a . . . 108n may also include subunits and/or other computing modules as provided in this disclosure for performing operations associated with: dynamically communicating smart data in a tag network; analyzing smart data within a tag network; and executing tracking computing operations.

FIGS. 2-3 illustrate exemplary functional and system diagrams of a computing environment 200, according to some embodiments of this disclosure. Specifically, FIG. 2 provides a functional block diagram of the computing environment 200, whereas FIG. 3 provides a detailed system diagram of the computing environment 200.

As seen in FIGS. 2-3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 110. The computing environment 200 may be implemented on general-purpose hardware and/or specifically purposed hardware as the case may be. In particular, the computing environment 200 and any units and/or subunits of FIGS. 2-3 may be included in one or more elements of system 100 as described above.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIGS. 1A-1B. Additionally, any actions described herein as being performed by a processor may be taken by the processing unit 202 of FIG. 2-3 alone and/or by the processing unit 202 in conjunction with one or more additional processors, units, subunits, elements, components, devices, and/or the like. Further, while one processing unit 202 may be shown in FIGS. 2-3, multiple processing units may be present and/or otherwise included in the computing environment 200 or elsewhere in the overall system (e.g., system 100 of FIGS. 1A-1B). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, smart data content, media content, tracking content, or any combination thereof. In some instances, content on which the content management unit 212 may operate includes device information, user interface data, images, text, themes, audio files, video files, documents, and/or the like. Additionally, the content management unit 212 may control the audio-visual environment and/or appearance of application data during execution of various processes. In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically purposed hardware elements for the location determination unit 214 to acquire, measure, and/or otherwise transform location information.

The GPU 216 may facilitate generation, modification, analysis, processing, transmission, and/or presentation of content described above, as well as any data (e.g., smart data, tracker data, etc.) described herein. In some embodiments, the GPU 216 may be used to render content for presentation on a computing device. The GPU 216 may also include multiple GPUs and therefore may be configured to perform and/or execute multiple processes in parallel. In some implementations, the GPU 216 may be used in conjunction with the data engine 140, and/or other subunits associated with the memory unit 204, the I/O unit 206, the communication unit 208, and/or a combination thereof.

The resource allocation unit 218 may facilitate the determination, monitoring, analysis, and/or allocation of computing resources throughout the computing environment 200 and/or other computing environments. For example, the computing environment may facilitate a high volume of data (e.g., smart data, tracker data, etc.), to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand and therefore require coordination at various times during operation of the computing environment 200. Accordingly, the resource allocation unit 218 may include sensors and/or other specially purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment 200 while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data (e.g., smart data or tracker data) during operation of computing environment 200. For example, memory unit 204 may be used for storing, recalling, and/or updating smart data and/or tracker data as well as other data associated with, resulting from, and/or generated by any unit, or combination of units and/or subunits of the computing environment 200. In some embodiments, the memory unit 204 may store instructions, code, and/or data that may be executed by the processing unit 202. For instance, the memory unit 204 may store code that execute operations associated with one or more units and/or one or more subunits of the computing environment 200. For example, the memory unit 204 may store code for the processing unit 202, the I/O unit 206, the communication unit 208, and for itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as a local database of the endpoint devices 108a . . . 108n discussed with reference to FIGS. 1A-1B. Additionally, or alternatively, one or more secondary databases (e.g., the database 113 discussed with reference to FIGS. 1A-1B) located remotely from computing environment 200 may be used and/or accessed by memory unit 204. In some embodiments, memory unit 204 and/or its subunits may be local to the server system 105 and/or the endpoint devices 108a . . . 108n and/or remotely located relative to the server system 105 and/or the endpoint devices 108a . . . 108n.

Turning back to FIG. 2, the memory unit 204 may include subunits such as an operating system unit 226, an application data unit 228, an application programming interface (API) unit 230, a content storage unit 232, a data engine 140, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described.

The operating system unit 226 may facilitate deployment, storage, access, execution, and/or utilization of an operating system used by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, the endpoint devices 108a . . . 108n may be required to download, install, access, and/or otherwise use a software application (e.g., web application 165) to facilitate performance of the techniques disclosed. As such, application data unit 228 may store any information and/or data associated with an application. Application data unit 228 may further store various pieces of information and/or data associated with the operation of an application and/or computing environment 200 as a whole, such as a status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or used by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the server system 105 and the endpoint devices 108a . . . 108n to communicate with each other.

The content storage unit 232 may facilitate deployment, storage, access, and/or utilization of information associated with performance of the disclosed techniques. In some embodiments, content storage unit 232 may communicate with content management unit 212 to receive and/or transmit content files (e.g., media content, smart data content, tracker data content, etc.).

Data engine 140 may be used to execute one or more operations disclosed such as: computing operations associated with dynamically communicating smart data in a tag network; computing operations associated with analyzing smart data within a tag network; and computing tracking operations. These aspects are further discussed in association with FIGS. 4A-6 as well as FIGS. 9-13.

The cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing the processes described herein. For example, elements of the I/O unit 206 may be used to receive input from a user of the endpoint devices 108a . . . 108n and or from the server system 105. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally, and/or alternatively, I/O device 242 may include a display (e.g., a display associated with the smart tracker 112 of FIGS. 1A-1B), a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with: detecting a smart tag or a tracker; displaying visual representations associated with smart data; communicating smart data; and analyzing smart data and/or tracker data.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently.

In some embodiments, I/O calibration unit 244 may use a driver 246 (or multiple drivers) to calibrate I/O device 242. For example, driver 246 may include software that is to be installed by I/O calibration unit 244 so that an element of computing environment 200 (or an element of another computing environment) may recognize and/or integrate with I/O device 242 for the operations disclosed.

The communication unit 208 may facilitate establishment, maintenance, monitoring, and/or termination of communications between computing environment 200 and other computing environments, third party server systems, and/or the like (e.g., between the server system 105 and the endpoint devices 108a . . . 108n). Communication unit 208 may also facilitate internal communications between various elements (e.g., inter-tag communication) of computing environment 200. In some embodiments, communication unit 208 may include a network protocol unit 248, an API gateway 250, an encryption engine 252, and/or a communication device 254. Communication unit 208 may include hardware and/or software elements.

The network protocol unit 248 may facilitate establishment, maintenance, and/or termination of a communication connection for computing environment 200 by way of a network. For example, network protocol unit 248 may detect and/or define a communication protocol required by a particular network and/or network type. Communication protocols used by network protocol unit 248 may include Wi-Fi protocols, Li-Fi protocols, cellular data network protocols, Bluetooth® protocols, WiMAX protocols, Ethernet protocols, powerline communication (PLC) protocols, mesh network protocols, 5G network protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing the disclosed workflows.

The API gateway 250 may allow other devices and/or computing environments to access API unit 230 of memory unit 204 of computing environment 200. For example, an endpoint device comprised in endpoint devices 108a . . . 108n may access API unit 230 of computing environment 200 via API gateway 250. In some embodiments, API gateway 250 may be required to validate user credentials associated with a user of an endpoint devices 108a . . . 108n prior to providing access to API unit 230 to a user. API gateway 250 may include instructions for computing environment 200 to communicate with another device and/or between elements of the computing environment 200.

The encryption engine 252 may facilitate translation, encryption, encoding, decryption, and/or decoding of information received, transmitted, and/or stored by the computing environment 200. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for computing environment 200 and or between two or more computing environments 200. In one embodiment, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or other transceiver devices used for communication purposes.

EMBODIMENTS

Figure 4A:
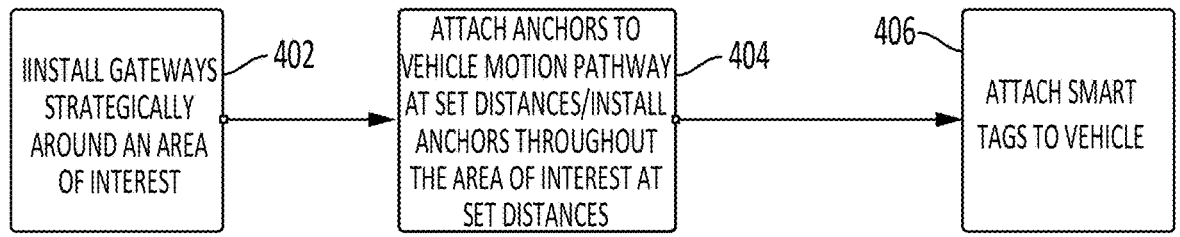
FIGS. 4A-4B show exemplary workflows for installing smart tags and generating smart data, respectively, according to some embodiments.
Figure 4B:
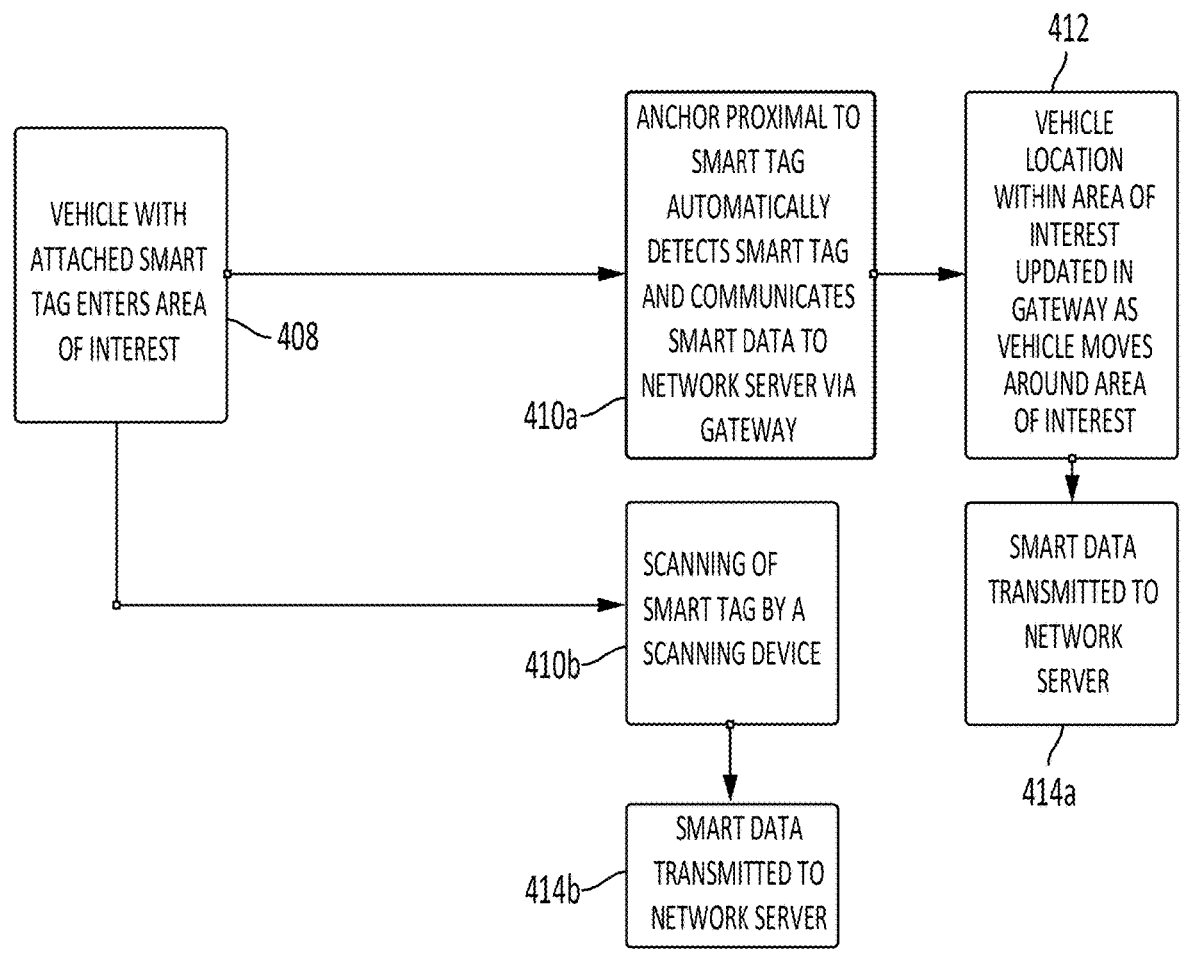

FIGS. 4A-4B show exemplary workflows for installing smart tags and generating smart data, respectively, according to some embodiments. At block 402 of FIG. 4A, gateway systems may be strategically installed or fitted to various structures within an area of interest. The area of interest may include an area within which a tag network or a tracker network is implemented. At block 404, anchor systems may be attached at set distances to various pathways of vehicles (e.g., railcars, trucks, drones, etc.) within the tag or tracker network. According to one embodiment, the area within which the tag or tracker network is implemented comprises a yard, a railyard, a parking lot, a hangar, a logistics area, a secure facility, etc. Smart tags may also be fitted to the aforementioned vehicles together with sensors as needed to initiate the workflow of FIG. 4B.

Turning to FIG. 4B, a vehicle to which a smart tag is coupled enters, at block 408, an area within which the tag or tracker network is implemented. The vehicle, for example, may comprise a plurality of cargo or load housing units that carry a plurality of loads. At block 410a, an anchor proximal to a first smart tag coupled to the vehicle (e.g., coupled to a specific load or cargo housing unit of the vehicle) may automatically detect the first smart tag and communicate, based on the detection, smart data to a server system via a gateway system for further analysis. Furthermore, location data of the vehicle may be updated using the gateway system within the tag or tracker network as the vehicle moves within the tag or tracker network. Smart data (e.g., smart data associated with a plurality of smart tags in the tag or tracker network) or updated smart data may be transmitted to the network server at block 414 while the vehicle moves within the tag or tracker network. It is appreciated that the workflow of FIG. 4B can take an alternative path where a scanning device scans, at block 410b, a single smart tag following which smart data is transmitted at block 414b, to the server system such that the smart data is associated with a plurality of smart tags comprised in the tag or tracker network. It is appreciated that, an endpoint device or system may access or receive or retrieve the smart data or portions thereof, from the server system.

Figure 5A:
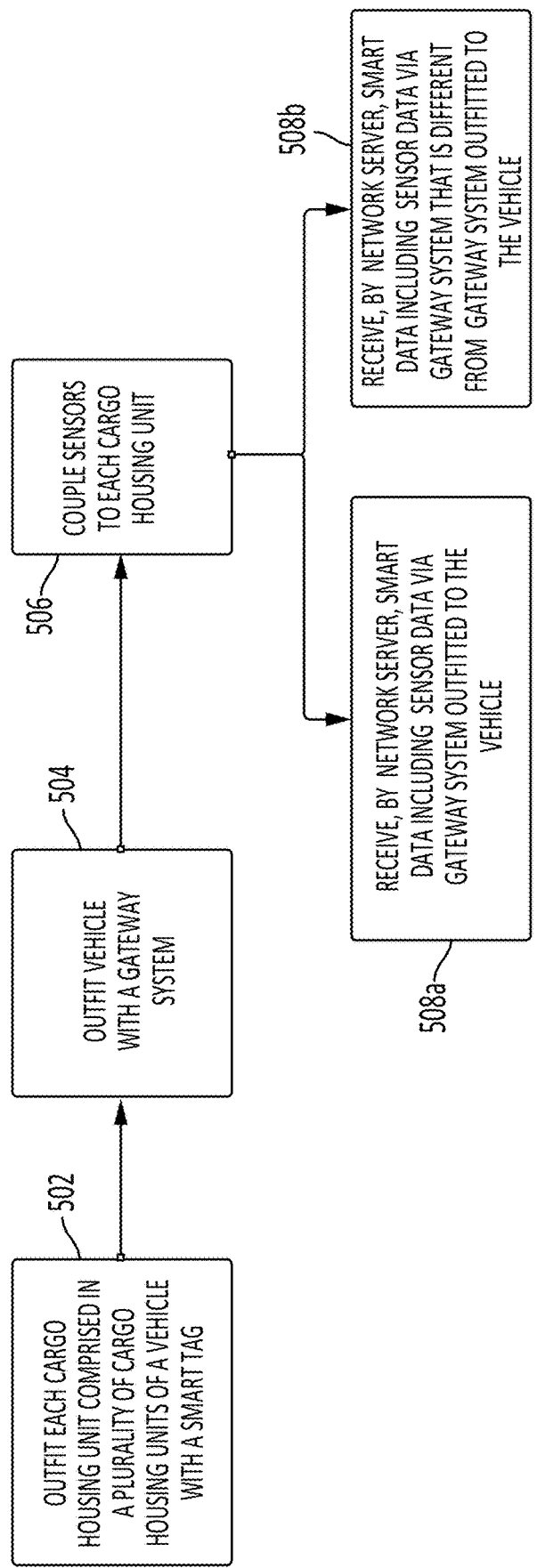
FIGS. 5A-5B show other exemplary workflows for installing smart tags and generating smart data, respectively, according to some embodiments.
Figure 5B:
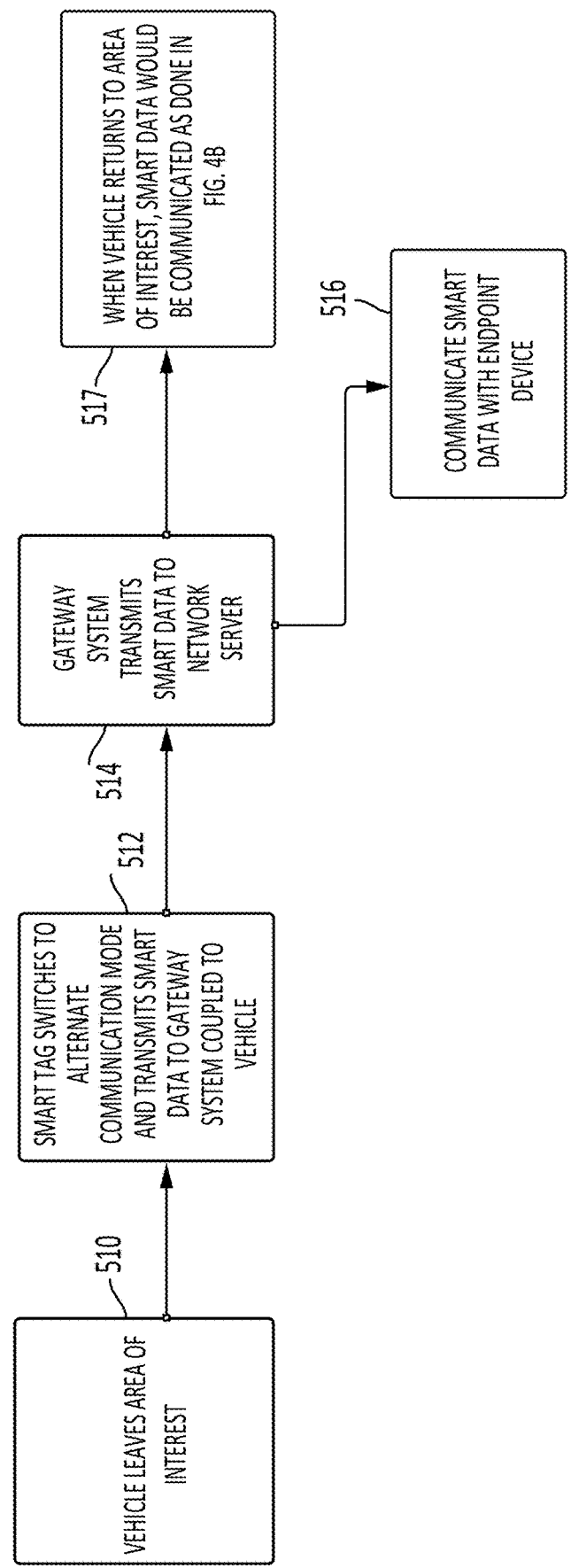

FIGS. 5A-5B show other exemplary workflows for installing smart tags and generating smart data, respectively, according to some embodiments. At block 502 of FIG. 5A, a vehicle having a plurality of cargo or load housing units may have each cargo housing unit fitted with a smart tag. The vehicle itself (e.g., a propulsion section of the vehicle) may be outfitted with a gateway system at block 504. In addition, one or more sensors may be communicatively coupled to each of the smart tags coupled to the cargo or to load housing units of the vehicle at block 506. The workflow then branches out to one of receiving, using a smart tag coupled to a cargo or load housing unit at block 508a, sensor data from corresponding sensors in addition to cargo location data such that the received data comprises smart data associated with the plurality of smart tags coupled to the plurality of cargo or load housing units. The smart data may be transmitted via, for example, the gateway system coupled to the vehicle to the server system of the tag or tracker network. In another embodiment, the network server may receive, at block 508b, the smart data via a gateway system that is different from the gateway system outfitted to the vehicle.

Turning to FIG. 5B, a vehicle to which a smart tag is coupled and to which a gateway system is outfitted leaves, at block 510, the tag or tracker network. A communication protocol associated with the gateway system is activated to enable communication (e.g., remote communication) of smart data associated with one or more tags coupled to the vehicle back to the tag or tracker network. This effectively enables transmission of the smart data using the gateway system coupled to the vehicle, at block 514, to the server system of the tag or tracker network. According to one embodiment, an endpoint device or system may access or receive the smart data or portions thereof, from the server system at block 516. When the vehicle returns to an area within the tag or tracker network, the communication protocol of the anchor system coupled to the vehicle may be deactivated such that a gateway system within the tag or tracker network, and which is different from the gateway system coupled to the vehicle may communicate or transmit received smart data from the smart tags on the vehicle, at block 517, to the server system of the tag or tracker network as done in FIG. 4B.

Figure 6:
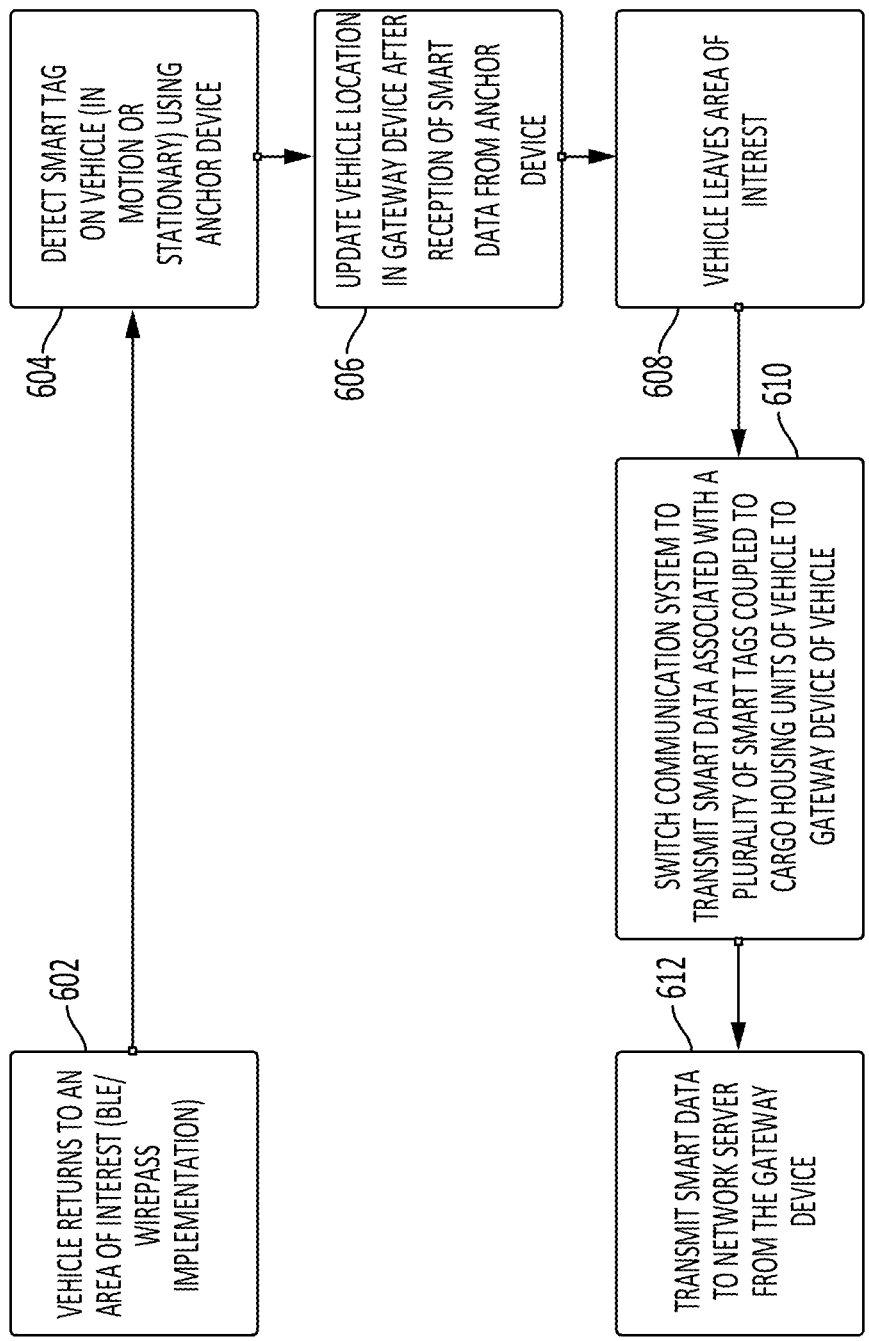
FIG. 6 shows an exemplary implementation that incorporates elements from FIGS. 4B and 5B.

FIG. 6 shows an exemplary implementation that incorporates elements from FIGS. 4B-5B. At block 602, a vehicle to which a gateway system is outfitted, and which has a plurality of cargo or load housing units with corresponding smart tags enters a tag or tracker network. Entrance into the tag or tracker network automatically deactivates a communication protocol of the gateway system (referred herein as first gateway system) outfitted to the vehicle such that a gateway system (referred herein as second gateway system) of the tag or tracker network, and which is different from the gateway system attached to the vehicle communicates smart data associated with the corresponding smart tags attached to the cargo or load housing units of the vehicle to the network server by detecting, at block 604, a smart tag (e.g., first smart tag) comprised in the corresponding smart tags coupled to the vehicle. At block 606, the second gateway system may update location data associated with the vehicle based on the smart data received from the first smart tag. Moreover, the vehicle can leave the tag or tracker network at block 608 following which a communication protocol of the first gateway system is activated to enable transmission of the smart data associated with the corresponding smart tags on the cargo or load housing units of the vehicle using the first gateway system to the server system at block 612.

Figure 7:
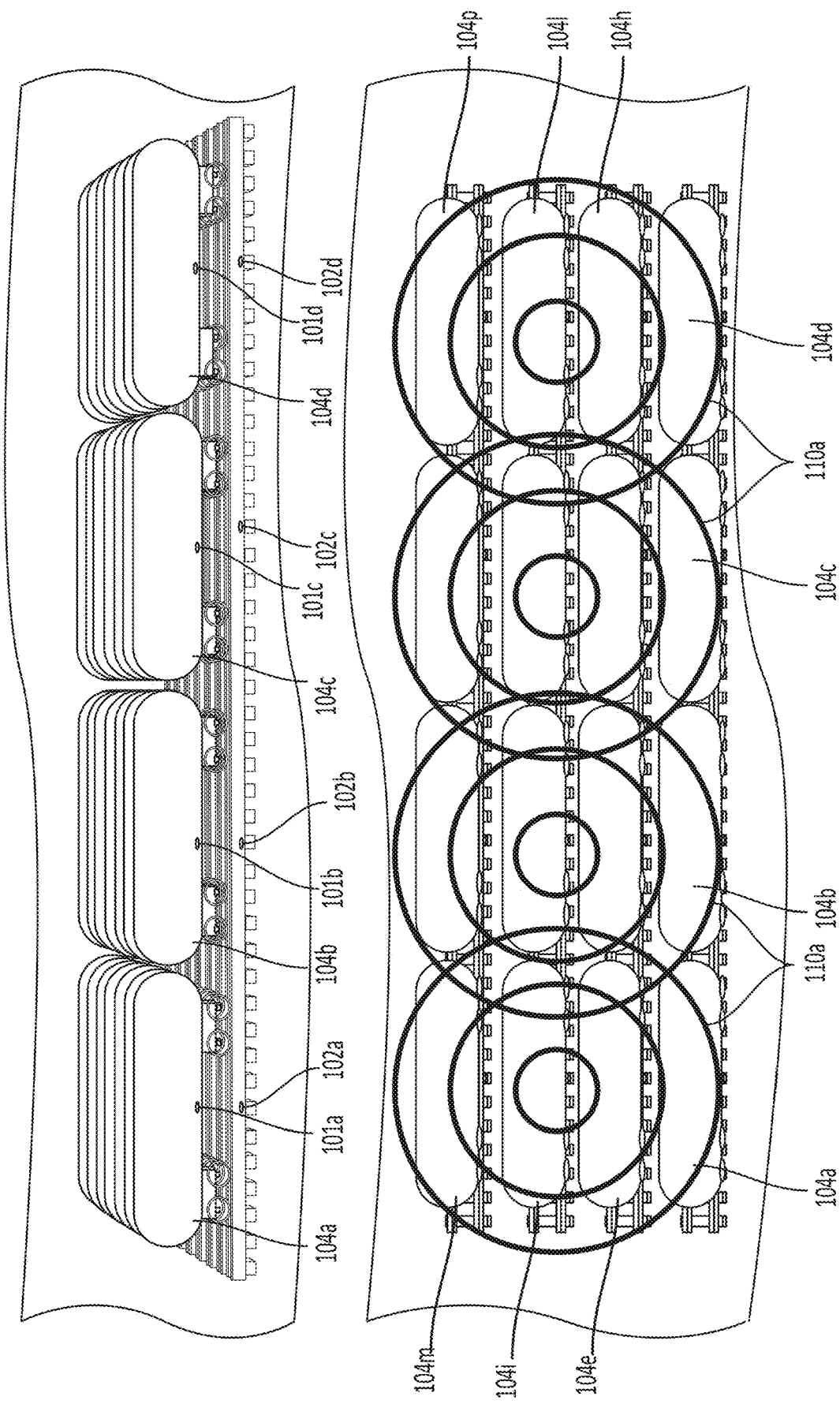
FIG. 7 provides an exemplary propagation of signals that connect one or more smart tags to other smart tags, and one or more tags to at least one anchor system, according to some embodiments.

FIG. 7 provides an exemplary propagation of signals that connect one or more smart tags to other smart tags, and one or more tags to at least one anchor system. In the illustrated implementation, the smart tags 101*a* . . . 101*d* coupled to a plurality of cargo housing units of a vehicle can be detected by at least one anchor system 102*a* . . . 102*d* fitted to a pathway (e.g., a road, a track) through which the vehicle moves based on the propagated signals 110*a*. It is appreciated that the propagated signals 110*a*, according to one embodiment, can comprise a wireless connection signal such as a Bluetooth signal, a 5 G signal, or some other wireless signal such as those discussed in association with the communication unit 208 of FIGS. 2-3. Moreover, the smart tags 101*a* . . . 101*d* and/or the anchor systems 102*a* . . . 102*d* can comprise miniaturized electronic communication devices that can transmit and/or receive data (e.g., smart data, firmware data, control data, update data, etc.). It is further appreciated that the geometry of propagation of the signal's wireless signals 110*a* enables multi-directional detection and communication of the smart data within localized or entire sections or portions of the tag or tracker network, according to some embodiments. For example, the detection of the smart tag 101*a* on the cargo housing unit 104*a* coupled to the vehicle facilitates the detection of smart tags 101*b* . . . 101*d* respectively coupled to cargo housing units 104*b* . . . 104*d* east of the vehicle 104*a*. In other embodiments, the detection of smart tag 101*a* by the anchor system 102*a* can facilitate detection of smart tags associated with cargo housing units 104*b* . . . 104*p* which are directionally east, north, and northeast relative to the cargo housing unit 104*a*. In particular, the smart data derived from detecting the smart tag 101*a* by the anchor system 102*a* comprises location data associated with a plurality of smart tags coupled to the plurality of cargo housing units 104*a* . . . 104*p* as well as sensor data associated with said plurality of smart tags. This smart data can be resolved and/or further analyzed to provide a plurality of insights (e.g., logistical and/or inventory insights) associated with the plurality of cargo housing units 104*a* . . . 104*p* as further discussed below.

Figure 8:
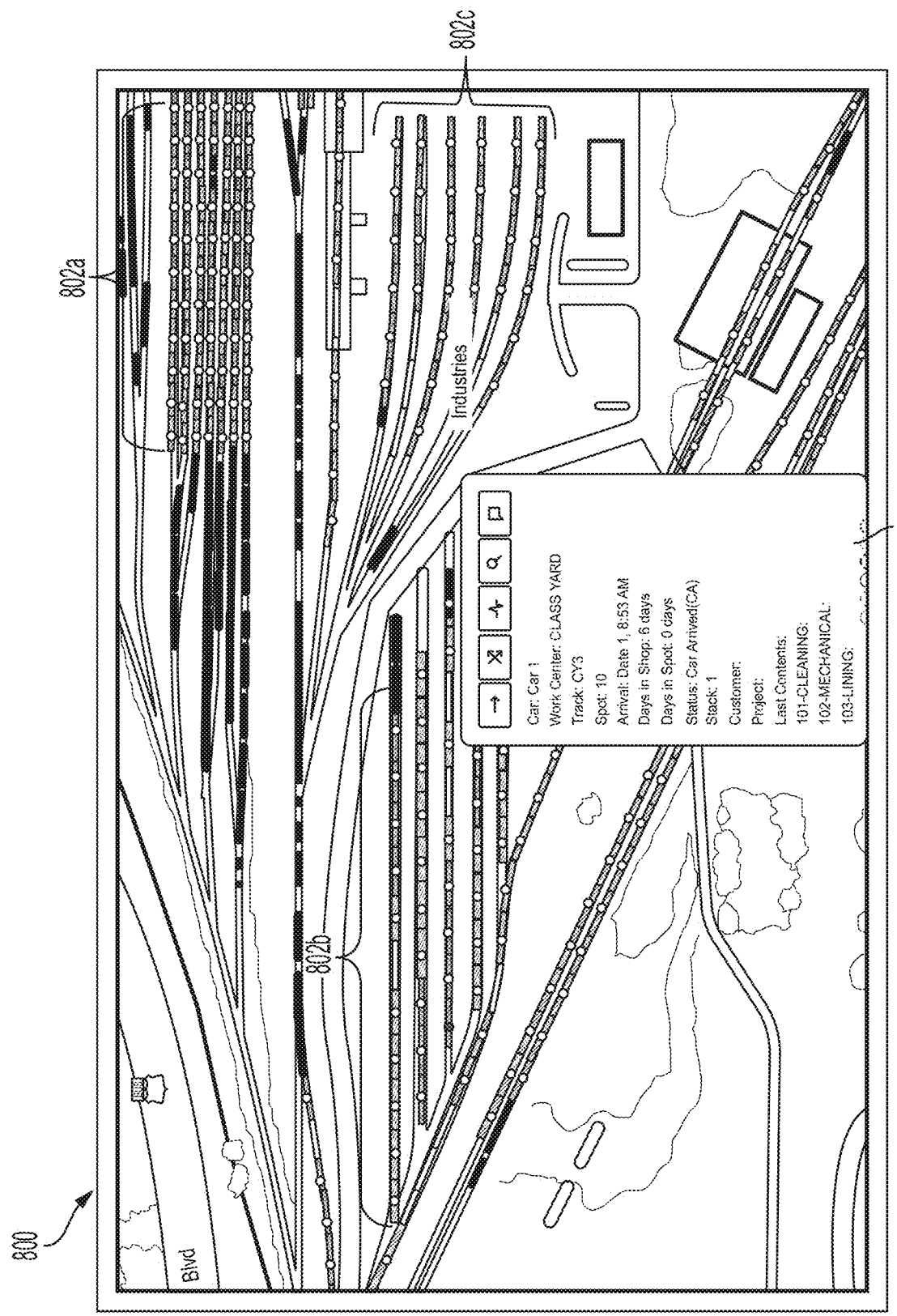
FIG. 8 shows an exemplary multi-dimensional visualization of resolved smart data.

FIG. 8 shows an exemplary multi-dimensional visualization 800 of resolved smart data. In particular, the visualization 800 indicates visual representations of a plurality of cargo housing units 802*a*, 802*b*, and 802*c* based on the smart tags coupled to said cargo housing units. According to one embodiment, the visualization 800 may be resolved as a 2-dimensional image indicating the plurality of cargo housing units 802*a*, 802*b*, and 802*c* or a 3-dimensional image of the plurality of cargo housing units. Moreover, visualization 800 can comprise still image data or video data.

According to one embodiment, visualization 800 comprises adaptive image data with display elements that are activatable (e.g., via clicking, hovering, voice activation, etc.) to contextualize inventory information associated with a selected cargo housing unit comprised in visualization 800. For example, a selection or activation of a first cargo housing unit (e.g., car 1) automatically generates inventory information 804 associated with the first cargo housing unit. According to some embodiments, the adaptive properties of visualization 800 enables real-time or near-real-time updates to visualization 800 based on updated or newly received smart data from one or more smart tags associated with the cargo housing units 802*a*, 802*b*, and 802*c*. For example, the smart data may be received by the network server every 5 minutes, or every 10 minutes, or every 15 minutes, or every 20 minutes, etc., from a gateway system and used to update the visualization 800. According to one embodiment, the visualization 800 may be displayed on a client device 108*a* . . . 108*n* from FIGS. 1A-1B. In particular, stakeholders (e.g., suppliers, vendors, inventory managers, company owners, freight handlers, etc.) may be able to monitor, track, or otherwise observe a cargo of interest by, for example, securely accessing the server system of a tag or tracker network and then viewing location data, sensor data, and/or other logistical information associated with one or more cargo housing units using the visualization 800 derived from received smart data. According to one embodiment, visualization 800 may allow stakeholders to visually: confirm that a specific cargo housing unit is actually at an intended location; control sensor/telemetric information (e.g., climate control) associated with a given cargo unit; accurately report inventory information associated with specific cargo units; coordinate and/or alter a destination of a given cargo unit relative to a current location of said cargo unit, etc. According to one embodiment, visualization 800 comprises an integration or merging of satellite map data and the received smart data.

FIG. 9 provides an exemplary tabular representation 900 of various elements of visualization 800, according to some implementations. As shown in the figure, visualization 800 can be converted into a tabular structure having a plurality of display element elements including: identifiers 902*a* for specific cargo housing units; temporal data identifiers 902*b* indicating a time or date of arrival/departure from a tag or tracker network by said cargo housing units; specific location data 902*c* associated with each cargo housing unit; a plurality of status indicators 902*d* indicating whether specific cargo units have arrived at intended locations within the tag or tracker network; and context sections 902*e*-902*f* for receiving notes, comments, or other user inputs that inform decisions taken or to be taken with regard to specific cargo housing units. According to one embodiment, an input field 904 of visualization 900 can facilitate searching for a particular cargo housing unit using a cargo housing unit identifier associated with the particular cargo housing unit of interest. According to one embodiment, visualization 900 also includes a set of display elements 906 that can facilitate filtering the tabular representation 900 of a plurality of cargo housing units, downloading, printing, or exporting the tabular representation or list of cargo housing units, or emailing or sharing the tabular representation or list of cargo housing units to one or more stakeholders or other users.

Dynamically Communicating Smart Data in a Tag Network

Figure 10:
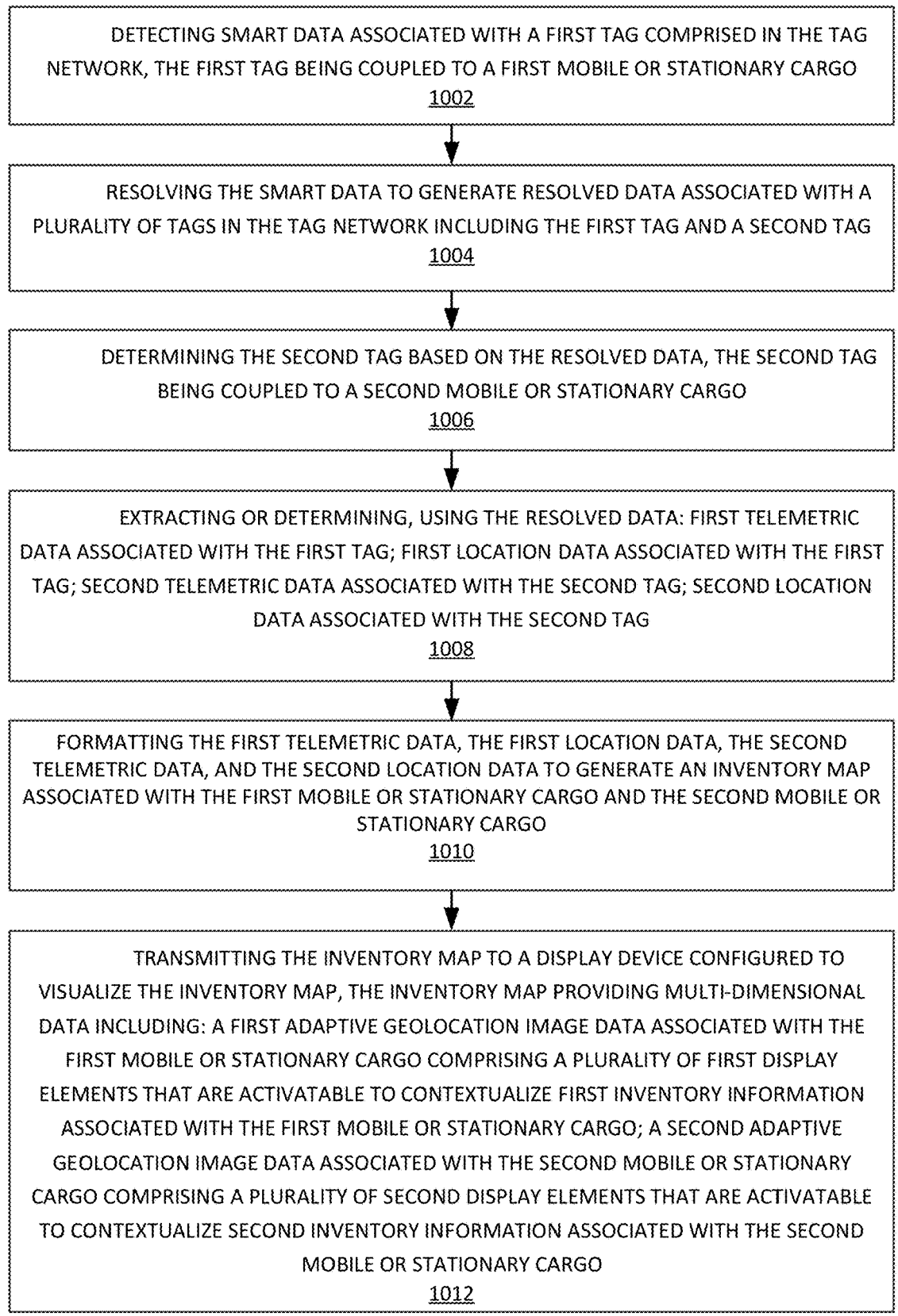
FIG. 10 provides an exemplary workflow for dynamically communicating smart data in a tag or tracker network.

FIG. 10 provides an exemplary workflow for dynamically communicating smart data in a tag or tracker network. It is appreciated that a data engine stored in a memory device may cause a computer processor to execute the various processing stages of FIG. 10. For example, the disclosed techniques may be implemented as a data engine comprised in a logistical software tool such that the data engine enables the generation, tracking, and utilization of smart data as further disclosed below.

At block 1002, the data engine may detect smart data associated with a first tag comprised in a tag or tracker network. The first tag may be coupled to a first mobile or stationary cargo. For example, the first tag may be coupled to a cargo or load housing unit that is carrying the first mobile or stationary cargo. At block 1004, the data engine may resolve the smart data to generate resolved data associated with a plurality of tags in the tag network including the first tag and a second tag. Continuing to block 1006, the data engine may determine the second tag based on the resolved data such that the second tag is coupled to a second mobile or stationary cargo. In particular, the second tag may be coupled, attached, or fitted to a second cargo or load housing unit carrying or housing the second mobile or stationary cargo. The data engine may extract or determine, at block 1008, using the resolved data, one or more of: first telemetric data associated with the first tag; first location data associated with the first tag; second telemetric data associated with the second tag; and second location data associated with the second tag. The data engine may further format, at block 1010, the first telemetric data, the first location data, the second telemetric data, and the second location data to generate an inventory map associated with the first mobile or stationary cargo and/or the second mobile or stationary cargo. The data engine may also transmit, at block 1012, the inventory map to a display device configured to visualize the inventory map. The display device may comprise a client device such as those discussed in association with FIGS. 1A-1B. According to one embodiment, the inventory map may provide a multi-dimensional data or visualization that includes: a first adaptive geolocation image data associated with the first mobile or stationary cargo comprising a plurality of first display elements that are activatable to contextualize first inventory information associated with the first mobile or stationary cargo; and a second adaptive geolocation image data associated with the second mobile or stationary cargo comprising a plurality of second display elements that are activatable to contextualize second inventory information associated with the second mobile or stationary cargo.

These and other implementations may each optionally include one or more of the following features. The tag or tracker network can comprise a plurality of tags including the first tag and the second tag. For example, the plurality of tags can be configured to be in electronic communication with each other such that the detection of one tag comprised in the plurality of tags enables detection of other tags (e.g., remaining tags within a localized section or portion of the tag network or the entirety of the tag network). Furthermore, the tag or tracker network can also comprise one or more anchor systems optimally placed relative to other anchor systems within a space (e.g., pathway) where the first mobile or stationary cargo is located. The one or more anchor systems can be optimized to relay the smart data associated with the first tag to a gateway system of the tag network. According to some embodiments, the tag or tracker network can comprise a gateway system configured to electronically coordinate communication between at least one data server and one or more of the first tag and one or more anchor systems.

Furthermore, the smart data can comprise one or more of: location data associated with a plurality tags coupled to a plurality of mobile or stationary cargo including the first mobile or stationary cargo and the second mobile or stationary cargo; and telemetric data associated with the plurality of tags, the telemetric data including the first telemetric data and the second telemetric data. The telemetric data, for example, can comprise sensor data associated with the plurality of tags. Moreover, the sensor data can comprise data captured by one or more of climate sensors and location sensors. According to some embodiments, the telemetric data includes: first sensor data associated with the first tag, the first sensor data including data captured by a first sensor system that monitors the first mobile or stationary cargo; and second sensor data associated with the second tag, the second sensor data including data captured by a second sensor system that monitors the second mobile or stationary cargo.

In some implementations, the smart data comprises one or more of: location data associated with the first mobile or stationary cargo; identifier data associated with the first mobile or stationary cargo; climate data associated with the first mobile or stationary cargo; weight data associated with the mobile or stationary cargo; preservation data associated with the first mobile or stationary cargo; and hazard data associated with the first mobile or stationary cargo.

Additionally, the first tag or the second tag is comprised in a miniaturized smart tag system configured for inter-tag communication within the tag or tracker network. In addition, the miniaturized smart tag system can be powered by a miniaturized longevity energy source.

It is appreciated that the first or second mobile or stationary cargo may be housed within different cargo housing units comprised in a vehicle such as a train/railcar, a bus, or a drone. In addition, the first mobile or stationary cargo may be separated from the second mobile or stationary cargo by one of: a distance of at least 60 feet; a distance of at least 55 feet; a distance of at least 50 feet; or a distance of at least 45 feet.

According to some embodiments, formatting the first telemetric data, the first location data, the second telemetric data, and the second location data to generate the inventory map comprises one or more of: determining, using the data engine, a satellite map for an area (e.g., a localized area of the tag or tracker network) within which the first mobile or stationary cargo is located using global positioning system (GPS) data comprised in, or associated with, the first location data and/or the second location data; overlaying, using the data engine, the satellite map with structural components including one or more vehicles associated with a plurality of tags comprised in the tag or tracker network including the first tag and the second tag to generate a smart digital canvas or a rendition of a map outline, or geographic location data superimposed with identifiers indicating vehicles and/or systems or structures to which one or more of the first tag, the second tag, an anchor systems, etc., are coupled; labeling, using the data engine, the one or more vehicles to indicate a plurality of display elements including the plurality of first display elements and the plurality of second display elements to generate the inventory map; and providing, using the data engine, a feed (e.g., a live picture or video feed) to at least the first mobile or stationary cargo and the second mobile or stationary cargo based on the inventory map.

In some embodiments, the first inventory information indicates logistical data associated with management of acquiring, storing, and transporting the first or second mobile or stationary cargo to a specific destination. Moreover, detecting the first tag in the tag network may be based on one of a bilateration process or a trilateration process.

In some implementations, the workflow of FIG. 10 may further comprise transmitting, using the data engine, a control command to the tag network. The control command can comprise one or more of: a software or a firmware update associated with one or more of the first tag, the second tag, an anchor system associated with the tag network, or a gateway system associated with the tag network; or a command for controlling a sensor associated with the first tag or the second tag.

Moreover, detecting the smart data can comprise a dynamic detection process associated with a periodic detection of the smart data based on one or more of: a specified frequency of detection within a first time frame; or updates to the smart data. For example, the first time frame comprises one of 5 minutes, or 10 minutes, or 15 minutes while the frequency of detection comprises one of once, twice, or three times within the first time frame.

It is appreciated that the tag network comprises one or more of: a 5 G network; a Bluetooth network; or a mesh network. It is further appreciated that the inventory map can be used to generate a switch list for a rail yard, for example. The switch list can comprise a logistical control file configured for coordinating railcar movements in a rail yard. In some embodiments, the switch list is transmitted to specific railcars within the rail yard to automatically control movement of the specific railcars to specific locations. Furthermore, the specific railcars can be intelligent or autonomous railcars that ingest the switch list to determine which way to move or which direction to take to the specific locations.

Dynamically Analyzing Smart Data within a Tag Network

Figure 11:
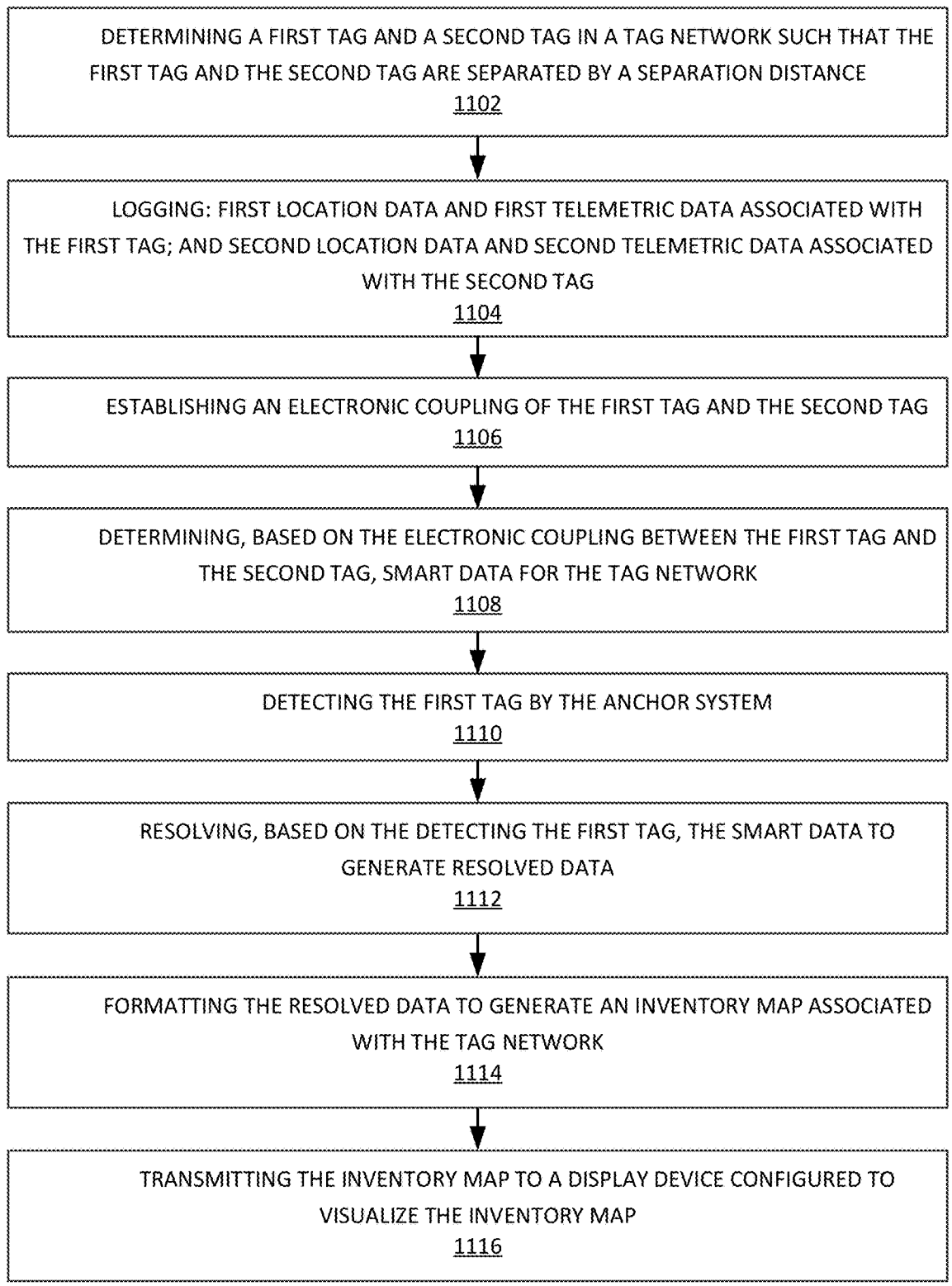
FIG. 11 provides an exemplary workflow for dynamically analyzing smart data within a tag network.

FIG. 11 provides an exemplary workflow for dynamically analyzing smart data within a tag network. It is appreciated that a data engine stored in a memory device may cause a computer processor to execute the various processing stages of FIG. 11. For example, the disclosed techniques may be implemented as a data engine comprised in a logistical software tool such that the data engine enables the generation, tracking, and utilization of smart data as further disclosed below.

At block 1102, the data engine may determine a first tag and a second tag in a tag network such that the first tag and the second tag are separated by a separation distance. According to one embodiment, the tag network comprises: the first tag and the second tag such that the first tag and the second tag are respectively coupled to a first load housing unit of a vehicle and a second load housing unit of the vehicle such that the first tag and the second tag are separated by the separation distance; a first anchor system that is not coupled to either the first load housing unit or the second load housing unit but which is proximally located relative to the first tag within an area within which the first load housing unit or the second load housing unit is located; and a gateway system configured to electronically coordinate communication between at least one data server and one or more of the first tag and the anchor system. It is appreciated that the anchor system is also not coupled to the vehicle according to some embodiments.

The data engine may log, at block 1104, one or more of: first location data and first telemetric data associated with the first tag; and second location data and second telemetric data associated with the second tag. The data engine at block 1106 may establish an electronic coupling (e.g., an electronic communication or connection) of the first tag and the second tag. Furthermore, the data engine at block 1108, may determine, based on the electronic coupling between the first tag and the second tag, smart data for the tag network. The smart data includes at least: the first location data and first telemetric data associated with the first tag; and the second location data and second telemetric data associated with the second tag. In one embodiment, the data engine may detect or receive, the first tag by a first anchor system at block 1110. At block 1112, the data engine may resolve, based on detecting the first tag, the smart data to generate resolved data. The data engine may also format, at block 1114, the resolved data to generate an inventory map associated with the tag network. According to one embodiment, the data engine may transmit, at block 1116, the inventory map to a display device configured to visualize the inventory map. The inventory map may provide multi-dimensional data including: a first adaptive geolocation image data associated with the first tag, the first adaptive geolocation image data comprising a plurality of first display elements that are activatable to contextualize first inventory information associated with the first tag; and a second adaptive geolocation image data associated with the second tag, the second adaptive geolocation image data comprising a plurality of second display elements that are activatable to contextualize second inventory information associated with the second tag.

In another embodiment, a system and a computer program can include or execute the method described above. These and other implementations may each optionally include one or more of the following features. The tag network comprises: a plurality of tags including the first tag and the second tag, the plurality of tags being configured to be in electronic communication with each other such that the detection of one tag comprised in the plurality of tags enables detection of remaining tags or a selection of tags or a number of tags within a localized section of the tag network or within the entirety of the tag network; one or more anchor systems including the first anchor system such that the one or more anchor systems are optimally placed relative to each other within a space (e.g., a localized space or a section within the tag network) where the first mobile or stationary cargo is located such that the one or more anchor systems are optimized to relay the smart data associated with the first tag to a gateway system of the tag network; and the gateway system such that the gateway system is configured to electronically coordinate communication between at least one data server and one or more of the first tag and the one or more anchor systems.

According to some embodiments, a quantitative number of the plurality of tags is greater than a quantitative number of the one or more anchor systems. Moreover, the smart data comprises one or more of: location data associated with a plurality tags in the tag network including the first tag and the second tag, each tag comprised in the plurality of tags being coupled to a load housing unit of a vehicle; and telemetric data associated with the plurality of tags, the telemetric data including the first telemetric data and the second telemetric data. In some embodiments, the telemetric data comprises sensor data associated with the plurality of tags. The telemetric data can include: first sensor data associated with the first tag, the first sensor data including data captured by a first sensor system that monitors cargo being housed by the first cargo or load housing unit; and second sensor data associated with the second tag, the second sensor data including data captured by a second sensor system that monitors cargo being housed by the second load or cargo housing unit.

In some implementation, the first tag or the second tag is comprised in a miniaturized smart tag system configured for inter-tag communication within the tag network. In addition, the miniaturized smart tag system may be powered by a miniaturized longevity energy source.

According to some embodiments, the first load housing unit or the second load housing unit is comprised in a vehicle, the vehicle being one of a railcar, a truck, or a drone. Moreover, the separation distance referenced in association with FIG. 11 can comprise one of: a distance of at least 60 feet; a distance of at least 55 feet; a distance of at least 50 feet; or a distance of at least 45 feet.

In some embodiments, the first inventory information can indicate logistical data associated with management of acquiring, storing, and transporting cargo associated with the first tag. Furthermore, detecting the first tag in the tag network may be based on one of a bilateration process or a trilateration process.

In exemplary embodiments, formatting the resolved data to generate the inventory map comprises: determining, using the data engine, a satellite map for an area within which one or more vehicles associated with the plurality of tags including the first vehicle or the second vehicle is located using global positioning system (GPS) data comprised in the first location data and the second location data; overlaying, using the data engine, the satellite map with structural components including one or more cargo housing units corresponding to the one or more vehicles associated with the plurality of tags comprised in the tag network including the first tag and the second tag and thereby generate a smart digital canvas; labeling, using the data engine, the one or more cargo or load housing units to indicate a plurality of display elements including the plurality of first display elements and the plurality of second display elements and thereby generate the inventory map; and providing, using the data engine, a live feed (e.g., live image or video feed) to at least the first cargo housing unit or the second cargo housing unit based on the inventory map.

According to one embodiment, the first tag is coupled to a vehicle traveling on a path that has a terminal end beyond which the vehicle traveling on the path cannot traverse. In addition, the vehicle traveling on the path and to which the first tag is coupled can comprise an indicator system. In one embodiment, the tag network comprises a dead-end anchor system proximally located relative to the terminal end of the path, such that in response to the vehicle traveling on the path approaches the terminal end of the path, the dead-end anchor system transmits a control signal that is applied to execute one or more of: activating the indicator system to visually or auditorily indicate that the vehicle traveling on the path is approaching the terminal end of the path, and/or initiating deceleration or halting of the vehicle traveling on the path.

In some cases, the first anchor system includes an electronic circuit fitted to an anchor casing. The first anchor system may also include a longevity energy source coupled to the electronic circuit and which is installed within the anchor casing. In addition, the anchor casing can comprise: a mounting member coupled to a pathway through which the first tag or the second tag travels; a seal member configured to secure the anchor casing and thereby minimize an impact of weather effects on the electronic circuit and the longevity energy source; at least one fastening member configured to attach the anchor casing to the pathway through which the first tag or the second tag travels; and a reflector member adapted to reflect light and thereby make visible the anchor casing when the anchor casing is illuminated with natural or artificial light.

Alternative Workflow for Dynamically Analyzing Smart Data

Figure 12:
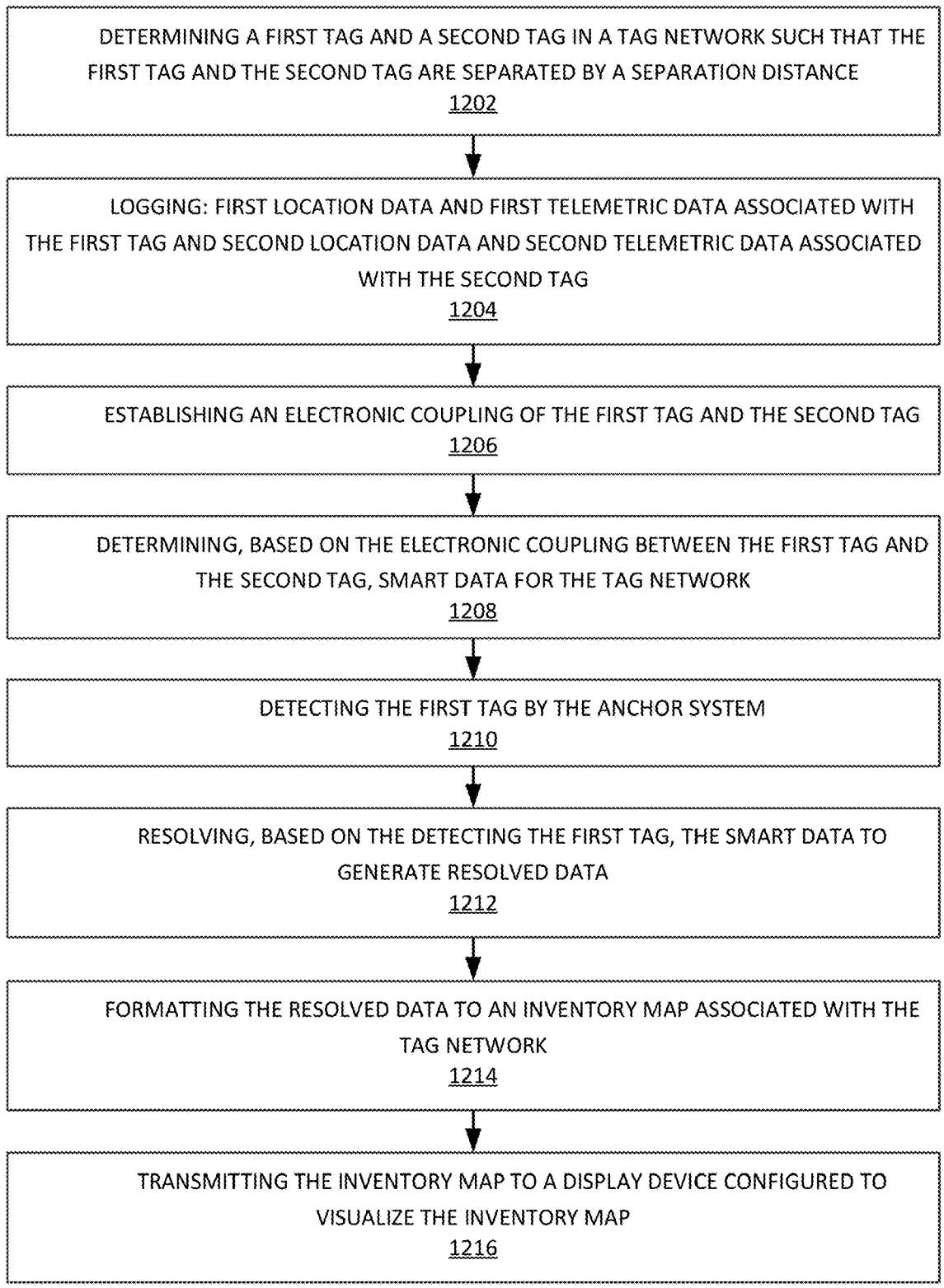
FIG. 12 provides an alternative workflow for dynamically analyzing smart data within a tag network.

FIG. 12 provides an alternative workflow for dynamically analyzing smart data within a tag network. It is appreciated that a data engine stored in a memory device may cause a computer processor to execute the various processing stages of FIG. 12. For example, the disclosed techniques may be implemented as a data engine comprised in a logistical software tool such that the data engine enables the generation, tracking, and utilization of smart data as further disclosed below.

At block 1202, the data engine may determine a first tag and a second tag in a tag network such that the first tag and the second tag are separated by a separation distance. In one embodiment, the tag network comprises: the first tag and the second tag such that the first tag and the second tag are respectively coupled to a first load housing unit and a second load housing unit, which may or may not be separated by the separation distance; a first anchor system that is coupled to a vehicle to which the first load and second load housing units are coupled and which is proximally located relative to the first tag or the second tag; and a gateway system configured to electronically coordinate communication between at least one data server and one or more of the first tag and the first anchor system. The data engine may log, at block 1204, one or more of: first location data and first telemetric data associated with the first tag; and second location data and second telemetric data associated with the second tag. The data engine may further establish, at block 1206, an electronic coupling (e.g., an electronic connection) of the first tag and the second tag. At block 1208, the data engine may determine, based on the electronic coupling between the first tag and the second tag, smart data for the tag network. The smart data may include at least: the first location data and first telemetric data associated with the first tag; and the second location data and second telemetric data associated with the second tag. The data engine may further detect or receive, at block 1210, the first tag by the anchor system. The data engine may also resolve, at block 1212, based on detecting the first tag, the smart data to generate resolved data. At block 1214, the data engine may format the resolved data to generate an inventory map associated with the tag network. Furthermore, the data engine may transmit, at block 1216, the inventory map to a display device configured to visualize the inventory map. The inventory map, according to one embodiment, provides multi-dimensional data including or indicating: a first adaptive geolocation image data associated with the first tag, the first adaptive geolocation image data comprising a plurality of first display elements that are activatable to contextualize first inventory information associated with the first tag; and a second adaptive geolocation image data associated with the second tag, the second adaptive geolocation image data comprising a plurality of second display elements that are activatable to contextualize second inventory information associated with the second tag.

In another embodiment, a system and a computer program can include or execute the method described in association with FIG. 12. These and other implementations may each optionally include one or more of the following features. The tag network comprises: a plurality of tags including the first tag and the second tag, the plurality of tags being configured to be in electronic communication with each other such that the detection of one tag comprised in the plurality of tags enables detection of remaining tags or a selection of tags or a number of tags within a localized section of the tag network or within the entirety of the tag network; one or more anchor systems including the first anchor system such that the one or more anchor systems are optimally placed relative to each other within a space (e.g., a localized space or a section within the tag network) where the first tag is located, the one or more anchor systems being optimized to relay the smart data associated with the first tag to a gateway system of the tag network; and the gateway system, the gateway system being configured to electronically coordinate communication between at least one data server and one or more of the first tag and the one or more anchor systems.

Moreover, a quantitative number of the plurality of tags is greater than a quantitative number of the one or more anchor systems according to some embodiments. In addition, the smart data can comprise one or more of: location data associated with a plurality tags in the tag network including the first tag and the second tag, each tag comprised in the plurality of tags being coupled to a load housing unit of vehicle; and telemetric data associated with the plurality of tags, the telemetric data including the first telemetric data and the second telemetric data. The telemetric data, for example, comprises sensor data associated with the plurality of tags. In addition, the telemetric data can include: first sensor data associated with the first tag, the first sensor data including data captured by a first sensor system that monitors cargo being housed by the first load housing unit; and second sensor data associated with the second tag, the second sensor data including data captured by a second sensor system that monitors cargo being housed by the second load housing unit.

According to one embodiment, the first tag or the second tag is comprised in a miniaturized smart tag system configured for inter-tag communication within the tag network. The miniaturized smart tag system, for example, may be powered by a miniaturized longevity energy source. In addition, the first vehicle load housing unit or the second load housing unit are comprised in a vehicle, the vehicle being one of a railcar, a truck, or a drone. The separation distance referenced in association with FIG. 12 comprises one of: a distance of at least 60 feet; a distance of at least 55 feet; a distance of at least 50 feet; or a distance of at least 45 feet.

In some implementations, the first inventory information indicates logistical data associated with management of acquiring, storing, and transporting cargo associated with the first tag. Moreover, detecting the first tag in the tag network is based on one of a bilateration process or a trilateration process.

According to some embodiments, formatting the resolved data to generate the inventory map as discussed with reference to block 1214 of FIG. 12 comprises one or more of: determining, using the data engine, a satellite map for an area within which the first load housing unit or the second load housing unit is located using global positioning system (GPS) data comprised in the first location data and the second location data; overlaying, using the data engine, the satellite map with structural components including one or more cargo housing units with corresponding vehicle(s) associated with a plurality of tags comprised in the tag network including the first tag and the second tag to generate a smart digital canvas; labeling, using the data engine, the one or more cargo housing units to indicate a plurality of display elements including the plurality of first display elements and the plurality of second display elements to generate the inventory map; and providing, using the computer processor, a live feed (e.g., image or video feed) to at least the first cargo housing unit or the second cargo housing unit based on the inventory map.

It is appreciated that the disclosed tags associated with the tag or tracker network are configured to communicate or "talk" with each other within a tag network (e.g., a primary tag or tracker network associated with a location where a vehicle with tags is parked or docked) or outside the tag or tracker network (e.g., the primary tag or tracker network) in, for example, a secondary tag or tracker network associated with the vehicle. According to one embodiment, the disclosed tags (e.g., first tag, second tag, third tag, etc.) within or outside the primary tag or tracker network are communicatively coupled to each other via, for example, at least one of: a Bluetooth mesh network; a 5G mesh network; a Wi-Fi mesh network; an ultra-wideband (UWB) mesh network; a Thread mesh network; a ZigBee mesh network; a Low Energy mesh network; etc.

In some embodiments, each of the disclosed tags (e.g., first tag, second tag, etc.) and/or trackers are coupled or otherwise attached to vehicles such as locomotives, trucks, cars, drones, motorcycles, etc., that may or may not hold or contain some type of cargo. Furthermore, because the disclosed tags or trackers communicate or talk with each other within or outside of the tag or tracker network, detecting one tag among the disclosed tags or trackers associated with a given vehicle can lead to detection of the remaining tags or trackers associated with said vehicle. In some cases, detection of a single tags associated with the vehicle enables detection of a selection of tags or trackers associated with the vehicle. In the case of a vehicle such as a locomotive coupled to a plurality of railcars with each railcar having its own attached tag, detection of a single specific tag coupled to a specific railcar can facilitate determining the position or location of said specific railcar, cargo information associated with said specific railcar, etc. It is worth noting that detection of said specific railcar is achieved using a gateway system directly coupled to the vehicle (e.g., which in this case is a locomotive). In addition, detection of said specific tag coupled to said specific railcar beneficially enables determining railcar information for each of the remaining tags coupled to the remaining railcars as well as cargo information associated with said remaining railcars. Thus, the gateway system coupled to the vehicle can leverage communicating with the specific tag alluded to above, to determining location data and/or cargo data associated with other tags or remaining tags attached to a plurality of railcars or other cargo reception units coupled to the vehicle. This is because all the tags coupled to the various railcars or cargo reception units are in constant communication with each other. As such detection of the specific tag referenced above, via the gateway system on the vehicle, effectively means detecting some or all of the remaining tags attached to railcars or cargo reception units coupled to the vehicle with their attendant cargo information.

As previously noted, a vehicle such as a locomotive can have a plurality of cargo carrying or cargo housing units, each of which can be fitted with a tag or tracker. The plurality of tags or trackers coupled to the cargo housing units of the vehicle can be configured to be in communication with each other via a mesh network (e.g., a secondary tag or tracker network on the vehicle) such that detection of a single tag (e.g., detection of data associated with the single tag) in the mesh network translates to detection of the some or all of the remaining tags (e.g., detection of data associated with some or all of the remaining tags on the mesh network). It is worth noting that as used herein, detection of a tag can include detection of cargo information associated with the detected tag. This information can include information derived from one or more sensors coupled to each of the plurality of the cargo housing units or railcars or to the vehicle as the case may require.

According to one embodiment, the vehicle having a plurality of cargo housing units may be outside a tag or tracker network (e.g., a primary tag or tracker network associated with a parking or docking station of the vehicle). These scenarios necessitate communicating data (e.g., tag data) associated with the plurality of tags or trackers attached to the cargo housing units using, for example, the gateway system coupled to the vehicle. In particular, this data communication can occur over great or vast distances away from a tag or tracker network (e.g., primary tag or tracker network) such that data associated with the plurality of tags attached to the plurality of cargo housing units (e.g., each cargo housing unit having at least one tag or tracker with attendant sensors) can be communicated, via the gateway system coupled to the vehicle, to one or more server systems for analysis or directly to client computing devices associated with the plurality of cargo housing units fitted with the tags or trackers. In some embodiments, the data communicated from the plurality of tags can comprise: motive data (e.g., start data, stop data, vibration data, collision data, etc.) associated with the plurality of cargo housing units to which the plurality of tags are attached or motive data associated with the vehicle to which the plurality of cargo housing units are attached; cargo data associated with cargo housed in the plurality of cargo housing units; precise location data associated with the plurality of cargo housing units; and cargo sequence data or cargo housing unit sequence data indicating an arrangement or organization or structuring or sequencing of the each of the plurality of cargo housing units relative to each other. It is appreciated that data from each tag comprised in the plurality of tags attached to the plurality of cargo housing units of the vehicle can be combined or used in aggregate to accurately determine, for example, the sequence data and/or geolocation data (e.g., GPS data) associated with each of the plurality of cargo housing units based on, for example, operations of the gateway system coupled to the vehicle.

As previously discussed, each cargo housing unit comprised in a plurality of cargo housing units coupled to a vehicle may have associated sensors that communicate with the tags associated with said cargo housing units to determine cargo data and/or motive data associated with a given cargo housing unit, and/or motive data associated with the vehicle relative to respective tags or trackers attached to the plurality of cargo housing units. According to one embodiment, each of the plurality of tags and/or sensors comprise an automatic equipment identification (AEI) feature that includes a recognition system or protocol or structure for automatically detecting and/or uniquely identifying each tag and/or sensor associated with the vehicle. Furthermore, each tag or tracker associated with a given vehicle are configured to retain specific AEI RFID communication capabilities as well as an ability to communicate with anchor systems when, for example, the vehicle enters an area with an anchor-based mesh network (e.g., a primary tag or tracker network).

As noted elsewhere herein, data associated with one or more tags or sensors coupled or attached to cargo housing units of vehicles can be used to generate smart data, which is then resolved or otherwise analyzed to determine, for example, an inventory map. It is appreciated that the smart data can also be analyzed and/or resolved and/or processed to generate: data alerts associated with one or more cargo housing units or vehicles to which said cargo housing units are coupled; metric data associated with usage and/or motive data associated with the cargo housing units or vehicles coupled to said cargo housing units; logistical data associated with the cargo housing units or vehicles to which they are coupled; training data for artificial intelligence engines that predict one or more of the data alerts, the metric data, the motive data, and/or the logistical data as the case may require.

Exemplary Workflow for a Smart Tracking Process

Figure 13:
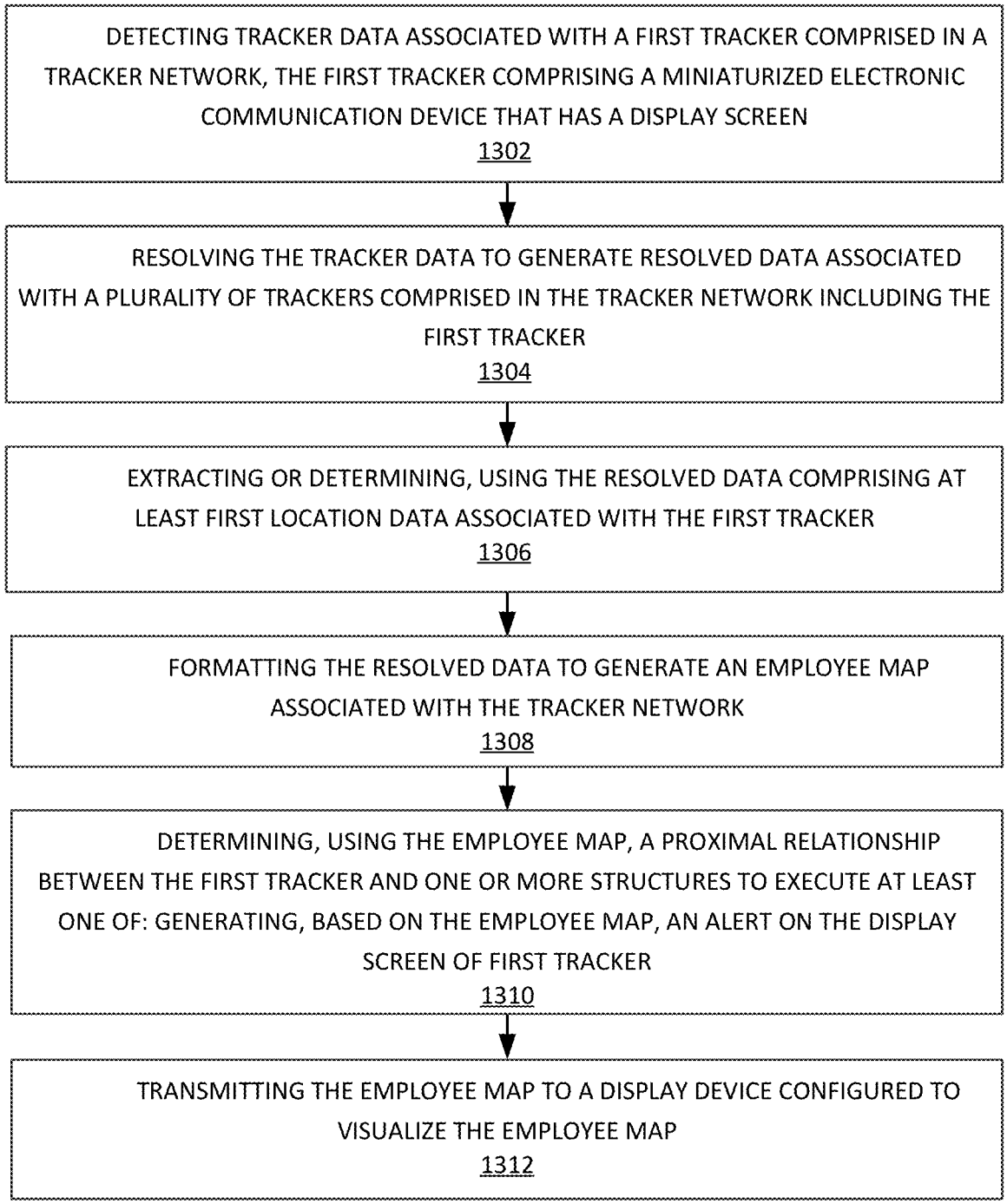
FIG. 13 provides an exemplary workflow for a smart tracking process.

FIG. 13 provides an exemplary workflow for a smart tracking process. It is appreciated that a data engine stored in a memory device may cause a computer processor to execute the various processing stages of FIG. 13. For example, the disclosed techniques may be implemented as a data engine comprised in a logistical or employee management software tool such that the data engine enables the generation, tracking, and utilization of tracker data as further disclosed below.

At block 1302, the data engine may detect tracker data associated with a first tracker comprised in a tracker network. The first tracker may comprise a miniaturized electronic communication device that has a display screen. The data engine may resolve, at block 1304, the tracker data to generate resolved data associated with a plurality of trackers comprised in the tracker network including the first tracker. Furthermore, the data engine may extract or determine at block 1306, using the resolved data, at least first location data associated with the first tracker. At block 1308, the data engine may format the resolved data to generate an employee map associated with the tracker network. In addition, the data engine may determine at block 1310, using the employee map, a proximal relationship between the first location data of the first tracker and one or more structures (e.g., physical structures) within the tracker network to execute at least one of: generating, based on the employee map, an alert on the display screen of first tracker; and transmitting, the employee map to a display device configured to visualize the employee map. According to one embodiment, the employ map comprises: a first adaptive geolocation image data associated with the first tracker comprising a plurality of first display elements that are activatable to contextualize location data or safety data, or control data associated with the first tracker. Moreover, the alert referenced above comprises one or more of: hazard data associated with an area within which the tracker network is implemented; dynamic access data associated with accessing one or more areas within which the tracker network is implemented; dynamic instructions data associated with executing specific control operations within the tracker network.

According to one embodiment, the tracker network comprises a plurality of trackers including the first tracker, the plurality of trackers being configured to be in electronic communication with each other such that the detection of one tracker comprised in the plurality of trackers enables detection of remaining trackers comprised in the plurality of trackers within the tracker network or detecting one or more trackers within a section of the tracker network. The tracker network may also comprise: one or more anchor systems optimally placed relative to other anchor systems within a space where the first tracker is located, the one or more anchor systems being optimized to relay the tracker data associated with the first tracker to a gateway system of the tracker network; and the gateway system, the gateway system being configured to electronically coordinate communication between at least one data server and one or more of the first tracker and the one or more anchor systems.

It is appreciated that the tracker data comprises at least location data associated with a plurality trackers comprised in the tracker network including the first tracker. In addition, the miniaturized electronic communication device comprises one of a wristwatch or a mobile communication device.

Furthermore, detecting the first tracker in the tracker network is based on a one of a bilateration process or a trilateration process. In addition, the workflow of FIG. 13 further comprises transmitting, using the data engine, one or more of: display elements associated with the hazard data to the first tracker; display elements associated with the dynamic access data to the first tracker; display elements associated with the dynamic instructions data to the first tracker; and a control command to the first tracker, the control command comprising a software or firmware update associated with the first tracker. It is appreciated that the hazard data, for example may inform a person or an autonomous system to take precautionary actions based on the hazard data. The dynamic access data may comprise access data transmitted to the first tracker to enable a person or autonomous system to which the first tracker is coupled to, to enter a restricted area within the tracker network. The control command, for example, can provide data used to execute a control operation by, for example, the person or autonomous system to which the first tracker is coupled to.

According to one embodiment, the employee map indicates management information associated with coordinating operations within the tracker network by one of: human workers within the tracker network, or autonomous independent robots within the tracker network. The tracker network, for example, comprises one or more of: a 5 G network; a Bluetooth network; or a mesh network.

In some implementations, detecting the tracker data comprises a dynamic detection process associated with a periodic detection of the tracker data based on one or more of: a specified frequency of detection within a first time frame; or updates to the smart/tracker data. The first time frame, for example, can comprise one of 5 minutes, or 10 minutes, or 15 minutes while the frequency of detection comprises one of once, twice, or three times within the first-time frame.

According to some embodiments, the first anchor system referenced in association with one or more of the disclosed methods comprises at least one of a signal booster system, or a signal relay system, or a signal amplifier system, or a signal augmenter system, or a signal enhancer system.

In some implementations, the first anchor system referenced herein in conjunction with one or more of the disclosed systems comprises at least one of a signal booster system, or a signal relay system, or a signal amplifier system, or a signal augmenter system, or a signal enhancer system.

In exemplary implementations, the one or more anchor systems referenced herein in association with one or more disclosed methods comprise at least one of a signal booster system, or a signal relay system, or a signal amplifier system, or a signal augmenter system, or a signal enhancer system.

Exemplary Cargo Carrying Receptacles/Cargo Carrying Vehicles

In exemplary implementations, one or more of the of the disclosed tags (e.g., smart tags), and/or disclosed sensors or sensor systems, and/or disclosed anchor systems may be coupled to cargo containers including cargo carrying receptacles such as: vehicles (e.g., trucks, cars, buses, trains, boats, ships, drones, aircrafts, etc.) and/or chassis associated with said vehicles; containers (e.g., dry box containers); drums (e.g., cargo carrying drums) and/or roll drums; tanks (e.g., International Organization for standardization (ISO) tanks); cylinders (e.g., cargo carrying cylinders); barrels (e.g., cargo carrying barrels); cases (e.g., cargo carrying cases); crates (e.g., cargo carrying crates); cartons (e.g., cargo carrying cartons); pallets (e.g., pallets that hold cargo); etc. Thus, the disclosed tag network and/or tracker network may be associated with cargo containers including the foregoing cargo carrying receptacles.

In some instances, the disclosed methods and systems can be applied to cargo carrying transport systems including shipping or non-shipping containers on trains, airplanes, trucks, ships, drones, etc. It is appreciated that the disclosed tag network or tracker network can be associated with a cargo carrying transport system including the aforementioned shipping or non-shipping containers.

According to some embodiments, the tag network referenced herein in association with one or more methods disclosed is associated with one or more cargo carrying containers including cargo carrying receptacles. Moreover, the tag network referenced in association with one or more of the disclosed systems is associated with one or more cargo carrying containers including cargo carrying receptacles.

In some cases, the tracker network discussed herein in association with one or more methods is associated with one or more cargo carrying containers including cargo carrying receptacles. Additionally, the tracker network mentioned in conjunction with one or more of the disclosed systems is associated with one or more cargo carrying containers including cargo carrying receptacles.

According to some embodiments, the disclosed tag network referenced herein is associated with a cargo carrying transport system. It is appreciated that the tag network discussed in association with one or more disclosed systems herein is associated with a cargo carrying transport system.

Furthermore, the tracker network discussed in association with one or more of the disclosed methods is associated with a cargo carrying transport system. In addition, the tracker network discussed in association with one or more of the disclosed systems may be associated with a cargo carrying transport system.

Exemplary Anchor System Configurations

Figure 14:
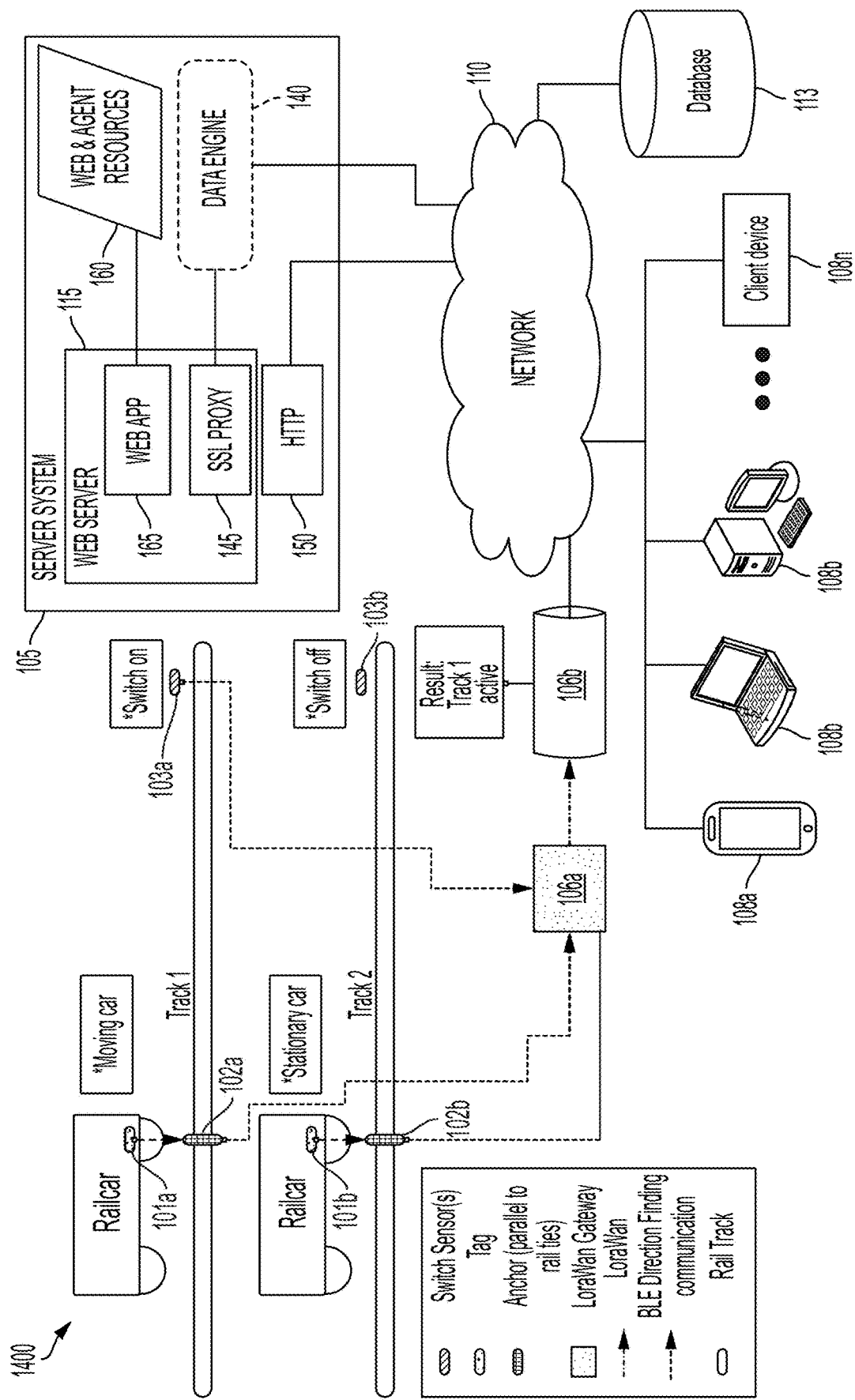
FIG. 14 shows an exemplary implementation of a tag network with the inclusion of one or more switch sensors configured to direct vehicles traveling on a first path to different paths.

FIG. 14 shows an exemplary implementation of a tag network with the inclusion of one or more switch sensors configured to direct vehicles (e.g., a railcar) traveling on a first path (e.g., first rail track) to different paths (e.g., second rail path). In particular, this figure shows a coupling of a first tag 101a (e.g., smart tag) to a first vehicle in motion and a second tag 101b (e.g., a smart tag) to a second vehicle that is stationary. As can be seen in the figure, the first tag 101a and the second tag 101b are in electronic communication with anchor systems 102a and 102b which in turn are coupled to gateway systems 106a and 106b. Furthermore, a first sensor 103a (e.g., first switch sensor) may be coupled to, or be otherwise proximally located relative to a first switch system and may be configured to: detect switch location data associated with a first path (e.g., rail track); and/or switch operation mode data associated with a switch (e.g., the first switch system) coupled to the first path; and/or facilitate directing the first vehicle from the first path to a third path (e.g., another rail track) once the first vehicle approaches the first sensor 103a. Similarly, a second sensor 103b (e.g., second switch sensor) may be coupled to, or be otherwise proximally located to a second switch system and may be configured to: detect switch location data associated with a second path (e.g., rail track); and/or switch operation mode data associated with a switch coupled (e.g., the second switch system) to the second path and/or facilitate directing the second vehicle from the second path (e.g., second rail track) to a fourth path (e.g., another rail track) once the second vehicle approaches the second sensor 103b. It is appreciated that the tag systems 101a and 101b, anchor systems 102a and 102b, as well as the gateway systems 106a and 106 operate as discussed in conjunction with FIGS. 1A-1B. It is further appreciated that sensors 103a and 103b beneficially inform users, based on at least the switch operation mode data that the first vehicle or the second vehicle is on the right path.

While the disclosed anchor systems are discussed in the context of rail transport structures, it is appreciated that said anchor systems can be affixed to, or be otherwise associated with, transport structures including non-rail multi-container structures. In addition, the disclosed anchor systems may comprise a signal booster system, or a signal relay system, or a signal amplifier system, or a signal augmenter system, or a signal enhancer system that is configured to: boost signal or data communications between two or more systems or devices comprised in the disclosed tag or tracker network; and/or relay signal or data communications between two or more systems or devices comprised in the disclosed tag or tracker network; and/or amplify signal or data communications between two or more systems or devices comprised in the disclosed tag or tracker network; and/or augment signal or data communications between two or more systems or devices comprised in the tag or tracker network; and/or enhance signal or data communications between two or more systems or devices comprised in the tag or tracker network.

In the implementation illustrated in FIG. 14, it is noted that the first vehicle is in motion while the second vehicle is stationary. As such the first sensor (e.g., switch sensor) mentioned above is activated as the first vehicle approaches the first sensor 103a to either change, or maintain, or make available additional path(s) for the first vehicle to take. In one embodiment, the first sensor communicates or coordinates via the gateway systems 106a and 106b with one or more systems coupled to the network 110 to determine the additional path(s) for the first vehicle (e.g., railcar or some other non-rail vehicles such as guided drones, trucks, etc.) to take beyond the first sensor based on vehicle trajectory data. For example, the first sensor may directly receive the vehicle trajectory data from one or more control devices on the vehicle as the first vehicle approaches the first sensor and/or receive the vehicle trajectory data from one or more computing systems coupled to the network 110 via the gateway systems 106a and 106b as the case may require. It is appreciated that the second sensor 103a (e.g., switch sensor) may be turned off or be otherwise switched off because the second vehicle is stationary. However, once the second vehicle starts moving, the second sensor 103b may be similarly activated to operate as the first sensor 103a.

Figure 15:
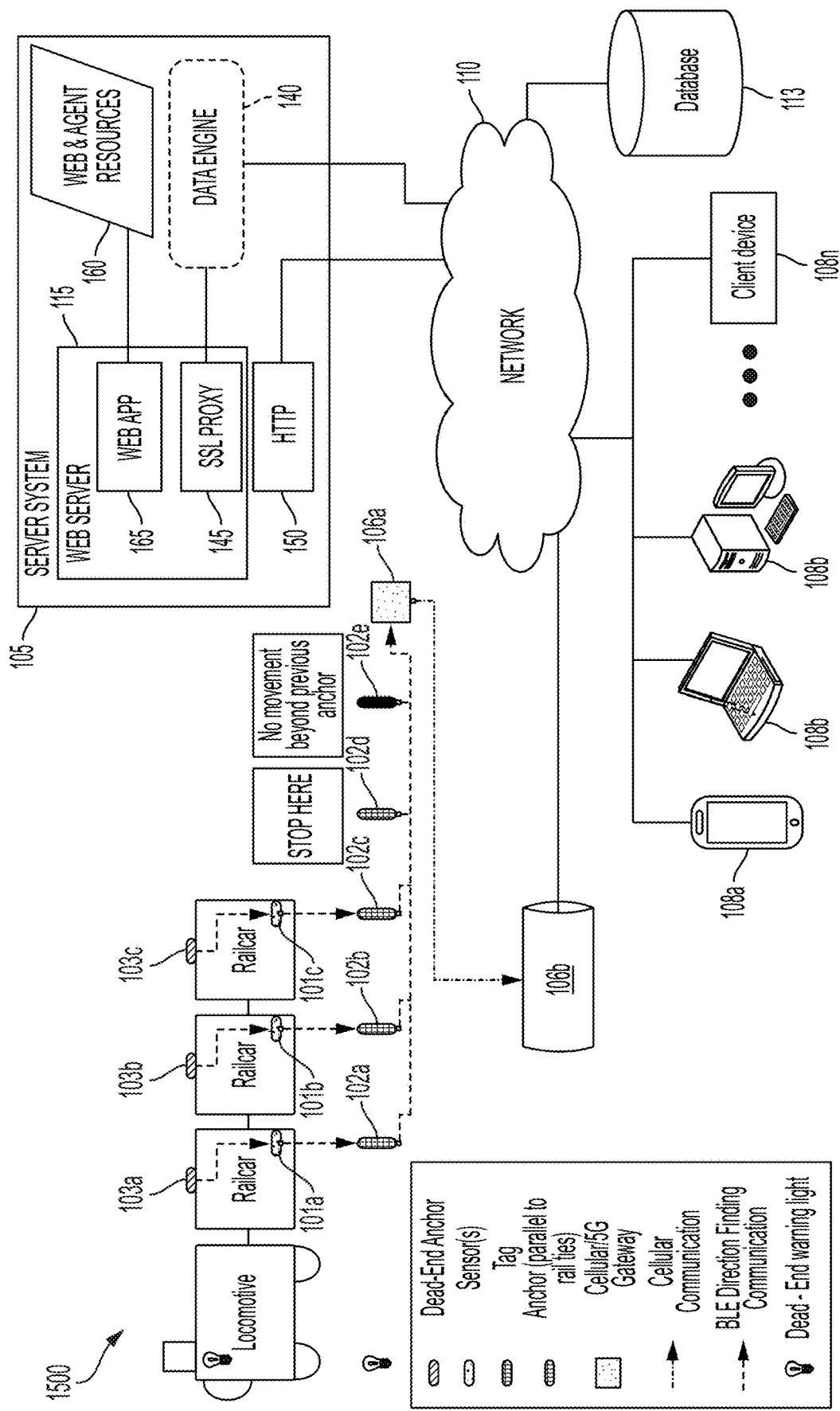
FIG. 15 shows an exemplary implementation where a plurality of tags are coupled to a plurality of cargo housing units, and which are in communication with a plurality of anchor systems including a dead-end anchor system.

FIG. 15 shows an exemplary implementation where a plurality of tags 101a . . . 101c (e.g., smart tags) are coupled to a plurality of cargo housing units such that the plurality of tags is in communication with a plurality of anchor systems 102a . . . 102d including a dead-end anchor system 102e. In the illustrated example, the plurality of cargo housing units may be coupled to a vehicle (e.g., a locomotive) and may also include a plurality of sensors 103a . . . 103c that capture cargo data as well as other data associated with the vehicle. It is appreciated that the plurality of tags 101a . . . 101c, the plurality of anchor systems 102a . . . 102d, and the plurality of sensor systems 103a . . . 103c operate similarly to the smart tags, the anchor systems, and the sensor systems discussed in association with FIGS. 1A-1B. One difference between the implementation of FIG. 15 relative to the that of FIGS. 1A-1B is the inclusion of a dead-end anchor system 102e which collaborates with the other systems including gateway systems 106a and 106b to ensure that the vehicle does not travel beyond specific anchor systems (e.g., anchor systems 102d) for safety reasons as wells as for reasons associated with dynamically routing a plurality of vehicles via one or more paths within the tag network.

Figure 16:
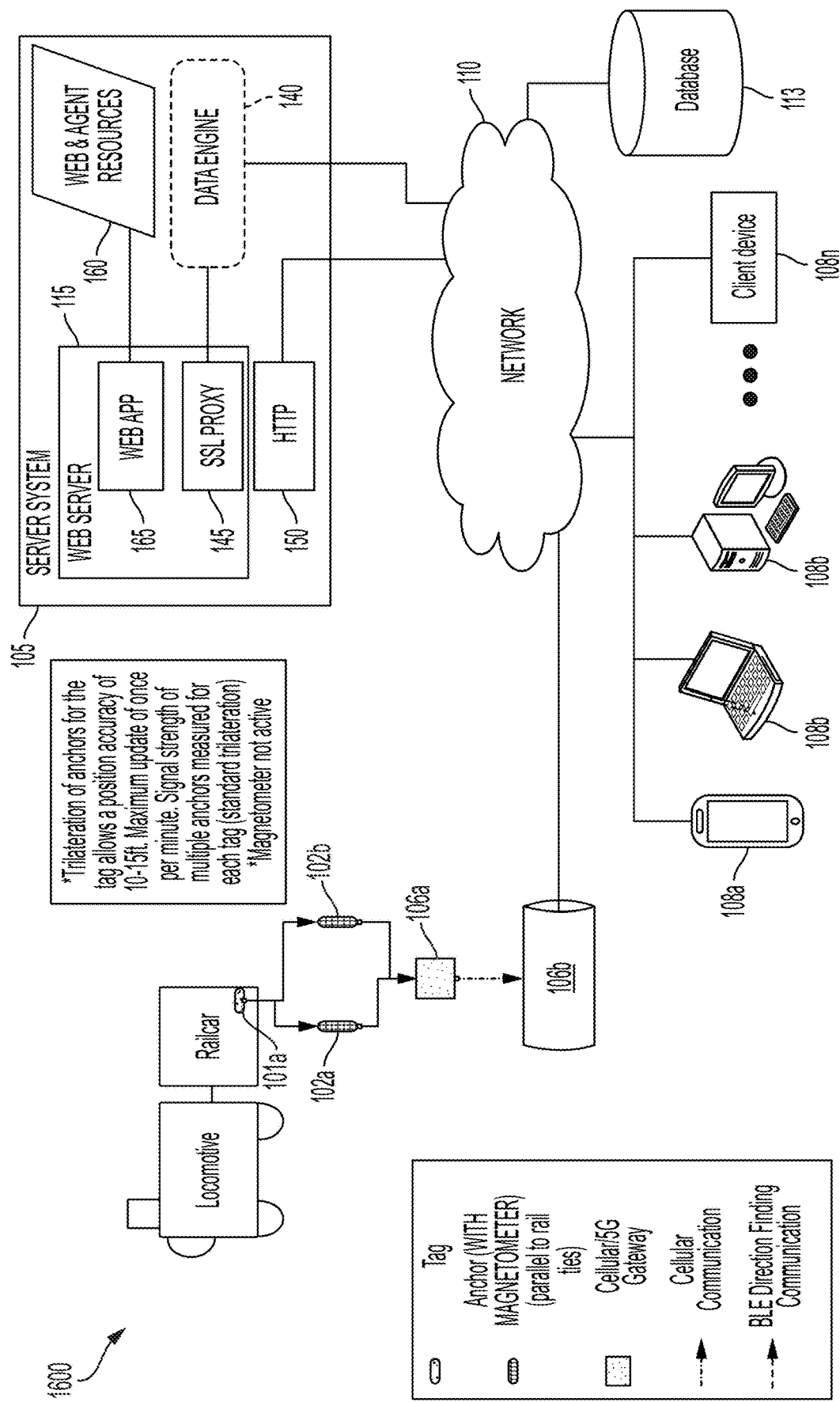
FIG. 16 shows an implementation where a trilateration process is used in detecting smart data associated with a vehicle to which a tag is coupled.

FIG. 16 shows an implementation where a trilateration process is used in detecting smart data associated with a vehicle to which the tag 101a (e.g., smart tag) is coupled. In such cases, a magnetometer associated with at least one or two of the anchor systems 102a and 102b may be deactivated in favor of using the trilateration process and thereby conserve energy associated with operating at least one of the anchor systems 102a and 102b.

Figure 17:
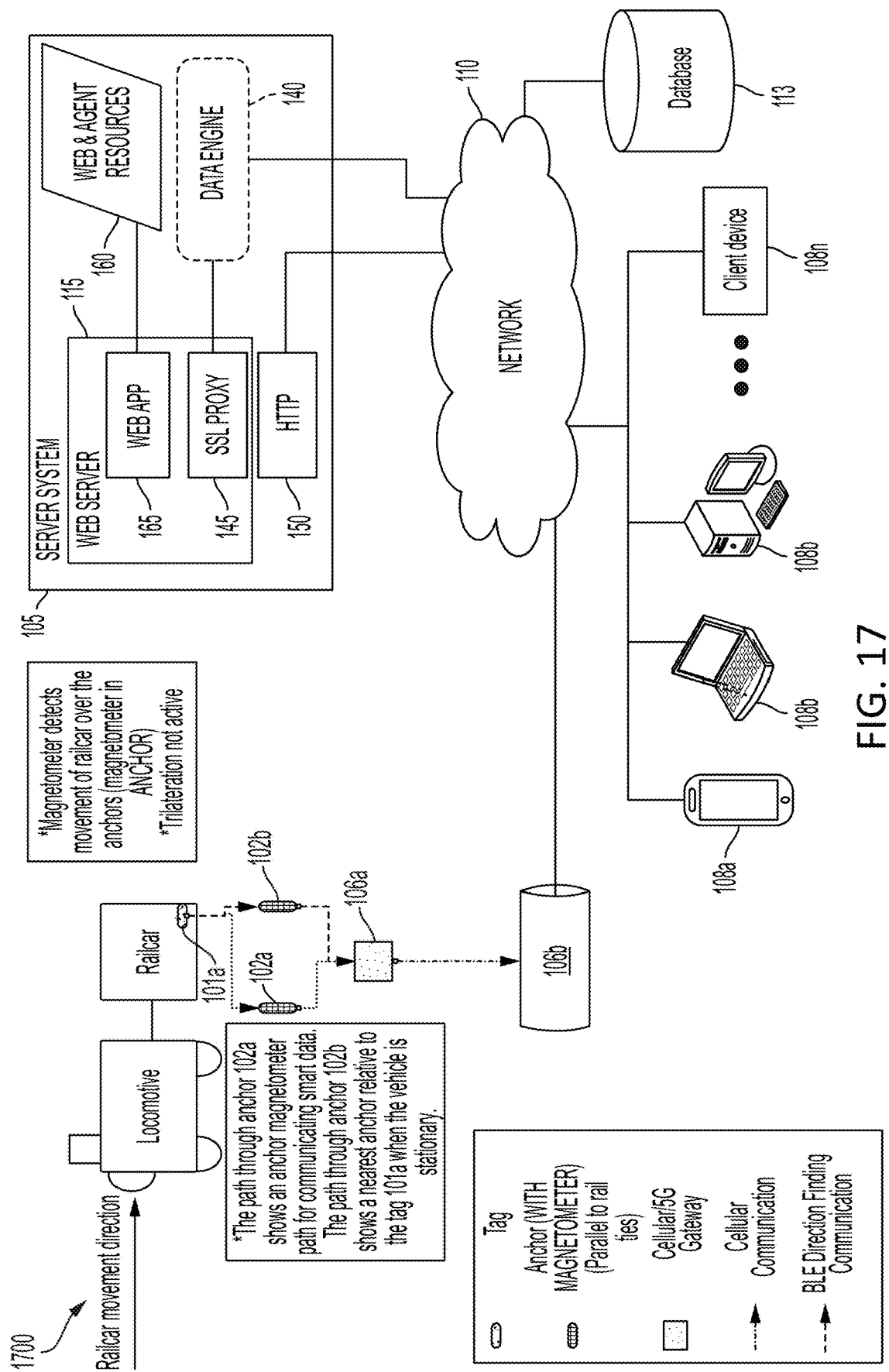
FIG. 17 depicts a magnetometer comprised in an anchor systems and which is used to detect a direction for a vehicle in motion to which the tag is coupled.

In FIG. 17, a magnetometer comprised in, for example, the anchor systems 102 may be used to detect a direction for the vehicle in motion to which the tag 101 is coupled such that vehicle direction data may be combined with smart data prior to being transmitted to systems (e.g., computing systems 108a . . . 108n, and/or server system 105) coupled to the network 110. On the flip side, once the vehicle to which the smart tag is coupled becomes stationary, a nearest anchor system 102b may be used to communicate smart data associated with the vehicle or a load comprised in a cargo housing unit of the vehicle. It is appreciated that the disclosed anchor system can include a magnetometer while the disclosed smart tags can include an accelerometer such that the anchor system and the smart tag system can be used together to determine, for example, motion data of a vehicle.

Figure 18B:
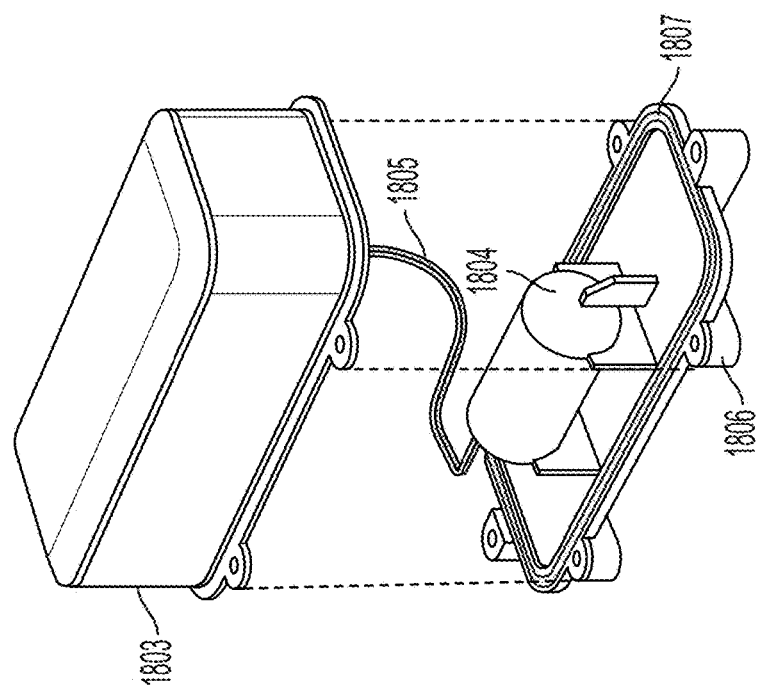
FIGS. 18A-18D provide exemplary exploded views of an anchor system with indications of how various components of the anchor system are couple or otherwise attached to each other.
Figure 18C:
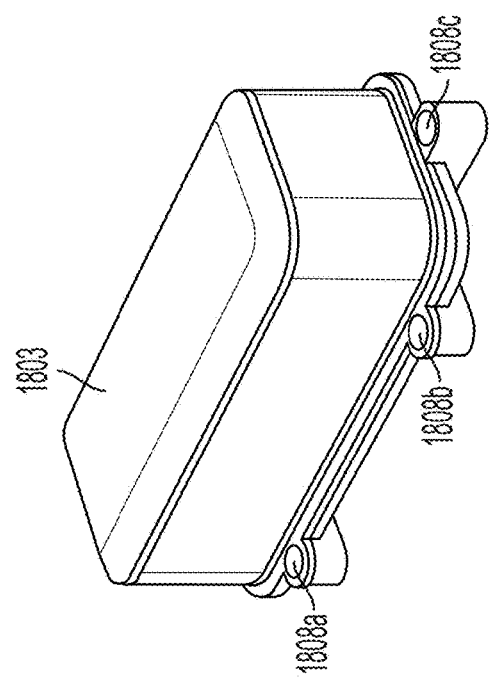
Figure 18A:
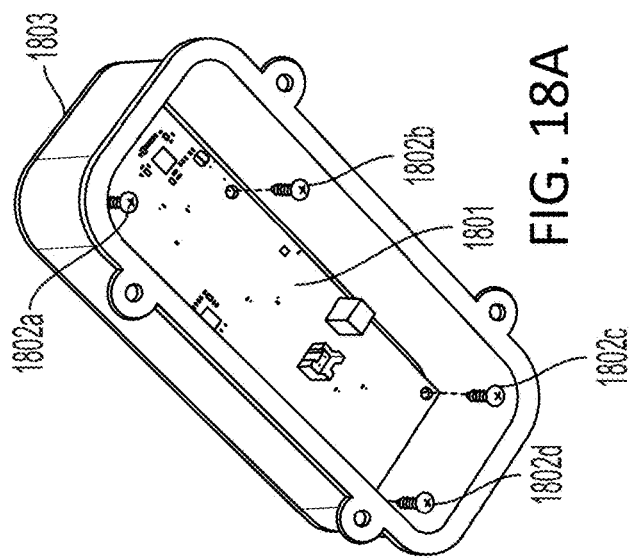

FIGS. 18A-18E provide exemplary exploded views of an anchor system with indications of how various components of the anchor system are coupled or otherwise attached to each other. In FIG. 18A, an electronic circuit 1801 of the anchor system may be fastened using fasteners 1802a . . . 1802d to a cap or casing member 1803 of the anchor system. The fasteners 1802a . . . 1802d, for example, may include screws, snap-on members, adhesives, etc. In addition, the electronic circuit 1801 may comprise memory devices, communication devices, one or more sensors (e.g., proximity sensors, magnetometers, etc.), etc.

Turning to FIG. 18B, a longevity energy source 1804 comprised in the anchor system may be electrically coupled to the electronic circuit 1801 via a signal or power line 1805. Furthermore, a mounting or base member 1806 may be physically attached to the cap or casing member 1803 such that a seal member 1807 beneficially seals, tightens, or hermetically isolates internal components within the anchor system from environmental elements. In particular, the anchor system can comprise a mounting or base member 1806 which can be coupled to a pathway through which a tag (e.g., smart tag) travels. The seal member 1807 may be designed or configured to secure the anchor casing member 1803 to the mounting or base member 106 and thereby minimize an impact of weather effects on the electronic circuit 1801 and the longevity energy source 1804. In FIG. 18C, the cap or casing member 1803 is attached to the mounting or base member 1806 such that one or more receptacles 1808a . . . 1808c are designed to receive additional fasteners (e.g., screws, bolts, etc.) that tighten and/or fuse the cap or casing member 1803 to the mounting or base member 1806. According to one embodiment, at least one of the one or more receptacles 1808a . . . 1808c and/or other fastening members (not shown) may be used to attach or otherwise secure the anchor system to a pathway or at a location proximal to a pathway through which a vehicle with a tag travels.

Figure 18D:
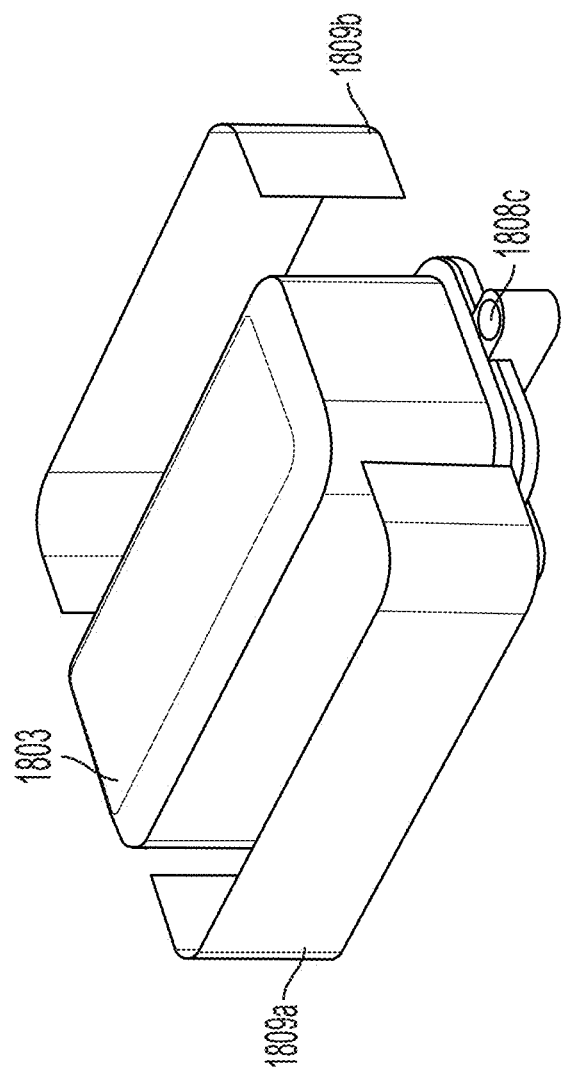

FIG. 18D shows an implementation where at least two reflector members 1809a and 1809b are attached to the cap or casing member of the anchor system. In particular, the reflector members 1809a and 1809b may be adapted to reflect light and thereby make visible the anchor system or the casing member 1803 when the casing member 1803 (e.g., also referred to elsewhere herein as anchor casing) is illuminated with natural or artificial light.

Figure 19C:
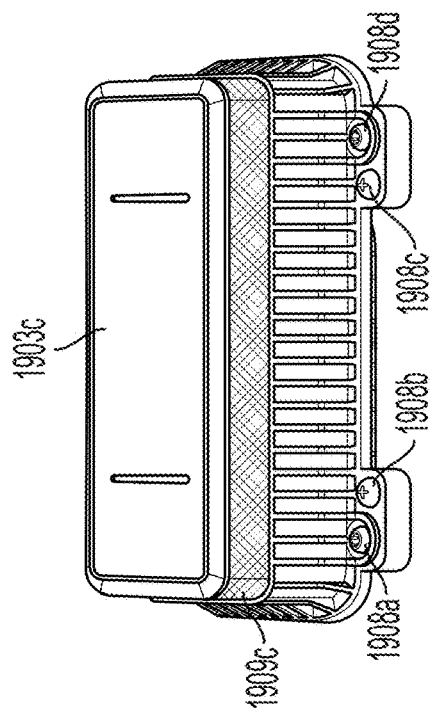
FIGS. 19A-19C show exemplary designs for an anchor system.
Figure 19B:
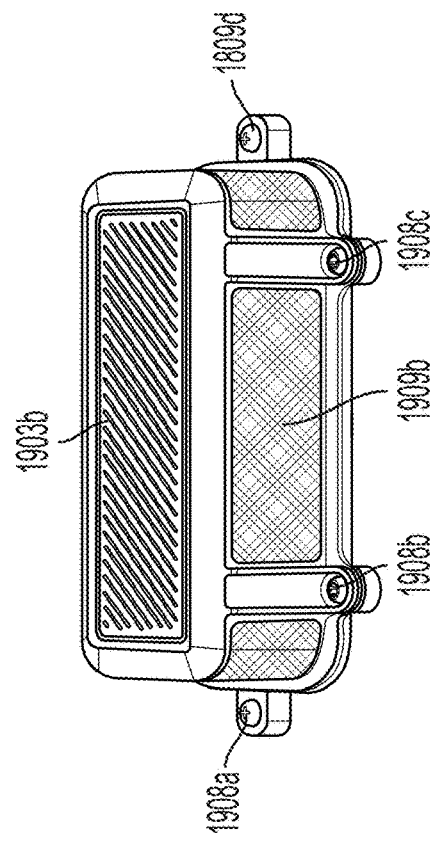
Figure 19A:
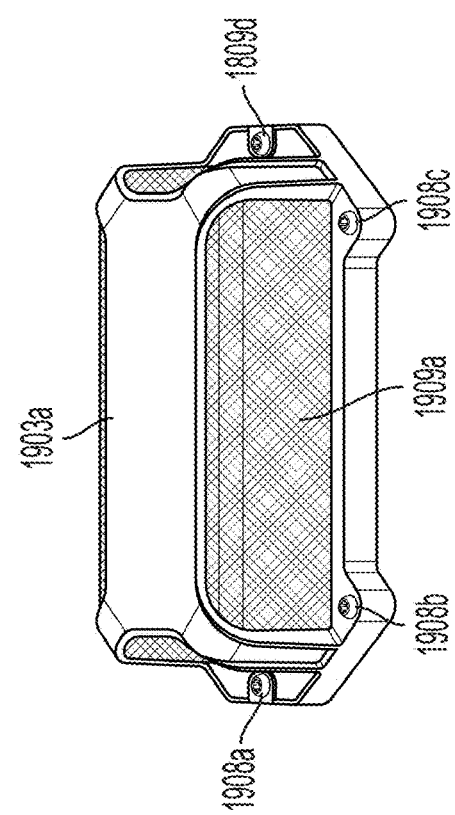

FIGS. 19A-19C show exemplary designs for an anchor system. FIGS. 19A-19B depict a coupling of the base or mounting members of two anchor systems to cap or casing members 1903a and 1903b using a hexagonal arrangement of receptacles that are adapted to receive at least six fasteners (e.g., screws) including fasteners 1908a . . . 1908d. In some embodiments, at least one of the hexagonal arrangement of receptacles may be adapted to couple the anchor system to a structure (e.g., physical structure) associated with a pathway through which a vehicle with a tag (e.g., smart tag) travels. In addition, the anchor systems shown in this figure may have at least one reflector member (e.g., reflector members 1909a and 1909b) to facilitate visually identifying the two anchor system designs shown.

In FIG. 19C, the base or mounting member may be coupled to a cap or casing member 1903c of the anchor system using a quad receptable structure with two receptacles at each of the four locations of the quad receptacle structure. For example, two fasteners 1908a and 1908b may be used to attach the mounting member to the cap member 1903c. Similarly, two fasteners 1908c and 1908d may be used to attach the mounting member to the cap member 1903c. According to one embodiment, at least one of the two receptacles at each of the four locations of the quad receptacle structure may be used to fasten or otherwise secure the anchor system to a pathway or to a structure proximally located relative to a pathway through which a vehicle with a tag travels. In addition, the anchor system shown in this figure may have at least one reflector member 1909c to facilitate visually identifying the anchor system.

Additional Embodiments

According to one embodiment, a direction-finding process (e.g., a tag direction finding process) allows an anchor system to determine an angular position of a vehicle (e.g., a railcar) to which a tag (e.g., a smart tag) is coupled relative to said anchor system. This feature beneficially enables: determining precise location data associated with the vehicle; and/or earmarking the vehicle to a specific location (e.g., specific rail track or vehicle pathway) within the tag network relative to the anchor system; and/or 'snaping' the vehicle (e.g., a railcar) to a specific pathway (e.g., track) within the tag network as soon as the tag is coupled to the vehicle (e.g., a railcar) without requiring said vehicle to be moved to invoke a magnetometer-based track snapping. According to one embodiment, the location data referenced above may be comprised in the smart data derived from the tag system such that a visual indicator or a digital marker object is generated based on the location data wherein the visual indicator or the digital marker object indicates (e.g., surgically points to) a specific or non-specific location of the vehicle within the tag network provided in this disclosure. For example, the visual indicator or the digital marker object may be embedded or superimposed on a map or a multi-dimensional layout image (e.g., the multi-dimensional visualization of FIG. 8) such as a map or a geographical canvas associated with the tag network to show or estimate the specific location within the specific or non-specific location within the tag network.

In exemplary implementations, the disclosed tag systems may be applied to asset management at a given site (e.g., a resource site, a factory site, etc.). For example, assets that can be managed with the disclosed solution are not restricted to only vehicles or cargo carrying vehicles. Rather, the disclosed solution may be used to manage assets such as plant motorized vehicles, cars, trucks, trailers, International Organization for Standardization (ISO) tanks, shipping containers, etc. Furthermore, the tag systems in these implementations may be coupled to respective assets using, for example, mounting screws, magnets, or some other coupling members that attach the tag systems to said assets.

According to some embodiments, inter-tag communication and/or communication between a given tag system with any device coupled to the network 110 may be achieved without an anchor system or multiple anchor systems. In such cases, a LoraWan communication protocol and/or a 5G communication protocol, and/or a mesh communication protocol, and/or a 5G mesh communication protocol, and/or a cellular communication protocol, and/or a wirepas communication protocol, and/or a wirepas mesh (WM) communication protocol may be employed. According to one embodiment, at least one of the foregoing communication protocols beneficially enables reorienting and/or reconfiguring the tag network to identify and/or skip over non-working anchor systems or tag systems and/or faulty anchor systems or tag systems and thereby communicate smart data based on at least one functioning anchor system or tag system.

In some cases, communication between a tag system and a gateway system may be determined (e.g., defined) by at least one of the foregoing communication protocols such that the tag systems can rely on information added to the smart data from at least a computing positioning engine and/or a database configured to enhance or otherwise enable the communication between the tag system and the gateway system. In some instances, generating smart data (e.g., data derived from one or more tag systems, sensor systems, anchor systems, etc.) can take a number of forms as defined in an API specification (e.g., data specification) associated with the tag network. In addition, the smart data may be customized to include user specific identifiers or data fields including a metadata field (e.g., an INET_META field) and a pathway identifier field (e.g., a TRACK_ID field), etc. The metadata field, for example, can comprise a variety of information that is specific to a given user or a user's implementation of the tag network. Such user-specific data include location identifiers (e.g., Plant_ID, Yard_ID, Track_ID, System_Code, Car_Init, Car_No, etc.). In addition, the smart data may be transmitted based on an Internet networking (INET) platform such that data from sensor systems to tag systems, for example, may be subsequently conveyed to anchor systems and ultimately to other systems coupled to the network 110 such as server systems 105 based on the INET platform communication configurations. In some cases, the smart data has a JavaScript Object Notation (JSON) format.

Figure 20B:
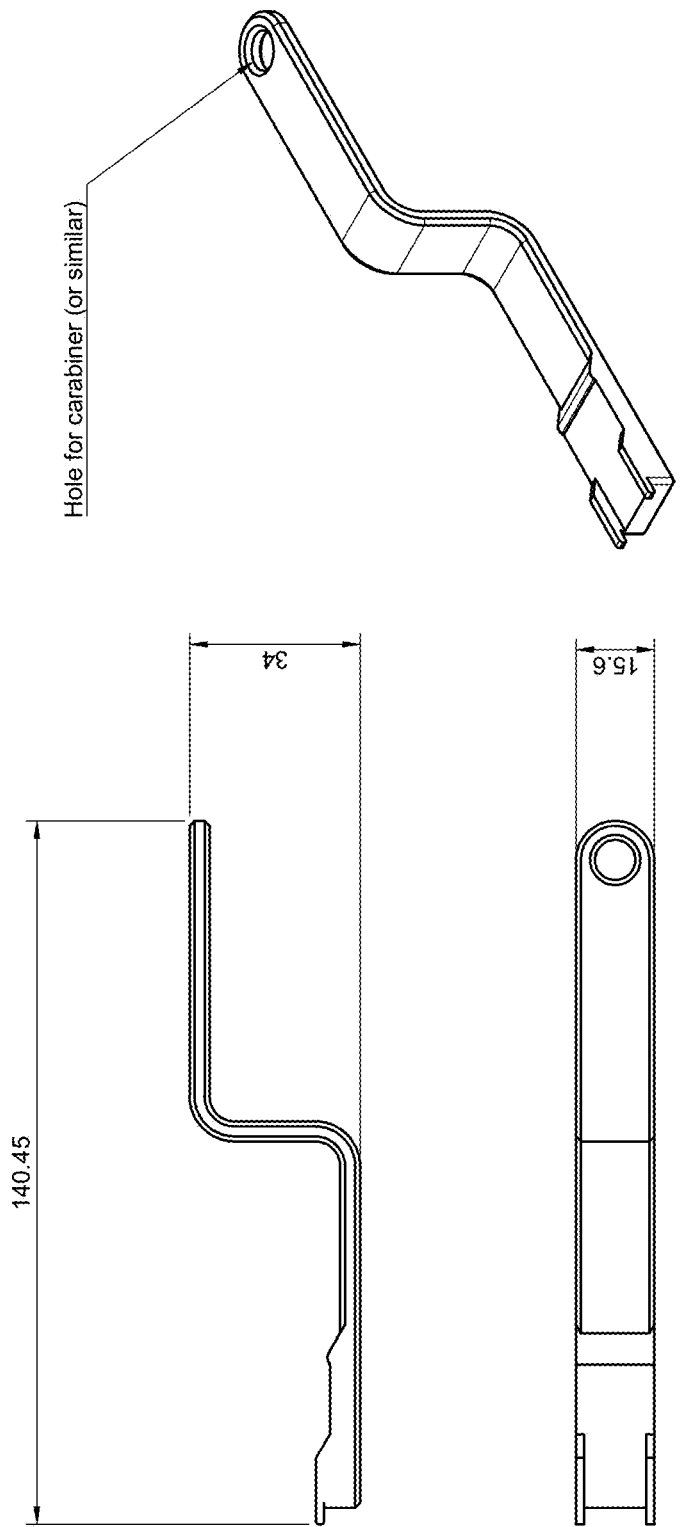

According to one embodiment, the energy source (e.g., longevity energy source) discussed in association with the disclosed tag systems and/or anchor systems may be recharged or otherwise maintained at specific energy threshold levels using: a kinetic charging process associated with a vehicle to which a tag system is coupled; and/or a solar charging process that maintains said energy threshold level and thereby ensures the operation of one or more tag systems or anchor systems within the tag network. Furthermore, a weatherproof casing may be used to house at least one or more tag systems and/or anchor systems within the tag network. For example, the weatherproof casing may include a slide and clip structure that easily allows the changing of components (e.g., a longevity energy source like a battery, a circuit board, a sensor, etc.) within the tag system or anchor system as the case may require. FIGS. 20A-20B provide exemplary weatherproof casings that can be used to house one or more components of a tag system, an anchor system, and/or a sensor system.

According to one embodiment, the API gateway 250 may receive datasets, data, or commands which may or may not be specific to individualized implementations of the disclosed methods or may be specific to individualized API units 230 as the case may require. Furthermore, the datasets, data, or commands may include: information associated with the longevity energy source (e.g., battery) comprised in one or more of the tag system, sensor system, and/or gateway system; information associated with an environment (e.g., a tag network) within which one or more of the tag system, the sensor system, and/or the gateway system are implemented; information associated with climatic conditions (e.g., temperature, humidity, pressure, etc.) surrounding one or more of the sensor system, the tag system, the anchor system, and/or a cargo housing unit to which the sensor system or tag system is coupled; information comprising location data associated with the tag system, the sensor system, the anchor system, and/or location data associated with a cargo housing unit to which the tag system or the anchor system is coupled; information indicating identifier data associated with one or more of the tag system, the anchor system, or the sensor system; information indicating pathway data or trajectory data associated with a vehicle or cargo housing unit to which the tag system or the sensor system are coupled; information indicating kinematic data (e.g., velocity data, acceleration data, directional data, etc.) associated with a vehicle or a cargo housing unit to which the sensor system or the tag system is coupled; etc. It is appreciated that the datasets, data, or commands may be transmitted and/or received as part of the disclosed smart data such that the transmitted datasets, data, or commands may have metadata including: timestamp data (e.g., marking the time of transmittal of the datasets, data, or commands); source data indicating a source or a system from which the metadata or the smart data originates; resolution data indicating a sensitivity of sensors used to capture data from the sensor systems and/or smart tag systems; etc.

Exemplary Network Configurations

Figure 21:
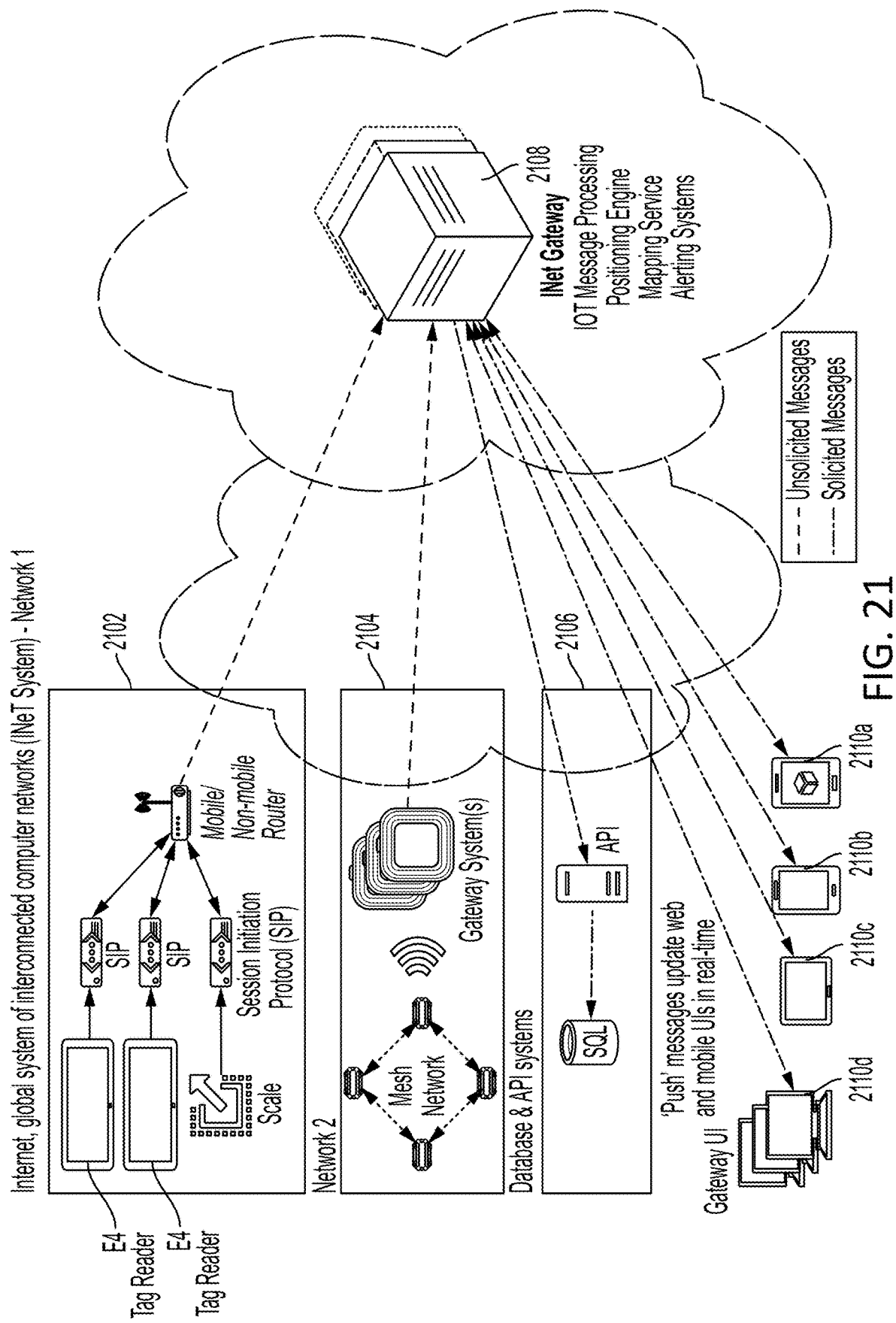
FIG. 21 shows an exemplary coupling of multiple networks comprised in a tag network.

According to one embodiment, the disclosed tag network may comprise a plurality of networks which, in aggregate, constitute the tag network. For example, and as indicated in FIG. 21, the tag network may include a first network 2102, a second network 2104, and an intermediary system 2106 all of which can be communicatively coupled to systems including a gateway system 2108 and computing systems 2110*a* . . . 2110*d*.

The first network 2102, for example, may comprise one or more tag readers that are scalable to beneficially facilitate scanning of mobile or stationary tag systems (e.g., tag systems coupled to mobile or stationary cargo or cargo housing units or vehicles). According to one embodiment, the one or more tag readers may be configured to use a session initiation protocol (SIP) that enables a real-time communication protocol to facilitate multi-user sessions, regardless of the data content associated with the smart data. Furthermore, the one or more tag readers may communicate with other systems (e.g., gateway system 2108) via a router or some other network coupling device that connects the first network 2102 to other networks or systems associated with the tag network.

The second network 2104 can comprise one or more mesh networks that couple a plurality of anchor systems together so that the detection of one anchor system facilitates the detection of other anchor systems in the one or more mesh networks. Furthermore, a first gateway system associated with the second network 2104 may relay smart data from one or more tags associated with the one or more mesh networks to the gateway system 2108, which in this case, can be regarded as a second gateway system of the tag network.

The intermediary system 2106 may comprise one or more databases and/or one or more application programming interfaces (APIs) that facilitate a plurality of computing operations associated with the first network 2102, the second network 2104, and other systems comprised in the tag network including the gateway system 2108 and computing systems 2110*a* . . . 2110*d*. The one or more databases may store data or datasets (e.g., such as those discussed above) including smart data. The one or more APIs according to some embodiments, can facilitate computing operations associated with the tag network including analyzing smart data, formatting multi-dimensional visualizations associated with the smart data for rendering on a display device, initiating configuration and system update operations associated with tag systems, tag readers, sensor systems, anchor systems, and gateway systems, etc.

As previously discussed, the computing systems 2110*a* . . . 2110*d* can comprise a laptop computer, a desktop computer, a handheld computing device, a smart phone, a wearable computing device, a tablet computing device, a virtual machine, a cloud-based computing solution and/or a cloud-based service, and/or the like.

Figure 22:
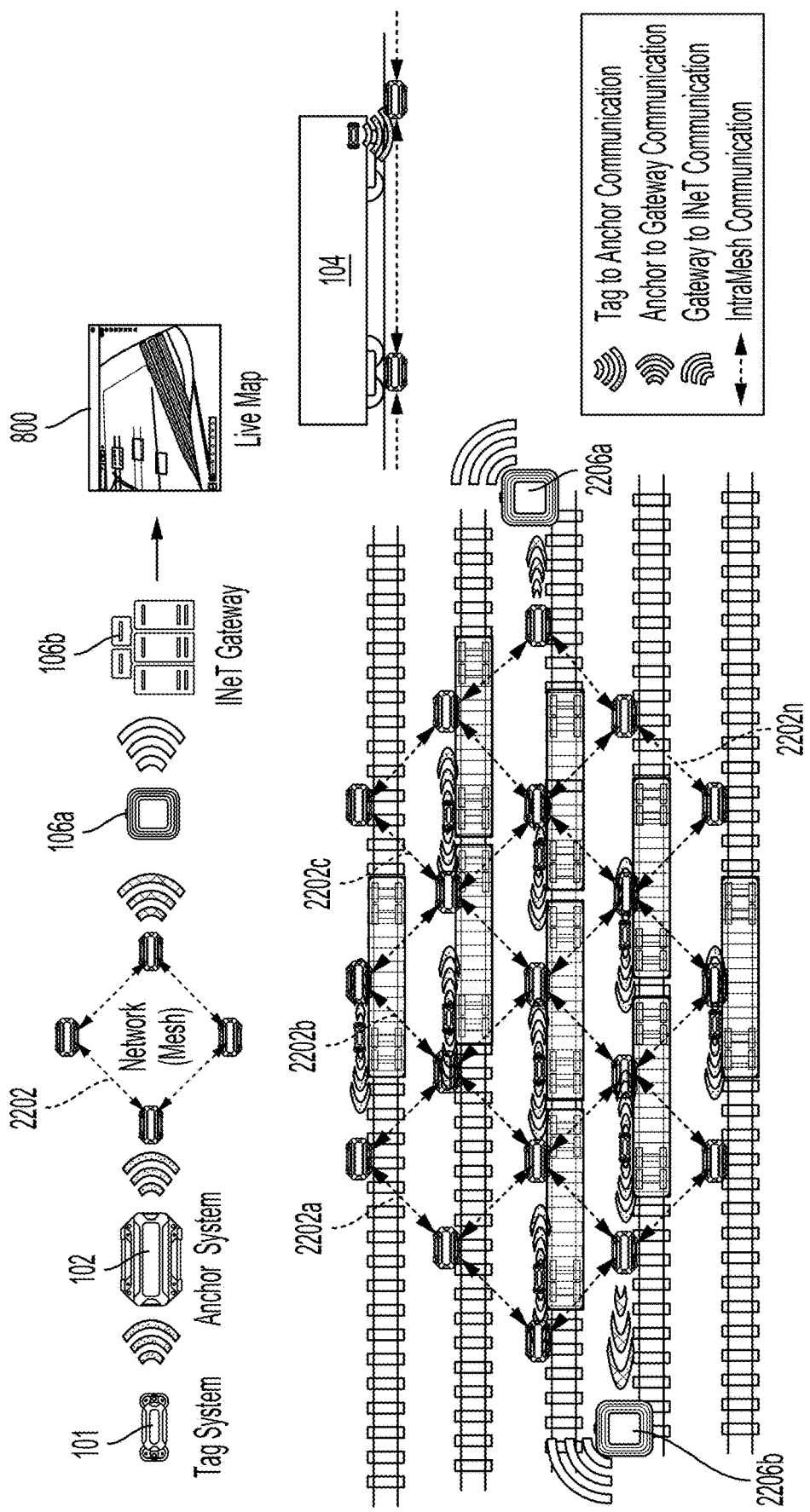
FIG. 22 provides a coupling of a micro-mesh network of anchor systems to generate a macro-mesh network of anchor systems comprised in a tag network.

FIG. 22 provides a coupling of a micro-mesh network of anchor systems to generate a macro-mesh network of anchor systems comprised in a tag network. As previously noted, one or more tag systems 102 (e.g., tag systems coupled to vehicle 104) can be coupled to each other to communicate with anchor systems in a mesh network (e.g., mesh network 2202) configuration such that detection (e.g., detection by an anchor system 102) of one anchor system comprised in the mesh network beneficially facilitates detection of remaining anchor systems in said mesh network. Furthermore, the smart data associated with the tag network may be propagated through gateway systems 106*a* and 106*b* and later used to generate multi-dimensional visualizations 800 such as those discussed in association with FIG. 8.

In the illustrated implementation, a plurality of micro-mesh network of anchor systems 2202*a* . . . 2202*n* may be coupled to each other to form a macro-mesh network of anchor systems. One benefit of having this configuration is that very minimal quantities of gateway systems 2206*a* and 2206*b* can be used for relaying smart data or communicating instructions and/or other data to systems coupled to the tag network.

Energy Systems for Smart Tags and/or Anchor Systems and/or Gateway Systems

It is appreciated that the disclosed smart tags, and/or anchor systems, and/or gateway systems may be powered by one or more primary energy systems (e.g., miniaturized or non-miniaturized energy systems) that can include a battery energy source and/or a rechargeable battery energy source. According to one embodiment, the one or more primary energy systems are charged, driven, or otherwise replenished using one or more secondary energy systems including: a solar energy system coupled to a vehicle to which the disclosed smart tags and/or anchor systems and/or gateway systems are coupled; or an energy system of the vehicle (e.g., vehicle battery, vehicle alternator, etc.) to which a smart tags and/or anchor systems and/or gateway systems coupled.

According to some embodiments, the one or more primary energy systems comprised in, or associated with the disclosed smart tags and/or, anchor systems, and/or gateway systems are replenished or otherwise powered or charged using a tertiary energy system that perpetually or periodically charges the one or more primary energy systems based on kinetic energy. In particular, the tertiary energy system may comprise a kinetic energy conversion system that leverages motion of one or more vehicles to which the disclosed smart tags and/or an anchor systems are coupled to charge the one or more primary energy systems. For example, a forward motion and/or reverse motion of vehicles (e.g., vehicles to which a smart tag and/or an anchor system is coupled) such as a railcar, a train, a truck, a car, a motorcycle, an autonomous vehicle, etc., can be used to charge the one or more primary energy systems comprised in, or associated with the disclosed smart tags and/or anchor systems and/or gateway systems. The kinetic energy converting system may be comprised in, or external to the disclosed smart tags and/or anchor systems. In addition, a forward motion, and/or a reverse motion, and/or upward motion, and/or downward motion of vehicles (e.g., vehicles to which a smart tag and/or anchor system is coupled) such as a drone, an airplane, or other aerial vehicles can be used to charge the one or more primary energy systems comprised in, or associated with the disclosed smart tags and/or anchor systems and/or gateway systems. It is appreciated that kinetic energy associated with regenerative breaking mechanisms of a vehicle to which the disclosed smart tags and/or anchor systems are coupled can be used to charge or replenish the above-referenced one or more primary energy systems of the disclosed smart tags and/or anchor systems and/or gateway systems.

In some cases, the tertiary energy system comprises a triboelectric charging system that leverages friction between a vehicle (e.g., a vehicle to which the disclosed smart tags and/or anchor systems are coupled) and one or more conveyor means on which the vehicle runs to charge the one or more primary energy systems. In the case of a train vehicle, for example, frictional energy derived from the wheelsets of the train vehicle and the railroad track can be used to charge the one or more primary energy systems comprised in, or associated with the disclosed smart tags and/or anchor systems. It is appreciated that a piezoelectric system and/or a flexoelectricity system associated with the vehicle to which the disclosed smart tags and/or anchor systems are coupled can be used to replenish or otherwise charge the one or more primary energy systems of the disclosed smart tags and/or anchor systems and/or gateway systems. It is further appreciated that rotational kinetic energy of the vehicle to which the disclosed smart tags and/or anchor systems are coupled can be converted (e.g., converted via friction) into electrostatic energy which can be subsequently used to charge the one or more primary energy systems of the disclosed smart tags and/or anchor systems and/or secondary systems.

According to some embodiments, the one or more primary energy systems associated with the disclosed smart tags and/or anchor systems and/or gateway systems may be electromagnetically charged, powered, or otherwise activated using electric energy comprised in free flowing electromagnetic transmissions having a first electromagnetic wave frequency that is different from a second electromagnetic wave frequency associated with the disclosed tag or tracker network and/or associated with a network used to transmit and/or receive the disclosed smart data. In some cases, the one or more primary energy systems associated with the disclosed smart tags and/or anchor systems and/or gateway systems may be electromagnetically charged, powered, or otherwise activated using electric energy comprised in a targeted electromagnetic transmission from a remote energy source relative to a vehicle to which the disclosed smart tags and/or anchor system are coupled. In such cases, the targeted electromagnetic transmission has a third electromagnetic wave frequency that is different relative to the above-referenced second electromagnetic wave frequency associated with the disclosed tag or tracker network and/or associated with a network used to transmit and/or receive the disclosed smart data.

In cases where it is desirable to eliminate or minimize the use of electric cabling for charging one or more of the disclosed smart tags, and/or anchor systems, and/or gateway systems, the disclosed smart tags, and/or anchor systems, and or gateway systems may be dynamically moved or otherwise periodically hovered or placed proximal to an electric induction charging system that charges the one or more primary energy systems. For example, a vehicle such as a train, a drone, a car, etc., may periodically dock at stations (e.g., rail yard, drone yard, etc.) that have one or more induction systems which automatically charge or replenish energy comprised in the one or more primary energy systems by virtue of their proximity (e.g., proximity of vehicle) relative to the one or more induction systems. In some cases, the electric induction charging system may be proximally moved to a smart tag and/or an anchor system and/or a gateway system requiring a charge or energy replenishment.

In some cases, mechanical stress including ambient vibrations of a conveyor means can be used to charge one or more primary energy systems disclosed herein. For example, ambient vibrations associated with conveyor means such as rail tracks on which a vehicle (e.g., a locomotive, a railcar, or a train) travels can be leveraged to charge at least primary energy systems of anchor systems coupled to said conveyor means. In such instances, a piezoelectric system associated with the conveyor means can be configured to convert mechanical stress such as ambient vibrations associated with the conveyor means into electrical energy that charges or powers one or more primary energy systems comprised in, or associated with the anchor system coupled to the conveyor means. Ambient vibrations associated with the conveyor means, for example, may be due to: kinetic energy derived from movement of the vehicle (e.g., a train or a railcar) over the conveyor means; and/or vibrations due to tectonic movements; and/or vibrations due to wind motion; etc.

It is appreciated that two or more combinations of the forgoing secondary energy systems and/or tertiary energy systems, and/or electric energy comprised in free flowing electromagnetic transmissions, and/or electric energy comprised in the targeted electromagnetic transmissions, and/or electric induction charging systems may be used to charge and/or extend and/or replenish the energy of the one or more primary energy systems that power the disclosed smart tags, and/or anchor systems, and/or gateway systems.

In some cases, mechanical stress including ambient vibrations of a conveyor means can be used to charge one or more primary energy systems disclosed herein. For example, ambient vibrations associated with conveyor means such as rail tracks on which a vehicle (e.g., a railcar or a train) travels can be leveraged to charge at least primary energy systems of anchor systems coupled to said conveyor means. In such instances, a piezoelectric system associated with the conveyor means can be configured to convert mechanical stress such as ambient vibrations associated with the conveyor means into electrical energy that charges or powers one or more primary energy systems comprised in, or associated with the anchor system coupled to the conveyor means. Ambient vibrations associated with the conveyor means, for example, may be due to: kinetic energy derived from movement of a vehicle (e.g., a train or a railcar) over the conveyor means; and/or vibrations due to tectonic movements; and/or vibrations due to wind motion; etc.

Additional Exemplary Workflows

Figure 23:
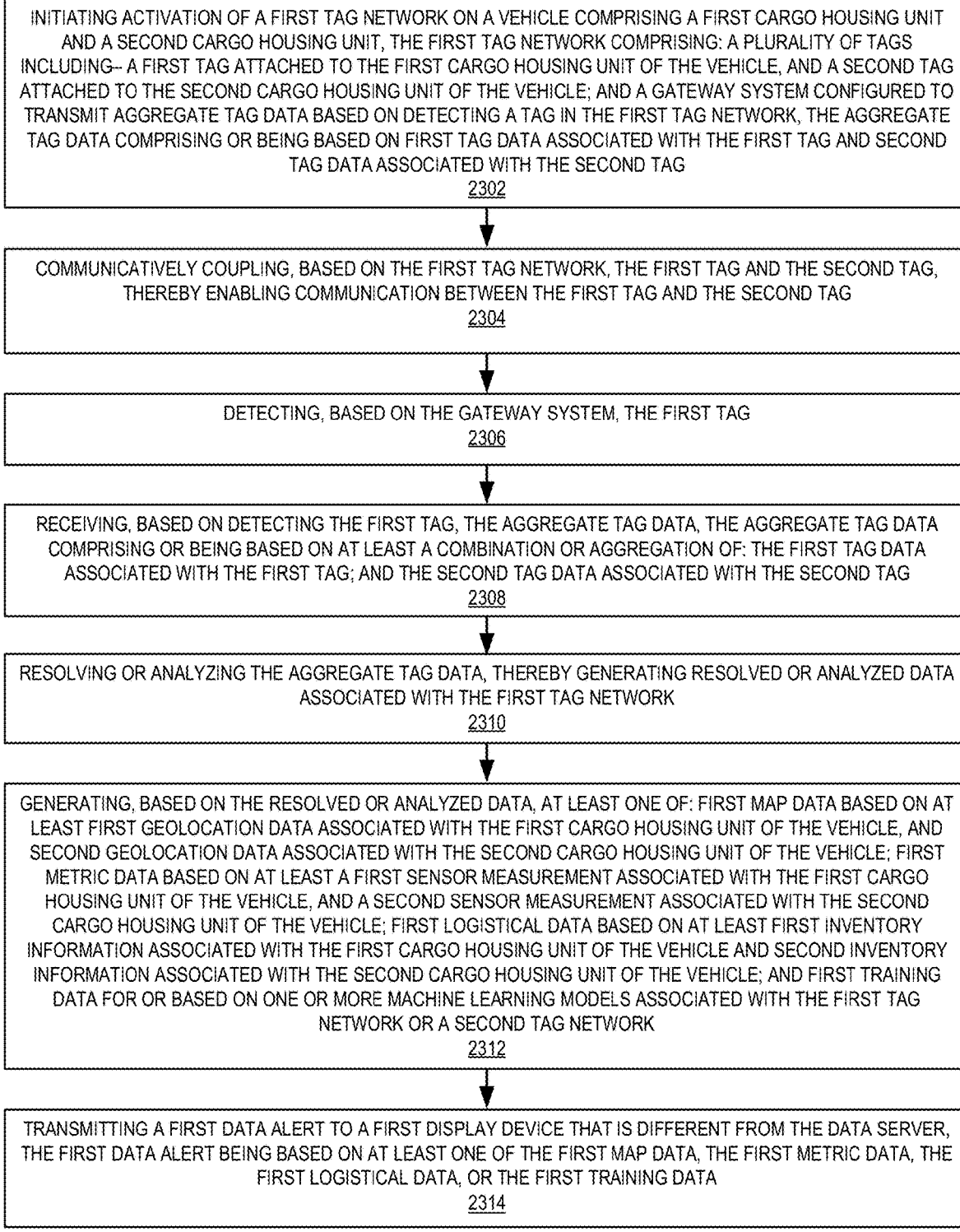
FIG. 23 provides an additional exemplary workflow for dynamically analyzing smart data within a tag network.

FIG. 23 provides an additional exemplary workflow for dynamically analyzing smart data within a tag network. It is appreciated that a data engine stored in a memory device may cause a computer processor associated with a data server to execute the various processing stages of FIG. 23. For example, the disclosed techniques may be implemented as a data engine comprised in a logistical software tool such that the data engine enables the generation, tracking, and utilization of tag data (e.g., smart data) as further disclosed below.

At block 2302, the data engine initiates activation of a first tag network (e.g., a secondary communication network on the vehicle outside, for example, a railyard or a primary location where the vehicle docks or parks) on a vehicle comprising a first cargo housing unit and a second cargo housing unit. The first tag network can comprise: a plurality of tags including a first tag attached to the first cargo housing unit of the vehicle, and a second tag attached to the second cargo housing unit of the vehicle; and a gateway system configured to transmit aggregate tag data based on detecting a tag in the first tag network, the aggregate tag data comprising or being based on first tag data associated with the first tag and second tag data associated with the second tag.

At block 2304, the data engine communicatively couples, based on the first tag network, the first tag and the second tag, thereby enabling communication between the first tag and the second tag.

Turning to block 2306, the data engine detects, based on the gateway system, the first tag.

In addition, the data engine receives, based on detecting the first tag, the aggregate tag data. According to one embodiment, the aggregate tag data comprises or is based on at least a combination or aggregation of: the first tag data associated with the first tag; and the second tag data associated with the second tag.

At block 2310, the data engine resolves or analyzes the aggregate tag data, thereby generating resolved or analyzed data associated with the first tag network.

According to one embodiment, the data engine generates, based on the resolved or analyzed data at block 2312, all of, or at least one of, or at least two of, or at least three of: first map data based on at least first geolocation data associated with the first cargo housing unit of the vehicle and second geolocation data associated with the second cargo housing unit of the vehicle; first metric data based on at least a first sensor measurement associated with the first cargo housing unit of the vehicle and a second sensor measurement associated with the second cargo housing unit of the vehicle; first logistical data based on at least first inventory information associated with the first cargo housing unit of the vehicle and second inventory information associated with the second cargo housing unit of the vehicle; and first training data for or based on one or more machine learning models associated with the first tag network or a second tag network (e.g., a primary tag network associated with a location where the vehicle parks or docks such as a railyard).

Turning to block 2314, the data engine transmits a first data alert to a first display device that is different from the data server. The first data alert, for example, can be based on at least one of the first map data, the first metric data, the first logistical data, or the first training data.

In another embodiment, a system and a computer program can include or execute the method described above. These and other implementations may each optionally include one or more of the following features.

The first tag network comprises a plurality of tags associated with the vehicle including the first tag and the second tag, such that: the plurality of tags are communicatively coupled to each other in a mesh network; the plurality of tags are configured to be in data communication with each other based on the mesh network; the aggregate tag data comprises tag data from each of the plurality of tags based on the data communication; and detection of the first tag by the gateway system enables detection or reception of the aggregate tag data.

According to one embodiment, each tag of the plurality of tags is attached to a cargo housing unit comprised in at least a selection of cargo housing units of the vehicle. The selection of cargo housing units can include the first cargo housing unit and the second cargo housing unit. In addition, the first map data comprises a multidimensional visualization indicating one or more of: location data for each cargo housing unit comprised in at least the selection of cargo housing units of the vehicle such that the location data comprises the first geolocation data and the second geolocation data; and logistics data for each cargo housing unit comprised in at least the selection of cargo housing units of the vehicle such that the logistics data comprises at least the first logistical data.

In some instances, the logistics data indicates one or more of: inventory data associated with each cargo housing unit comprised in at least the selection of cargo housing units of the vehicle; shipment or tracking data associated with each cargo housing unit comprised in at least the selection of cargo housing units of the vehicle; delivery time data associated with each cargo housing unit comprised in at least the selection of cargo housing units of the vehicle; and sequence data associated with an arrangement or organization or structuring or sequencing of each cargo housing unit comprised in the selection of cargo housing units of the vehicle.

In addition, the first metric data comprises telemetric data with the first sensor measurement or the second sensor measurement, such that: the first sensor measurement comprises data measurements associated with monitoring cargo comprised in the first cargo housing unit; and the second sensor measurement comprises data measurements associated with monitoring cargo comprised in the second cargo housing unit.

Furthermore, the telemetric data comprises motive data associated with the vehicle. In one embodiment, the motive data indicates kinematic information associated with at least a selection of cargo housing units of the vehicle including the first cargo housing unit and the second cargo housing unit.

It is appreciated that the kinematic information includes: start motion data associated with the vehicle or the selection of cargo housing units of the vehicle such that the start motion data indicating a movement of the vehicle or the selection of cargo housing units of the vehicle; stop motion data associated with the vehicle or the selection of cargo housing units of the vehicle such that the stop motion data indicating stasis of the vehicle or the selection of cargo housing units; vibration data associated with the vehicle or the selection of cargo housing units or a conveyor means on which the vehicle moves; and collision data associated with the vehicle hitting an object when the vehicle is in motion or in stasis; or a cargo housing unit coupled to the vehicle hitting an object when the vehicle is in motion or in stasis.

It is further appreciated that the first tag or the second tag is comprised in a smart tag or tracking system configured for inter-tag communication within the first tag network or the second tag network. It is worth noting that the first tag network or the second tag network is a mesh network.

In some embodiments, the smart tag or tracking system is powered by a longevity energy source.

In addition, the vehicle referenced above comprises one of a locomotive, a truck, or a drone.

Furthermore, generating the first map data comprises: determining a satellite map for an area, in which the vehicle or a selection of cargo housing units including the first cargo housing unit and the second cargo housing unit is located, using global positioning system (GPS) data associated with at least the first geolocation data or the second geolocation data; overlaying the satellite map with a structural component of the vehicle thereby generating a digital canvas, the structural component comprising the selection of cargo housing units of the vehicle including the first cargo housing unit and the second cargo housing unit; and labeling the digital canvas with a plurality of display elements data identifiers associated with the vehicle or the selection of cargo housing units of the vehicle thereby generating the first map data.

According to one embodiment, the above method comprises providing a live feed to the first display device of at least the first cargo housing unit of the vehicle or the second cargo housing unit of the vehicle, the live feed including real-time or near real-time video data or image data associated with: the first cargo housing unit of the vehicle; or the second cargo housing unit of the vehicle.

In response to the vehicle entering the second tag network, the method further comprises: detecting, based on an anchor system associated with the second tag network, the first tag; receiving, based on the detecting of the first tag by the anchor system, the aggregate tag data or an updated aggregate tag data; generating, based on the aggregate tag data or the updated aggregate tag data, second map data, second metric data, second logistical data, and second training data; and transmitting a second data alert to the first display device or a second display device that is different from the data server or the first display device, the second data alert being based on at least one of the second map data, the second metric data, the second logistical data, or the second training data.

In the preceding description, for purposes of explanation, numerous specific details are set forth in order to provide a thorough understanding of the disclosure. It will be apparent, however, that the disclosure can be practiced without these specific details. In other instances, structures and devices have been shown in block diagram form in order to avoid obscuring the disclosure. For example, the present disclosure has been described in some implementations above with reference to interfaces and particular hardware. However, the present disclosure applies to any type of computing device that can receive data and commands, and any devices providing tracking and logistics services.

Drone-Based Anchor Placements

Figure 24:
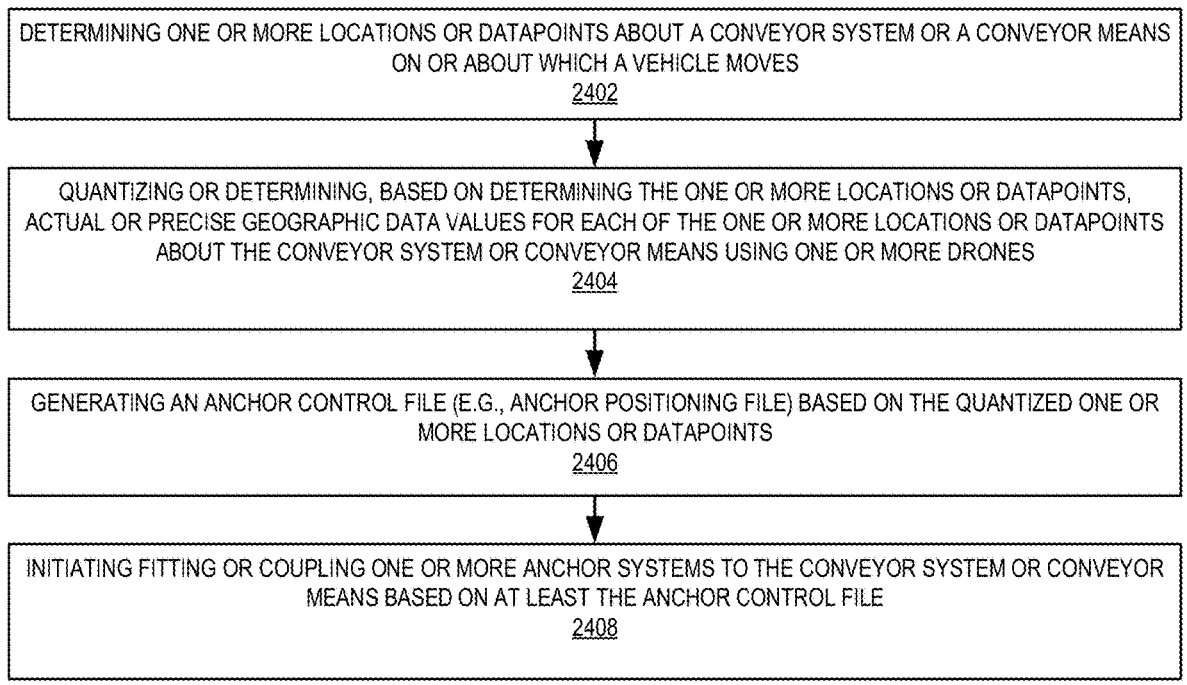
FIG. 24 shows an exemplary workflow for generating an anchor control file configured for optimally placing, controlling, and monitoring anchor systems about a conveyor system or a conveyor means associated with a vehicle.

FIG. 24 shows an exemplary workflow for generating an anchor control file configured for optimally placing, controlling, and monitoring anchor systems about a conveyor system or a conveyor means associated with a vehicle. It is appreciated that a data engine stored in a memory device may cause or initiate the various processing stages of FIG. 24.

According to one embodiment, the method or workflow associated with FIG. 24 comprises determining one or more locations or datapoints about a conveyor system or a conveyor means on or about which a vehicle moves as indicated at block 2402. It is appreciated that the vehicle referenced herein can move on or about the conveyor system or conveyor means (e.g., a road, a ground path, an aerial path, an underground path, a rail track, etc.) as the case may require. In addition, the one or more locations or datapoints, for example, can have associated geographic information including longitude data and/or latitude data and/or azimuth data. Furthermore, determining the one or more locations or datapoints can comprise marking (e.g., digitally marking or physically marking) or designating (e.g., digitally designating or physically designating) the one or more locations or datapoints about the conveyor system or conveyor means.

According to one embodiment, one or more drones or aerial vehicles are configured to validate and/or confirm and/or determine data values for each of the one or more locations or datapoints of the conveyor system or conveyor means. In particular, the one or more drones or aerial vehicles may be deployed to a physical location corresponding to the one or more locations or datapoints around or about the conveyor system or conveyor means to quantize or otherwise determine, at block 2404 based on determining the one or more locations or datapoints, actual or precise geographic data values for each of the one or more locations or datapoints about the conveyor system or conveyor means. This may be achieved using vision sensors (e.g., image or video capturing sensors) and/or radio sensors (e.g., electromagnetic transceivers) associated with the one or more drones or aerial vehicles to capture or otherwise determine the actual or precise geographic data values.

In one embodiment, the quantized one or more locations or datapoints comprise one or more quantitative data values that indicate longitude data, and/or latitude data and/or azimuth data associated with the one or more locations or datapoints about the conveyor system or conveyor means. In some cases, the quantized one or more locations or datapoints comprise one or more qualitative data values that indicate cardinal direction data such as east, west, north, and south information relative to the one or more locations or datapoints about the conveyor system or conveyor means. In particular, the quantized one or more locations or datapoints may comprise geological coordinate data values associated with the one or more locations or datapoints of the conveyor system or conveyor means on which, or about which the vehicle moves.

According to one embodiment, an anchor control file (e.g., anchor positioning file) is generated, at block 2406, based on the quantized one or more locations or datapoints and stored in a database associated with developing and/or implementing one or more of the disclosed anchor systems, smart tag systems, and gateway systems. It is appreciated that the anchor control file can comprise control logic associated with programming each anchor system. It is further appreciated that the anchor control file can comprise: identifier data associated with each anchor system that will be coupled or attached to the conveyor means or conveyor system; and/or identifier and/or control data associated with each anchor system already coupled to or attached to the conveyor means or conveyor system. Specifically, the anchor control file can be used to program each anchor system (e.g., anchor computing system) associated with the conveyor means or conveyor system with precise geolocation data (e.g., longitude data, and/or latitude data, and/or azimuth data, and/or cardinal data) based on the quantized one or more locations or datapoints of the conveyor system or conveyor means prior to, and/or after installing or fitting each anchor system to the conveyor system or conveyor means. In some cases, geocoordinate data (e.g., geocoordinate data comprised in the anchor control file) including the longitude data, and/or the latitude data and/or the azimuth data associated with each anchor system can be programmed into a computing system that controls one or more anchor systems such that the computing system tracks identifier data (e.g., identifier data in a database of the computing system) associated with each anchor system of the one or more anchor systems to control or otherwise manage each anchor system based the anchor control file.

The foregoing approach beneficially enables generating an anchor control file for complex and/or intricate and/or difficult to access conveyor means or conveyor systems such as railyards and thereby enable programming a plurality of anchor systems with relevant geotagging or geolocation data prior to deploying said plurality of anchor systems for installation in various locations about the disclosed conveyor means or conveyor systems.

In exemplary embodiments, each identified and/or programed anchor system is fitted or otherwise coupled to the conveyor system or conveyor means based on at least the anchor control file as indicated at block 2408. In addition, the anchor control file can be used to remotely and/or automatically identify, and/or remotely or automatically update, and/or remotely or automatically commission and/or remotely or automatically decommission one or more anchor systems coupled to the conveyor system or the conveyor means (e.g., coupled to a physical structure of the conveyor means or conveyor system). According to one embodiment, the anchor control file is uploaded to computing system databases associated with the disclosed gateway system such that a positioning engine (e.g., anchor positioning engine or tag or tracker positioning engine) associated with the gateway system beneficially enables monitoring and/or programming and/or locating and/or controlling specific anchor systems associated with, or fitted to the conveyor system or conveyor means.

Anchor-Based Vehicle Property Generation

Figure 25:
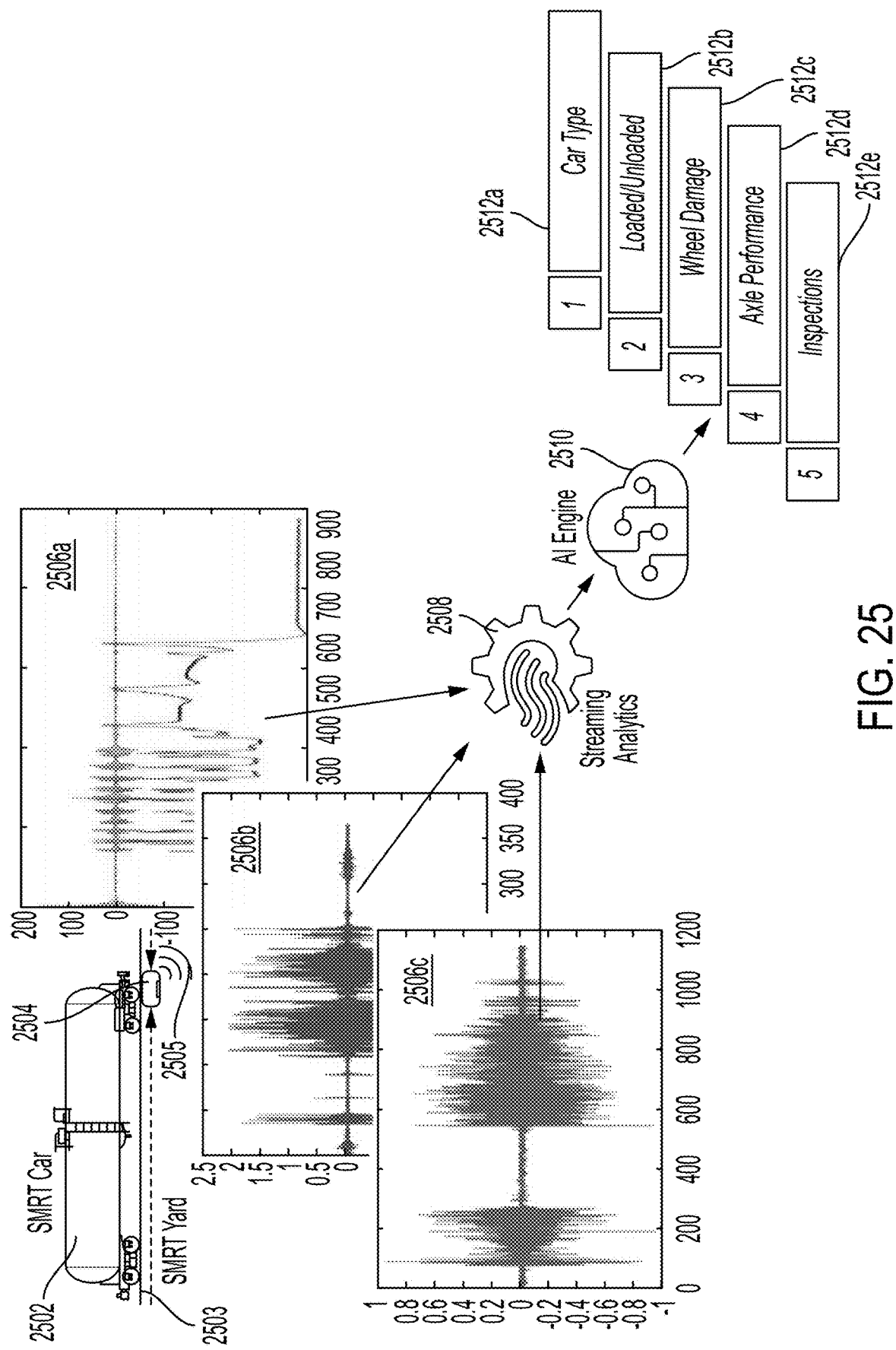
FIG. 25 provides an exemplary visualization showing how an anchor system can be used to detect a plurality of waveforms associated with a static or moving vehicle.

FIG. 25 provides an exemplary visualization showing how an anchor system can be used to detect a plurality of waveforms associated with a static or moving vehicle. According to some embodiments, the disclosed anchor systems are configured to detect various properties associated with vehicles (e.g., vehicles such as locomotives with or without smart tags) in motion and/or in stasis. As noted elsewhere herein, the disclosed anchor systems can be fitted or attached to: various locations or spots about a conveyor means or a conveyor system; and/or various locations or spots proximal to a conveyor means or conveyor system. It is appreciated that the conveyor means or conveyor system can comprise a rail track, and/or a road, and/or an above ground pathway, and/or a subterranean pathway, and/or an aerial pathway with various ground or above ground structures to which the anchor system can be fitted or attached, etc.

As can be seen in FIG. 25, a vehicle 2502 traveling on or by a conveyor means or a conveyor system 2503 can be detected by an anchor system 2504. This can be achieved by configuring the anchor system 2505 to transmit signals (e.g., electromagnetic signals) 2505 that interact with the vehicle 2502. In particular, the anchor system 2504, which can include a plurality of sensors including a magnetometer can transmit the signals 2505 such that in response to the signals 2505 interacting with the vehicle 2502 (e.g., thereby resulting in signals with information about the vehicle 2502), the signals with information about the vehicle 2502 are reflected back and are detected or otherwise received by the anchor system 2504.

According to one embodiment, the signals with information about the vehicle 2502, received by the anchor system 2504, may comprise a plurality of information 2506a, 2506b, and 2506c about the vehicle 2502. Once received, these signals with information 2506a, 2506b, and 2506c may be transmitted or streamed 2508 to an analytics or artificial intelligence (AI) engine 2510 configured to resolve or otherwise analyze the signals with information 2506a, 2506b, and 2506c about the vehicle 2502 and thereby generate a plurality of properties 2512a . . . 2512e associated with the vehicle 2502. In one embodiment, the plurality of properties 2512a . . . 2512e associated with the vehicle 2502 includes: a vehicle type or a car type property associated with the vehicle; a loaded status property or an unloaded status property associated with a load being housed by the vehicle; a load type property associated with the load being housed by the vehicle; a damage data property associated with one or more mechanisms (e.g., wheel, sensors, cargo housing units, cars, etc.) associated with the vehicle; a performance data property of one or more structures (e.g., axel performance data) associated with the vehicle; and an inspection data property associated with the vehicle. In some cases, the inspection data property comprises information indicating whether the vehicle has already been inspected or whether there is a pending inspection for the vehicle.

Switch List Optimization

As referenced elsewhere herein, a switch list may be generated based on: map data (e.g., inventory map data) associated with a vehicle; and/or metric data associated with the vehicle; and/or logistical data associated with the vehicle; and/or AI training data associated with movement or stasis of the vehicle. The forgoing data used to generate the switch list may be derived from, or based on analysis of smart data discussed in this disclosure. It is appreciated that the switch list can comprise a logistical control file configured to coordinate vehicle movements (e.g., railcar movements) within or without a docking area associated with the vehicle. It is further appreciated that an artificial intelligence engine associated with the disclosed tag or anchor systems or gateway systems can leverage at least the AI training data to determine: motion or stasis of a vehicle or cargo housing unit; vehicle length or cargo housing unit length; vehicle weight or cargo housing unit weight; vehicle height or cargo housing unit height; vehicle status or cargo housing unit status including whether the vehicle or cargo housing unit is operational; loading status of the vehicle or cargo housing unit associated with a load being present or absent on the vehicle or cargo housing unit.

In some cases, a static switch list may be generated and used (e.g., locally or remotely used) to direct or otherwise coordinate motion and/or stasis of a vehicle within or without a docking area associated with the vehicle (e.g., a vehicle with a smart tag). In such cases, the switch list can be transmitted to vehicle control mechanisms associated with specific vehicles within or without a docking area of the vehicle to facilitate directing or controlling motion or stasis of the vehicle within or without the docking area regardless of whether the vehicle: deviates from the control logic of the switch list; or whether there are inadvertent or unanticipated incidents or events within or without the vehicle docking area (e.g., rail yard, drone station, parking lot, etc.) which causes the vehicle to deviate from the control logic of the switch list. As such there is a need to develop adaptive switch lists that smartly or intelligently update or adapt a given switch list in real-time or near real-time to account for anticipated or unanticipated events including: vehicle type or vehicle size change events; accidental events associated with the vehicle including crash or collision events; adverse or favorable weather events; conveyor means or conveyor system change events that alter routes of travel associated with the vehicle; etc. To account for these types of events, an adaptive or dynamic switch list may be generated and used to coordinate vehicular motion or stasis, based on a detection of one or more of the aforementioned anticipated or unanticipated events, within or without a docking area associated with the vehicle.

It is appreciated that an AI engine may be used to generate the adaptive or dynamic switch list based on real-time or near real-time detection of one or more of the anticipated or unanticipated events within or without the docking area associated with the vehicle. In some cases, the AI engine analyzes a plurality of data including: data from a plurality of smart tag systems or tracker systems associated with one or more similar or dissimilar vehicles; data from a plurality of anchor systems coupled to similar or dissimilar conveyor systems or conveyor means; data from sensors coupled to the similar or dissimilar vehicles; etc. In effect, the AI engine can assume or "perceive" a holistic view of all vehicles within and/or without a docking area (e.g., based on at least sensor measurements from smart tags, and/or anchor systems, and/or other sensors) associated with multiple vehicles and determine an adaptive or dynamic switch list based on detection of any anticipated or unanticipated events within or without the docking area associated with the multiple vehicles. It is appreciated that the disclosed vehicles can also be intelligently and/or autonomously controlled based on the adaptive or dynamic switch list generated using the AI engine. FIGS. 26A and 26B show exemplary switch list implementations associated with a locomotive vehicle where the AI engine is used to optimize or identify a minimum number of car movements (e.g., railcar movements) required to achieve a specific optimal sequence on a specific track.

Reference in the specification to "one implementation" or "an implementation" or "one embodiment" or "some embodiments" means that a particular feature, structure, or characteristic described in connection with the implementation/embodiment is included in at least one implementation of the disclosure. The appearances of the phrase "in one implementation/embodiment" or "in some implementations/embodiments" in various places in the specification are not necessarily all referring to the same implementation/embodiment.

Some portions of the detailed descriptions above are presented in terms of data engines, modules, and symbolic representations of operations on data bits within a computer memory.

The present disclosure also relates to an apparatus for performing the operations disclosed. This apparatus may be specially constructed for the required purposes, or it may include a general-purpose computer selectively activated or reconfigured by a computer program stored in the computer. Such a computer program may be stored in a computer readable storage medium, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware implementation, an entirely software implementation or an implementation containing both hardware and software elements. In some implementations, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The data engine or modules and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein. It is further appreciated that the term optimal and its variants (e.g., efficient, optimally, etc.) may simply indicate improving, rather than the ultimate form of 'perfection' or the like.

Finally, the foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Furthermore, the relevant art, the modules, routines, features, attributes, methodologies and other aspects of the present disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way known now or in the future in the art of computer programming. Additionally, the present disclosure is in no way limited to implementation in any specific programming language, or for any specific operating system or environment. Accordingly, the disclosure of the present disclosure is intended to be illustrative, but not limiting, of the scope of the present disclosure, which is set forth in the following claims.

What is claimed is:

1. A method for analyzing data within a tag network, the method comprising:
   initiating, using one or more computing device processors associated with a data server, activation of a first tag network on a vehicle comprising a first cargo housing unit and a second cargo housing unit, the first tag network comprising:
      a plurality of tags including:
         a first tag attached to the first cargo housing unit of the vehicle, and
         a second tag attached to the second cargo housing unit of the vehicle, and
      a gateway system configured to transmit aggregate tag data based on detecting a tag in the first tag network, the aggregate tag data comprising or being based on first tag data associated with the first tag and second tag data associated with the second tag;
   communicatively coupling, using the one or more computing device processors associated with the data server and based on the first tag network, the first tag and the second tag, thereby enabling communication between the first tag and the second tag;
   detecting, using the one or more computing device processors associated with the data server and based on the gateway system, the first tag;
   receiving, using the one or more computing device processors associated with the data server and based on detecting the first tag, the aggregate tag data, the aggregate tag data comprising or being based on at least a combination or aggregation of:
      the first tag data associated with the first tag, and
      the second tag data associated with the second tag;
   resolving or analyzing, using the one or more computing device processors associated with the data server, the aggregate tag data, thereby generating resolved or analyzed data associated with the first tag network;
   generating, using the one or more computing device processors associated with the data server and based on the resolved or analyzed data, at least one of:
      first map data based on at least:
         first geolocation data associated with the first cargo housing unit of the vehicle, and
         second geolocation data associated with the second cargo housing unit of the vehicle,
      first metric data based on at least:
         a first sensor measurement associated with the first cargo housing unit of the vehicle, and
         a second sensor measurement associated with the second cargo housing unit of the vehicle,
      first logistical data based on at least:
         first inventory information associated with the first cargo housing unit of the vehicle, and
         second inventory information associated with the second cargo housing unit of the vehicle, and
      first training data for or based on one or more machine learning models associated with the first tag network or a second tag network; and
   transmitting, using the one or more computing device processors associated with the data server, a first data alert to a first display device that is different from the data server, the first data alert being based on at least one of the first map data, the first metric data, the first logistical data, or the first training data,
   wherein generating the first map data comprises:
      determining a satellite map for an area, in which the vehicle or a selection of cargo housing units including the first cargo housing unit and the second cargo housing unit is located, using global positioning system (GPS) data associated with at least the first geolocation data or the second geolocation data,
      overlaying the satellite map with a structural component of the vehicle thereby generating a digital canvas, the structural component comprising the selection of cargo housing units of the vehicle including the first cargo housing unit and the second cargo housing unit, and
      labeling the digital canvas with a plurality of display elements data identifiers associated with the vehicle or the selection of cargo housing units of the vehicle thereby generating the first map data.

2. The method of claim 1, wherein
the plurality of tags are communicatively coupled to each other in a mesh network,
the plurality of tags are configured to be in data communication with each other based on the mesh network,
the aggregate tag data comprises tag data from each of the plurality of tags based on the data communication, and
detection of the first tag by the gateway system enables detection or reception of the aggregate tag data.

3. The method of claim 1, wherein:
each tag of the plurality of tags is attached to a cargo housing unit comprised in at least the selection of cargo housing units of the vehicle including the first cargo housing unit and the second cargo housing unit,
the first map data comprises a multidimensional visualization indicating one or more of:
   location data for each cargo housing unit comprised in at least the selection of cargo housing units of the vehicle, the location data comprising the first geolocation data and the second geolocation data, and
   logistics data for each cargo housing unit comprised in at least the selection of cargo housing units of the vehicle, the logistics data comprising at least the first logistical data.

4. The method of claim 3, wherein the logistics data indicates one or more of:
   inventory data associated with each cargo housing unit comprised in at least the selection of cargo housing units of the vehicle,
   shipment or tracking data associated with each cargo housing unit comprised in at least the selection of cargo housing units of the vehicle,
   delivery time data associated with each cargo housing unit comprised in at least the selection of cargo housing units of the vehicle, and
   sequence data associated with an arrangement or organization or structuring or sequencing of each cargo housing unit comprised in the selection of cargo housing units of the vehicle.

5. The method of claim 1, wherein the first metric data comprises telemetric data with the first sensor measurement or the second sensor measurement, such that:
the first sensor measurement comprises first data measurements associated with monitoring first cargo comprised in the first cargo housing unit, and
the second sensor measurement comprises second data measurements associated with monitoring second cargo comprised in the second cargo housing unit.

6. The method of claim 5, wherein the telemetric data comprises motive data associated with the vehicle, the motive data indicating kinematic information associated with at least the selection of cargo housing units of the vehicle including the first cargo housing unit and the second cargo housing unit.

7. The method of claim 6, wherein the kinematic information includes:
start motion data associated with the vehicle or the selection of cargo housing units of the vehicle, the start motion data indicating a movement of the vehicle or the selection of cargo housing units of the vehicle,
stop motion data associated with the vehicle or the selection of cargo housing units of the vehicle, the stop motion data indicating stasis of the vehicle or the selection of cargo housing units,
vibration data associated with the vehicle or the selection of cargo housing units or a conveyor means on which the vehicle moves, and
collision data associated with:
the vehicle hitting a first object when the vehicle is in motion or in stasis, or
a cargo housing unit coupled to the vehicle hitting a second object when the vehicle is in motion or in stasis.

8. The method of claim 1, wherein:
the first tag or the second tag is comprised in a smart tag or tracking system configured for inter-tag communication within the first tag network or the second tag network, and
the first tag network or the second tag network is a mesh network.

9. The method of claim 8, wherein the smart tag or tracking system is powered by a longevity energy source.

10. The method of claim 1, wherein the vehicle comprises one of a locomotive, a truck, or a drone.

11. The method of claim 1, further comprising providing a live feed to the first display device of at least the first cargo housing unit of the vehicle or the second cargo housing unit of the vehicle, the live feed including real-time or near real-time video data or image data associated with:
the first cargo housing unit of the vehicle, or
the second cargo housing unit of the vehicle.

12. The method of claim 1, wherein in response to the vehicle entering the second tag network, the method further comprises:
detecting, based on an anchor system associated with the second tag network, the first tag;
receiving, based on the detecting of the first tag by the anchor system, the aggregate tag data or an updated aggregate tag data;
generating, based on the aggregate tag data or the updated aggregate tag data, second map data, second metric data, second logistical data, and second training data; and
transmitting a second data alert to the first display device or a second display device that is different from the data server or the first display device, the second data alert being based on at least one of the second map data, the second metric data, the second logistical data, or the second training data.

13. The method of claim 1, further comprising generating, based on the resolved or analyzed data, at least two of:
the first map data based on at least:
the first geolocation data associated with the first cargo housing unit of the vehicle,
the second geolocation data associated with the second cargo housing unit of the vehicle,
the first metric data based on at least:
the first sensor measurement associated with the first cargo housing unit of the vehicle,
the second sensor measurement associated with the second cargo housing unit of the vehicle,
the first logistical data based on at least:
the first inventory information associated with the first cargo housing unit of the vehicle,
the second inventory information associated with the second cargo housing unit of the vehicle, and
the first training data for or based on the one or more machine learning models associated with the first tag network or the second tag network.

14. The method of claim 1, further comprising generating, based on the resolved or analyzed data, at least three of:
the first map data based on at least:
the first geolocation data associated with the first cargo housing unit of the vehicle,
the second geolocation data associated with the second cargo housing unit of the vehicle,
the first metric data based on at least:
the first sensor measurement associated with the first cargo housing unit of the vehicle,
the second sensor measurement associated with the second cargo housing unit of the vehicle,
the first logistical data based on at least:
the first inventory information associated with the first cargo housing unit of the vehicle,
the second inventory information associated with the second cargo housing unit of the vehicle, and
the first training data for or based on the one or more machine learning models associated with the first tag network or the second tag network.

15. The method of claim 1, further comprising generating, based on the resolved or analyzed data, all of:
the first map data based on at least:
the first geolocation data associated with the first cargo housing unit of the vehicle,
the second geolocation data associated with the second cargo housing unit of the vehicle,
the first metric data based on at least:
the first sensor measurement associated with the first cargo housing unit of the vehicle,
the second sensor measurement associated with the second cargo housing unit of the vehicle,
the first logistical data based on at least:
the first inventory information associated with the first cargo housing unit of the vehicle,
the second inventory information associated with the second cargo housing unit of the vehicle, and
the first training data for or based on the one or more machine learning models associated with the first tag network or the second tag network.

16. A system comprising:
one or more computing system processors associated with a data server; and
memory storing instructions that, when executed by the one or more computing system processors, causes the system to:
initiate activation of a first tag network on a vehicle comprising a first cargo housing unit and a second cargo housing unit, the first tag network comprising:
a plurality of tags including:
a first tag attached to the first cargo housing unit of the vehicle, and
a second tag attached to the second cargo housing unit of the vehicle, and
a gateway system configured to transmit aggregate tag data based on detecting a tag in the first tag network, the aggregate tag data comprising or being based on at least first tag data associated with the first tag and second tag data associated with the second tag;
communicatively couple, based on the first tag network, the first tag and the second tag, thereby enabling communication between the first tag and the second tag;
detect, based on the gateway system, the first tag;
receive, based on detecting the first tag, the aggregate tag data, the aggregate tag data comprising or being based on at least a combination or aggregation of:
the first tag data associated with the first tag, and
the second tag data associated with the second tag;
resolve or analyze the aggregate tag data, thereby generating resolved or analyzed data associated with the first tag network;
generate, based on the resolved or analyzed data, at least one of:
first map data based on at least:
first geolocation data associated with the first cargo housing unit of the vehicle, and
second geolocation data associated with the second cargo housing unit of the vehicle,
first metric data based on at least:
a first sensor measurement associated with the first cargo housing unit of the vehicle, and
a second sensor measurement associated with the second cargo housing unit of the vehicle,
first logistical data based on at least:
first inventory information associated with the first cargo housing unit of the vehicle, and
second inventory information associated with the second cargo housing unit of the vehicle, and
first training data for or based on one or more machine learning models associated with the first tag network or a second tag network; and
transmit a first data alert to a first display device that is different from the data server, the first data alert being based on at least one of the first map data, the first metric data, the first logistical data, or the first training data,
wherein generating the first map data comprises:
determining a satellite map for an area, in which the vehicle or a selection of cargo housing units including the first cargo housing unit and the second cargo housing unit is located, using global positioning system (GPS) data associated with at least the first geolocation data or the second geolocation data,
overlaying the satellite map with a structural component of the vehicle thereby generating a digital canvas, the structural component comprising the selection of cargo housing units of the vehicle including the first cargo housing unit and the second cargo housing unit, and
labeling the digital canvas with a plurality of display elements data identifiers associated with the vehicle or the selection of cargo housing units of the vehicle thereby generating the first map data.

17. The system of claim 16, wherein:
the plurality of tags are communicatively coupled to each other in a mesh network,
the plurality of tags are configured to be in data communication with each other based on the mesh network,
the aggregate tag data comprises tag data from each of the plurality of tags based on the data communication, and
detection of the first tag by the gateway system enables detection or reception of the aggregate tag data.

18. The system of claim 16, wherein in response to the vehicle entering the second tag network, the instructions are executed by the one or more computing system processors associated with the data server to:
detect, based on an anchor system associated with the second tag network, the first tag;
receive, based on detecting the first tag by the anchor system, the aggregate tag data or an updated aggregate tag data;
generate, based on the aggregate tag data or the updated aggregate tag data, second map data, second metric data, second logistical data, and second training data; and
transmit a second data alert to the first display device or a second display device that is different from the data server or the first display device, the second data alert being based on at least one of the second map data, the second metric data, the second logistical data, or the second training data.

19. A method for analyzing data within a tag network, the method comprising:
initiating, using one or more computing device processors associated with a data server, activation of a first tag network on a vehicle comprising a first cargo housing unit and a second cargo housing unit, the first tag network comprising:
a plurality of tags including:
a first tag attached to the first cargo housing unit of the vehicle, and
a second tag attached to the second cargo housing unit of the vehicle, and
a gateway system configured to transmit aggregate tag data based on detecting a tag in the first tag network, the aggregate tag data comprising or being based on first tag data associated with the first tag and second tag data associated with the second tag;
communicatively coupling, using the one or more computing device processors associated with the data server and based on the first tag network, the first tag and the second tag, thereby enabling communication between the first tag and the second tag;
detecting, using the one or more computing device processors associated with the data server and based on the gateway system, the first tag;
receiving, using the one or more computing device processors associated with the data server and based on detecting the first tag, the aggregate tag data, the aggregate tag data comprising or being based on at least a combination or aggregation of:
the first tag data associated with the first tag, and
the second tag data associated with the second tag;

resolving or analyzing, using the one or more computing device processors associated with the data server, the aggregate tag data, thereby generating resolved or analyzed data associated with the first tag network;
generating, using the one or more computing device processors associated with the data server and based on the resolved or analyzed data, at least three of:
first map data based on at least:
first geolocation data associated with the first cargo housing unit of the vehicle, and
second geolocation data associated with the second cargo housing unit of the vehicle,
first metric data based on at least:
a first sensor measurement associated with the first cargo housing unit of the vehicle, and
a second sensor measurement associated with the second cargo housing unit of the vehicle,
first logistical data based on at least:
first inventory information associated with the first cargo housing unit of the vehicle, and
second inventory information associated with the second cargo housing unit of the vehicle, and
first training data for or based on one or more machine learning models associated with the first tag network or a second tag network; and
transmitting, using the one or more computing device processors associated with the data server, a first data alert to a first display device that is different from the data server, the first data alert being based on at least one of the first map data, the first metric data, the first logistical data, or the first training data,
wherein generating the first map data comprises:
determining a satellite map for an area, in which the vehicle or a selection of cargo housing units including the first cargo housing unit and the second cargo housing unit is located, using global positioning system (GPS) data associated with at least the first geolocation data or the second geolocation data,
overlaying the satellite map with a structural component of the vehicle thereby generating a digital canvas, the structural component comprising the selection of cargo housing units of the vehicle including the first cargo housing unit and the second cargo housing unit, and
labeling the digital canvas with a plurality of display elements data identifiers associated with the vehicle or the selection of cargo housing units of the vehicle thereby generating the first map data.

20. A method for analyzing data within a tag network, the method comprising:
initiating, using one or more computing device processors associated with a data server, activation of a first tag network on a vehicle comprising a first cargo housing unit and a second cargo housing unit, the first tag network comprising:
a plurality of tags including:
a first tag attached to the first cargo housing unit of the vehicle, and
a second tag attached to the second cargo housing unit of the vehicle, and
a gateway system configured to transmit aggregate tag data based on detecting a tag in the first tag network, the aggregate tag data comprising or being based on first tag data associated with the first tag and second tag data associated with the second tag;
communicatively coupling, using the one or more computing device processors associated with the data server and based on the first tag network, the first tag and the second tag, thereby enabling communication between the first tag and the second tag;
detecting, using the one or more computing device processors associated with the data server and based on the gateway system, the first tag;
receiving, using the one or more computing device processors associated with the data server and based on detecting the first tag, the aggregate tag data, the aggregate tag data comprising or being based on at least a combination or aggregation of:
the first tag data associated with the first tag, and
the second tag data associated with the second tag;
resolving or analyzing, using the one or more computing device processors associated with the data server, the aggregate tag data, thereby generating resolved or analyzed data associated with the first tag network;
generating, using the one or more computing device processors associated with the data server and based on the resolved or analyzed data, at least one of:
first map data based on at least:
first geolocation data associated with the first cargo housing unit of the vehicle, and
second geolocation data associated with the second cargo housing unit of the vehicle,
first metric data based on at least:
a first sensor measurement associated with the first cargo housing unit of the vehicle, and
a second sensor measurement associated with the second cargo housing unit of the vehicle,
first logistical data based on at least:
first inventory information associated with the first cargo housing unit of the vehicle, and
second inventory information associated with the second cargo housing unit of the vehicle, and
first training data for or based on one or more machine learning models associated with the first tag network or a second tag network; and
transmitting, using the one or more computing device processors associated with the data server, a first data alert to a first display device that is different from the data server, the first data alert being based on at least one of the first map data, the first metric data, the first logistical data, or the first training data,
wherein the first metric data comprises telemetric data with the first sensor measurement or the second sensor measurement, such that:
the first sensor measurement comprises first data measurements associated with monitoring first cargo comprised in the first cargo housing unit, and
the second sensor measurement comprises second data measurements associated with monitoring second cargo comprised in the second cargo housing unit,
wherein the telemetric data comprises motive data associated with the vehicle, the motive data indicating kinematic information associated with at least a selection of cargo housing units of the vehicle including the first cargo housing unit and the second cargo housing unit, and
wherein the kinematic information includes:
start motion data associated with the vehicle or the selection of cargo housing units of the vehicle, the start motion data indicating a movement of the vehicle or the selection of cargo housing units of the vehicle,
stop motion data associated with the vehicle or the selection of cargo housing units of the vehicle, the stop motion data indicating stasis of the vehicle or the selection of cargo housing units, vibration data associated with the vehicle or the selection of cargo housing units or a conveyor means on which the vehicle moves, and collision data associated with:
- the vehicle hitting a first object when the vehicle is in motion or in stasis, or
- a cargo housing unit coupled to the vehicle hitting a second object when the vehicle is in motion or in stasis.

* * * * *